US00RE38759E

(19) United States
(12) Reissued Patent
Suzuki

(10) Patent Number: US RE38,759 E
(45) Date of Reissued Patent: Jul. 19, 2005

(54) DIGITAL STILL VIDEO CAMERA, IMAGE DATA OUTPUT SYSTEM FOR DIGITAL STILL VIDEO CAMERA, FRAME FOR DATA RELAY FOR DIGITAL STILL VIDEO CAMERA, DATA TRANSFER SYSTEM FOR DIGITAL STILL VIDEO CAMERA, AND IMAGE REGENERATING APPARATUS

(75) Inventor: Hiroaki Suzuki, Chiba (JP)

(73) Assignee: Ricoh Company Limited, Tokyo (JP)

(21) Appl. No.: 10/230,386

(22) Filed: Aug. 29, 2002

Related U.S. Patent Documents

Reissue of:
(64) Patent No.: 6,111,605
Issued: Aug. 29, 2000
Appl. No.: 08/744,045
Filed: Nov. 6, 1996

(30) Foreign Application Priority Data

| | | |
|---|---|---|
| Nov. 6, 1995 | (JP) | 7-287640 |
| Nov. 8, 1995 | (JP) | 7-290182 |
| Nov. 14, 1995 | (JP) | 7-295429 |
| Nov. 20, 1995 | (JP) | 7-301822 |
| Nov. 20, 1995 | (JP) | 7-301823 |
| Dec. 2, 1995 | (JP) | 7-338186 |

(51) Int. Cl.[7] ..... H04N 5/225
(52) U.S. Cl. ..... 348/220.1; 348/207.2; 348/231.99; 348/552
(58) Field of Search ..... 348/207.99, 207.1, 348/207.11, 207.2, 552, 211.99, 211.1, 211.4, 211.5, 211.6, 220.1, 222.1, 231.99, 231.3, 231.6, 231.9, 231.7, 231.8

(56) References Cited

U.S. PATENT DOCUMENTS

| | | | | |
|---|---|---|---|---|
| 5,412,779 A | | 5/1995 | Motoyama | |
| 5,550,646 A | | 8/1996 | Hassan et al. | |
| 5,566,278 A | | 10/1996 | Patel et al. | |
| 5,734,425 A | | 3/1998 | Takizawa et al. | |
| 5,754,227 A | | 5/1998 | Fukuoka | |
| 5,978,020 A | * | 11/1999 | Watanabe et al. | 348/207.99 |
| 6,334,025 B1 | | 12/2001 | Yamagami | |
| 6,583,811 B2 | * | 6/2003 | Kinjo | 348/96 |

FOREIGN PATENT DOCUMENTS

| | | |
|---|---|---|
| JP | 59-119984 | 7/1984 |
| JP | 1-103759 | 4/1989 |
| JP | 2-44879 | 2/1990 |
| JP | 2-280483 | 11/1990 |
| JP | 4-122184 | 4/1992 |
| JP | 4-332281 | 11/1992 |
| JP | 5-64143 | 3/1993 |
| JP | 6-350950 | 12/1994 |
| JP | 7-184160 | 7/1995 |

* cited by examiner

*Primary Examiner*—Tuan Ho
(74) *Attorney, Agent, or Firm*—McDermott Will & Emery LLP

(57) ABSTRACT

The digital still video camera according to the present invention comprises a liquid crystal monitor and an operation display section and picture information input means for inputting picture information for a printer, an MEM as a memory means for storing inputted picture means, and a CPU, and IPP, a DCT, a coder, and an MCC each as a converting/transmitting means for converting the image data to be sent to the printer to that adapted to the printer according to the picture information stored in the HEM and sending the converted image data using a synchronizing signal adapted to the printer.

3 Claims, 60 Drawing Sheets

PROCESSING FOR SETTING PICTURE INFORMATION

MASK INFORMATION SELECT SCREEN

FIG.35

SCREEN WITH HEIGHT H X WIDTH W IS DIVIDED INTO M X N BLOCKS

W

H

| | | | | | | | | |
|---|---|---|---|---|---|---|---|---|
| 0 | 0 | 0 | 1 | 1 | 1 | 0 | 0 | 0 |
| 0 | 0 | 0 | 1 | 1 | 1 | 0 | 0 | 0 |
| 0 | 0 | 0 | 1 | 1 | 1 | 0 | 0 | 0 |
| 0 | 0 | 0 | 1 | 1 | 1 | 0 | 0 | 0 |
| 0 | 0 | 0 | 1 | 1 | 1 | 0 | 0 | 0 |
| 0 | 0 | 0 | 1 | 1 | 1 | 0 | 0 | 0 |
| 0 | 0 | 0 | 1 | 1 | 1 | 0 | 0 | 0 |

h

BLOCK SIZE
(HEIGHT H X WIDTH W)

w $h = H / M,$
$w = W / N$

FIG.36

| | | | | | | | | |
|---|---|---|---|---|---|---|---|---|
| 0 | 0 | 0 | 0 | 0 | 0 | 0 | 0 | 0 |
| 0 | 2 | 2 | 2 | 2 | 2 | 2 | 2 | 0 |
| 0 | 2 | 1 | 1 | 1 | 1 | 1 | 2 | 0 |
| 0 | 2 | 1 | 1 | 1 | 1 | 1 | 2 | 0 |
| 0 | 2 | 1 | 1 | 1 | 1 | 1 | 2 | 0 |
| 0 | 2 | 2 | 2 | 2 | 2 | 2 | 2 | 0 |
| 0 | 0 | 0 | 0 | 0 | 0 | 0 | 0 | 0 |

DIGITAL STILL VIDEO CAMERA, IMAGE DATA OUTPUT SYSTEM FOR DIGITAL STILL VIDEO CAMERA, FRAME FOR DATA RELAY FOR DIGITAL STILL VIDEO CAMERA, DATA TRANSFER SYSTEM FOR DIGITAL STILL VIDEO CAMERA, AND IMAGE REGENERATING APPARATUS

Matter enclosed in heavy brackets [ ] appears in the original patent but forms no part of this reissue specification; matter printed in italics indicates the additions made by reissue.

FIELD OF THE INVENTION

The present invention relates to a digital still video camera as well as to an image data output system for a digital still video camera, and more particularly to a digital still video camera as well as to an image data output system for a digital still video camera for outputting image data for the digital still video camera having a function for data transaction to recording paper through an image forming apparatus.

The present invention also relates to a digital still video camera in which an image and voice in combination can be recorded, and more particularly to a digital still video camera in which the operability, workability, and convenience are improved by making use of a function for inputting voices more effectively. The present invention also relates to a frame for data relay for a digital still video camera as well as to a data transfer system for a digital still video camera, and more particularly to a frame for data relay for a digital still video camera as well as to a data transfer system for a digital still video camera in which the convenience thereof is improved when data is transferred between the digital still video camera and external device.

The present invention also relates to a digital still video camera for photographing an image and recording the image in a recording medium such as a memory card or the like, and more particularly to a digital still video camera always recording the photographed image in a recording medium without reducing a quantity of information for a main object for a photo.

The present invention also relates to a digital still video camera for recording at least photographed image in a recording medium, and more particularly to a digital still video camera for reporting a residual memory space of the recording medium with voices.

The present invention also relates to a digital still video camera for photographing an image and recording the image in a recording medium such as a memory card or the like, and more particularly to a digital still video camera in which a mask for identifying a photographed image area according to video which a user wants to record is selected, a form of the photographed image to be stored in the storage medium can freely be changed, and a number of pieces of video that can be stored in the storage medium is made to a maximum without degrading the quality of the recorded image, whereby the storage medium can effectively be utilized.

BACKGROUND OF THE INVENTION

At first, conventionally it is required an image data output system for a digital still video camera as shown in FIG. 59A to FIG. 59D in a case where an image photographed by a digital still video camera is outputted to recording paper through an image forming apparatus such as a printer.

For instance, FIG. 59A and FIG. 59B show configuration in which image data is transferred from the digital still video camera (DSVC) to a computer through an I/F (an interface), and the image data is transferred to a printer using a printing function of the computer to be outputted to recording paper.

FIG. 59C and FIG. 59D also shown configuration in which image data is recorded in a recording medium set in a drive incorporated in the digital still video camera (DSVC), the image data stored in the recording medium is read in by a data reading device connected to the computer, and the image data is transferred to the printer using the printing function of the computer to be outputted to recording paper. As a recording medium, there are a floppy disk, a hard disk, a magneto-optical disk, and a memory card (IC card) or the like each of which is an ordinary one as computer peripheral equipment, and the memory card is generally used for the digital still video camera because read/write of the information can be executed at a high speed therein.

It should be noted that, in FIG. 59B and FIG. 59D, a controller is provided between the computer and the printer, so that drawing at a higher speed and color correction with a mode advanced function can be realized by using the controller.

Secondarily, in recent years the digital still video cameras have come to incorporate multiple and versatile functions, and there have been developed various types of recording mode including, in addition to a still picture mode for recording a photographed image as a still picture, a successively photographing mode for successively recording still pictures, a voice mode for recording voices, a still picture+voice mode for simultaneously recording a still picture and voices, a moving picture mode for recording moving pictures like that in a video camera, a moving picture+voice mode for simultaneously recording moving pictures and voices, and a character mode for clearly recording characters or the like, or some other modes.

As a step for making a video still video camera more versatile, there is provided an operation mode such as a communicating function for fetching image data as well as voice data each photographed by the digital still video camera into external device such as a computer or the like.

Conventionally, in this type of digital still video camera in which image data and voice data in combination can be recorded, the inputted voice data is recorded using a voice compression technology. Also a listening method is used for regeneration, identification, and edit of the recorded voice data like in a case of a personal computer or a tape recorder.

Thirdly, as a system of transferring data between devices based on the conventional technology, a wire communication system for connecting devices to each other with a cable has generally been employed. However, radio communication making use of infrared rays is going to be standardized in order to respond to such users' request that they want to do data transfer without preparing a cable or the like.

There is the IrDA (Infrared Data Association) as a group for promoting this standardization. In the radio communication between devices according to this radio communication system, as shown in FIG. 60A, a face on which the transferring/receiving section 6001a of a device 6001 is provided at a position opposite to a face on which the transferring/receiving section 6002a of a device 6002 is provided, and data is transferred between the transferring/receiving sections 6001a and 6002a.

In order to give flexibility to a potential relation between the devices, as shown in FIG. 60B, there is also provided a product in which the transferring/receiving section 6001a is separated from the device 6001 by using a serial port of the device 6001 such as a computer or the like.

On the other hand, a recording capability of the digital still video camera has remarkably progressed, so that it is now possible to execute various types of recording for recording not only still pictures but also moving pictures, and voices, or a mixture of moving pictures+voices or the like. An IC card enabling a high-speed read/write of data is mainly used for recording. To fetch this recorded data into equipment such as a personal computer or the like, a dedicated radio communication function or an IC card reader is required.

For this reason, if a radio communication function based on the IrDA standard is incorporated in the digital still video camera, communications between devices each having the radio communication function based on the IrDA standard can be made easier, which makes it possible to improve the convenience of use of a digital still video camera.

Fourthly, as a digital still video camera based on the conventional technology, there is the one disclosed, for instance, in Japanese Patent Laid-Open Publication No. HEI 4-332281 under the title of "Electronic camera and image signal compressing device". This camera comprises a compressing means for subjecting an image signal obtained by an image pickup device to compression processing and an object distance detecting means for detecting a distance between a object and the camera, and adjusts a compression rate according to an output from said object distance detecting means. Namely, by setting the compression rate according to a scene to be photographed if necessary, an average compression rate of an image can be made higher and reduction of the memory space required for one screen can be achieved, so that a photographer can take pictures satisfying the photographer's desire.

In the "Electronic still camera" disclosed in Japanese Patent Laid-Open Publication No. HEI 5-64143, setting of the compression rate is automatically changed for storage so that a number of sheets of compressed image data to be stored will be set as an operator desires, which makes it possible to obtain the best image in the specified range.

Fifthly, as a digital still video camera based on the conventional technology, there is a device for reporting a residual memory space of a recording medium for recording therein photographed images.

For instance, in the "Electronic still camera" disclosed in Japanese Patent Laid-Open Publication No. HEI 2-280483, by estimating a number of sheets of still images which can be recorded in the recording medium from an average memory space of data used for image data recorded in the recording medium as well as from the recorded number of sheets, an appropriate alert can be issued when a residual data memory space in the recording medium becomes a low level.

Also in the "Electronic still camera" disclosed in Japanese Patent Laid-Open Publication No. HEI 6-350950, an empty memory space in the recording medium or a number of pieces which can further be photographed are displayed while alert is issued in at least two or more ways according to the empty memory space in the recording medium.

On the other hand, the digital still video cameras have come to incorporate more and more multiple and versatile functions, so that there are provided various types of recording mode such as, in addition to a still picture mode for recording a photographed image as a still picture, a successively photographing mode for successively recording still pictures, a voice mode for recording voices, a still picture+voice mode for simultaneously recording a still picture and voices, a moving picture mode for recording moving pictures like a video camera, and a character mode for clearly recording characters or the like, or some other modes.

Sixthly, in the digital still video camera based on the conventional technology, as a technology for recording much more data in a recording medium with a limited memory space, there are those as described below. Disclosed in Japanese Patent Laid-Open Publication No. HEI 2-44879 is an invention in which a recording medium can efficiently be used by switching a low-resolution mode switch and changing a number of data bits of a video signal to be written into a memory card.

Also disclosed in Japanese Patent Laid-Open Publication No. HEI 4-332281 is an invention in which a mode is effected in which a screen is compressed with a uniform compression rate in any of the three cases where a distance to an object is not less than a specified value, where a focus length is not more than a specified value, and where a specified relation is satisfied between the focus length and the distance to an object, and in other cases, a recording memory space required for a screen can be reduced by changing a compression rate according to the information obtained by measuring a distance to an object according for each scene to be photographed and concretely, for instance, by reducing the compression rate in an inside area of the outline.

However, with the first image data output system for a digital still video camera based on the conventional technology, any of the systems has configuration in which image data is transferred to a printer through a computer, so that a system for outputting the image data becomes disadvantageously expensive.

It should be noted that a computer is indispensable in a case where various types of editorial word or processing is executed to an image when the image is to be outputted to recording paper, but many users will simply desire print-output of an image, and especially in that case, the expensive system is a big problem for the users.

With the second digital still video camera based on the conventional technology, inputted voice data is only recorded with the technology for voice compression, so that the voice data has not been utilized as an information source for other processing.

As the third case described above, in a case where the function for the radio communication based on the IrDA standard is simply incorporated in the digital still video camera base on the conventional technology, there are such problems that data transfer can not always successfully be executed because the camera is affected by vibration of the equipment generated during the data transfer since the digital still video camera is generally a small-sized one and data to be transferred includes image data having a large quantity of information, and that data transfer can not successfully be executed because it is difficult to maintain a positional relation between the digital still video camera and an external device to which the data is to transferred in the best situation.

As a digital still video camera is generally small-sized and it is difficult to operate the digital still video camera in a state in which a suitable positional relation therebetween is maintained, there are such problems that the operability and convenience during data transfer is low.

With the fourth case described above, and based on the conventional technology described above, an image for one screen is compressed according to a uniform compression ratio, so that a method of thinning information for a complicated section block by block is employed due to restrictions in algorithm for the compression processing in a case where peripheral images have complicated patterns even if the main object is located at the center of the screen in the photographed screen of image, and for this reason a quantity of data for the main object is reduced. In other words, in an image for one screen, a main portion desired by a user can not always be recorded clearly.

In a case where a quantity of information for the main object is increased by simply reducing the compression rate (or without executing compression), a quantity of the information for the entire image for one screen increases disadvantageously.

These problems described above also exist in each of the invention disclosed in Japanese Patent Laid-Open Publication No. HEI 4-332281 and Japanese Patent Laid-Open Publication No. HEI 5-64143.

With the fifth digital still video camera based on the conventional technology, although an appropriate alert can be issued when a remaining memory space for data to be recorded in the recording medium (a residual memory space for recording) becomes a low level, the alert are given by means of display or indication, so that, in a case where a user does not notice the display of alert, sometimes photographed images may not be recorded therein.

In the sixth digital still video camera based on the conventional technology, as a method of making it possible to photograph a more number of sheets of images than that in a normal device, a method of changing a number of data bits or a compression rate is employed, and for this reason quality of an image to be fetched thereinto may entirely or partially be degraded.

It is a first object of the present invention to make it possible to output image data prepared by a digital still video camera based on simple and low-cost configuration to recording paper by directly transferring image data to an image forming apparatus such as a printer or the like without requiring a computer therebetween.

It is a second object of the present invention to improve operability, workability, and convenience in use of a digital still video camera by making use of received voice data as an information source for other types of processing.

It is an object of the present invention that data in a digital still video camera incorporating therein a function of radio communication making use of infrared rays can easily and securely be transferred to an external device. The present invention was also made for solving the problems described above, and it is a third object of the present invention to improve operability and convenience in use thereof when data is transferred from a digital still video camera to external device.

It is a fourth object of the present invention to make it possible to record an image in a desired area (the main portion) with a large quantity of information therefor with a layout intended by a user.

It is a fifth object of the present invention to make it possible to alert a user and accurately report a remaining recording space in a recording medium in which data can be recorded to the user.

It is a sixth object of the present invention to make it possible to freely change a form of a photographed image to be stored in a storage medium by selecting a mask identifying a photographed image area according to an image to be recorded for maximizing a number of sheets of images which can be stored in a storage medium without lowering a quality of the recorded image as well as for effectively utilizing the storage medium.

The digital still video camera according to the present invention having a function for transaction of image data as well as control data with external devices comprises a picture information input means for inputting picture information for an image forming apparatus, one of the external devices; a picture information memory means for storing therein picture information inputted from the picture information input means; and a converting/sending means for converting image data to be sent to the image forming apparatus to image data adapted to the image forming apparatus according to the picture information stored in the picture information memory means and sending the image data using a synchronizing signal adapted to the image forming apparatus, and in the digital still video camera picture information for the image forming apparatus is inputted thereinto by the picture information input means and is stored in the picture information memory means, and the converting/sending means converts image data to be sent to the image forming apparatus to image data adapted to the image forming apparatus according to the picture information and sends the image data using a synchronizing signal adapted to the image forming apparatus.

The digital still video camera according to the present invention having an image data generating means for photographing an image and generating image data for the image and a voice data generating means for inputting voices and generating voice data for the voices to record the generated image data as well as voice data in a recording medium comprises a character code generating means for recognizing voice data generated by the voice data generating means and generating character code corresponding to the voice data; and a recording control means for controlling the image data generating means, the voice data generating means, and the character code generating means, and recording the character code with relation to the image data in the recording medium.

The frame for data relay for a digital still video camera according to the present invention as a device for receiving data through radio communication from the digital still video camera having a function for radio communication making use of infrared rays for data transaction comprises a retaining means for stably retaining said digital still video camera; a radio communicating means for data transaction through radio communication with the digital still video camera retained by said retaining means; and a data input/output means for outputting the data received from said radio communicating means to an external device and also outputting the data received from said external device to said radio communicating means. Namely the frame for data relay according to the present invention can simply and accurately transfer data from a digital still video camera to an external device by executing radio communications with the digital still video camera through the radio communication means in a state in which the digital still video camera is stably retained by the retaining means in the frame for data relay and further by transferring the data from the radio communicating means to external device.

The digital still video camera according to the present invention for photographing an image and recording the image in a recording medium such as a memory card or the like comprises an image compressing means for enabling processing for compression of the image with at least two different types of compression ratio; and a memory means for storing mask information comprising a plurality of areas in which one of said at least two types of different compression ratio is set, and in the digital still video camera said image compressing means divides an image for one screen into a plurality of areas using the plurality of areas of the mask information stored in said memory means and subjects the image to compression processing with the compression rate of said mask information corresponding to said divided areas.

The digital still video camera according to the present invention for recording at least photographed image in a recording medium comprises a residual memory space computing means for computing a residual memory space of said recording medium; a setting means for setting therein a residual memory space reporting mode to report the residual memory space in said recording medium; a voice output means for outputting voices; and a residual memory space reporting means for outputting the residual memory space computed by said residual memory space computing means through said voice output means in a case where the residual memory space reporting mode has been set by said setting means.

The digital still video camera according to the present invention having a memory means for storing therein image data for the photographed image and an image displaying means for displaying or regenerating/displaying said photographed image or the image data stored in said memory means comprises a mask retaining means for retaining a plurality of masks each identifying a photographed image area; a selecting means for selecting one of the masks retained in said mask retaining means; and a control means for displaying the image on said image displaying means so that the object of a photograph can be seen through the photographed image area identified by said mask when the mask has been selected by said selecting means, storing the information relating to said mask with reference to the image data for the photographed image area identified by said mask each according to a specified operation in said memory means, and identifying an image area according to said mask information and regenerating/displaying the image thereon in a case where mask information related to said image data is added to the image data when the image data stored in said memory means is to be regenerated and displayed on said image displaying means.

Other objects and features of this invention will become understood from the following description with reference to the accompanying drawings.

BRIEF DESCRIPTION OF THE DRAWINGS

FIG. 35 is an explanatory view showing an example of configuration of mask information;

FIG. 36 is an explanatory view showing an example of configuration of mask information;

DESCRIPTION OF THE PREFERRED EMBODIMENTS

Next detailed description is made for a digital still video camera and an image data output system for a digital still video camera according to the present invention with reference to the related drawings.

Figure 1:
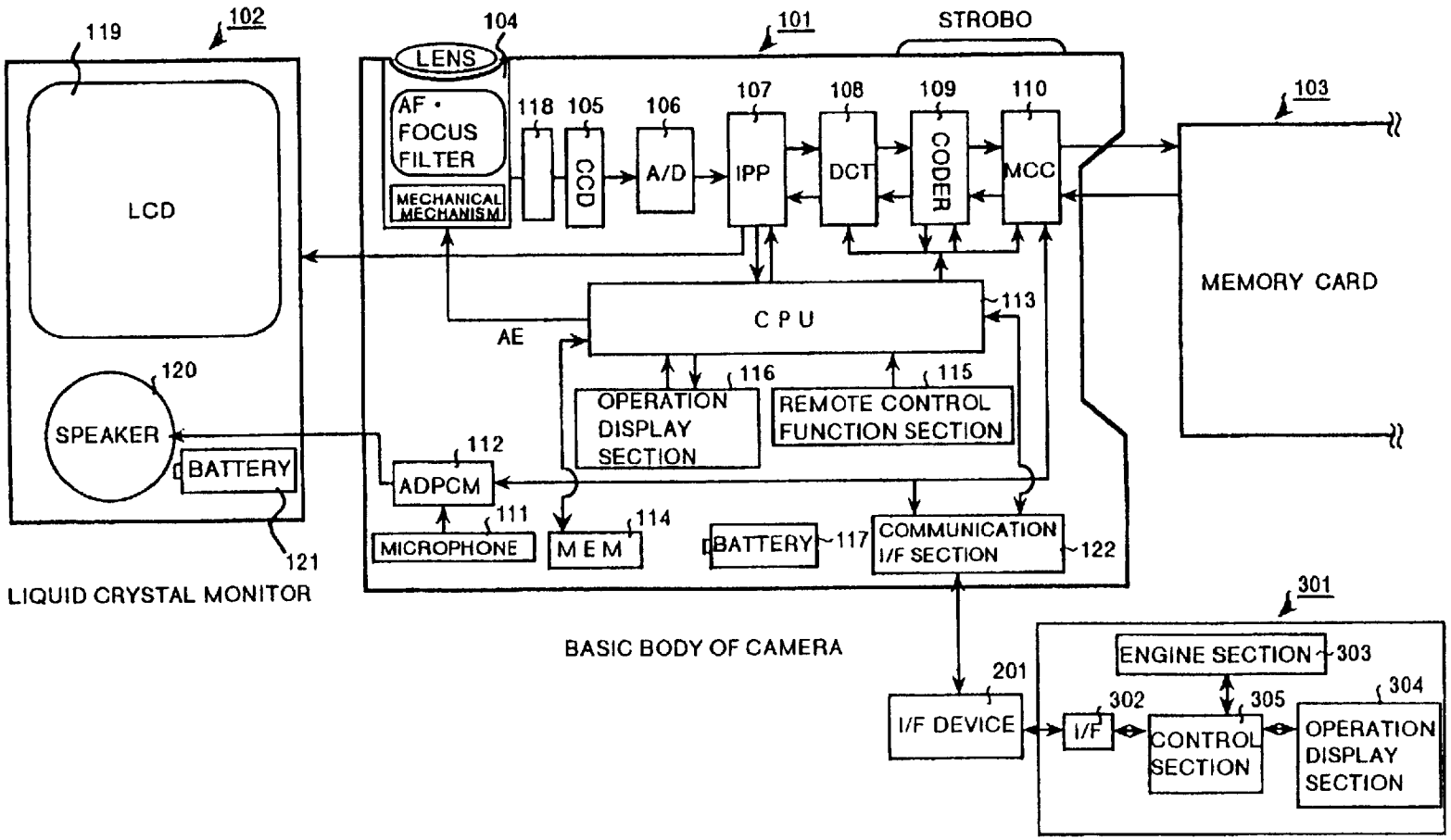
FIG. 1 is a block diagram showing a digital still video camera and an image data output system for a digital still video camera according to Embodiment 1 of the present invention.

FIG. 1 is a block diagram showing a digital still video camera as well as for an image data output system for a digital still video camera, and largely comprises a basic body 101 of a digital still video camera, an I/F (interface) device 201, and a printer 301.

It should be noted that a liquid crystal monitor 102 which can display photographed images and various types of information and a member card 103 for recording therein photographed images are connected to the basic body 101 of a camera.

The basic body 101 of the camera comprises a lens unit 104 comprising a lens, an automatic focus (AF), an iris, a filter, a mechanical component or the like; a CCD (charge coupled device) 105 for converting an image inputted through the lens unit 104 to an electric signal (analog image data); an A/D converter 105 for converting analog image data inputted from the CCD 105 to digital image data; an IPP (image pre-processor) 107 for dividing the digital image data inputted from the A/D converter 106 to data for chrominence and those for luminance and subjecting the divided data to data processing for various processing, correction and compression/extension of images; a DCT (Discrete Cosine Transform) 108 for executing D/A conversion which is a step of image compression/extension based on the JPEG standard; a coder (Huffman Encoder/Decoder) 109 for executing encoding and decoding each as a process of the image compression/expression based on the JPEG standard; an MCC 110 (Memory Card Controller) for temporally storing therein compressed images and voice data fetched from a microphone 111 and digitalized therein, subjecting the image data and voice data to synchronization, and recording the data in or reading the data from the memory card 103; an ADPCM (Adaptive Differential Pulse Code Modulation) 112 for converting voice inputted through the microphone 111 to digital data and also subjecting the voice data to processing for compression or extension; a CPU 113 for controlling each of the sections described above; an MEM 114 which is a work memory for a system consisting of a ROM and a RAM; a remote control function section 115 having a remotely controlled receiving function; an operation display section 116 for key entry for various types of buttons and switches as well as for display control of a liquid crystal monitor (a liquid crystal panel 119 described later); a battery 117 for supplying an electric power to each of the sections described above; an optical low-pas filter 118; and a communication I/F section 122 for executing communications with an I/F device 201.

The liquid crystal monitor 102 has at least a liquid crystal panel (LCD) 119 and a speaker 120. It should be noted that the reference numeral 121 indicates a battery for the liquid crystal monitor 102.

An I/F device 201 receives image data or the like from the communication I/F section 122 in the basic body 101 of the camera and transfers the image data to a printer 301. For this reason, configuration of the I/F device 201 is based on configuration of the communication I/F section 122 in the basic body 101 of the camera and that of the printer 301, and is not limited to any specific configuration.

The printer 301 comprises an I/F circuit 302 for executing communications with the I/F device 201; an engine section 303 comprising a printer engine or the like; an operation display section 304 for displaying or receiving various types of information; and a control section 305 for controlling each of the sections.

It should be noted that, in Embodiment 1, the picture information input means according to the present invention comprises the liquid crystal monitor 102 and the operation display section 116, the MEM 114 corresponds to the picture information memory means according to the present invention, and the converting/sending means according to the present invention comprises the CPU 113, IPP 107, DCT 108, coder 109, and MCC 110.

Figure 2A:
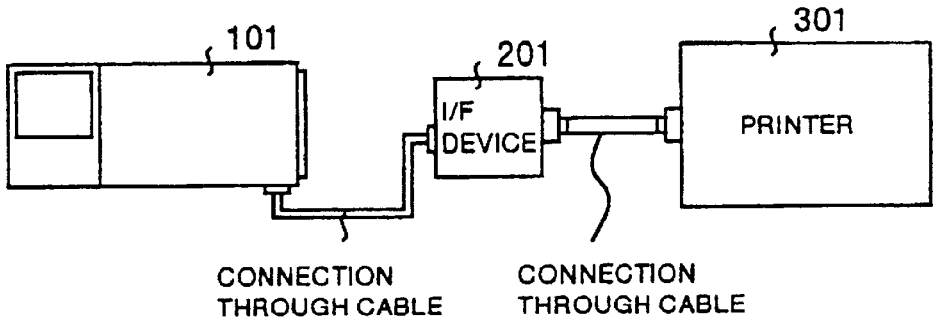
FIGS. 2A to 2C are explanatory views showing a method for connecting the digital still video camera to a printer.
Figure 2B:
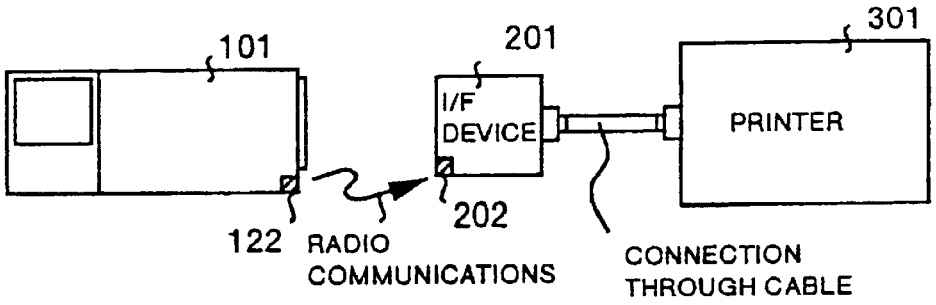
Figure 2C:
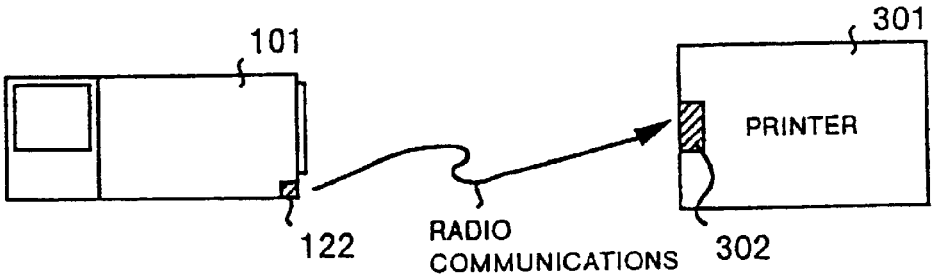

Also it should be noted that, although description of the embodiment 1 assumes the configuration in which the basic body 101 of the camera and the I/F device 201, and the I/F device 201 and the printer 301 are connected to each other with a cable respectively as shown in FIG. 2A, the configuration is allowable in which, for instance, the communication I/F section 122 in the basic body 101 of the camera can execute infrared ray communication, a communication section 202 capable of infrared ray communications is provided also in the side of the I/F device 201, and the basic body 101 of the camera and I/F device 201 are connected with radio communications as shown in FIG. 2B. Also the configuration is allowable in which the I/F circuit 302 of the printer 301 is capable of infrared ray communications and the basic body 101 of the camera and the printer 301 are directly connected to each other with radio communications.

With the configuration as described above, next description is made for operations for 1) input of picture information and 2) printing with an image data output system for a digital still video camera in this order.

1) Input of picture information

Input of picture information is executed by making the CPU 133 execute a picture information maintenance processing program stored in the MEM 114 and inputting picture information through the liquid crystal monitor 102 and the operation display section 116.

Figure 3:
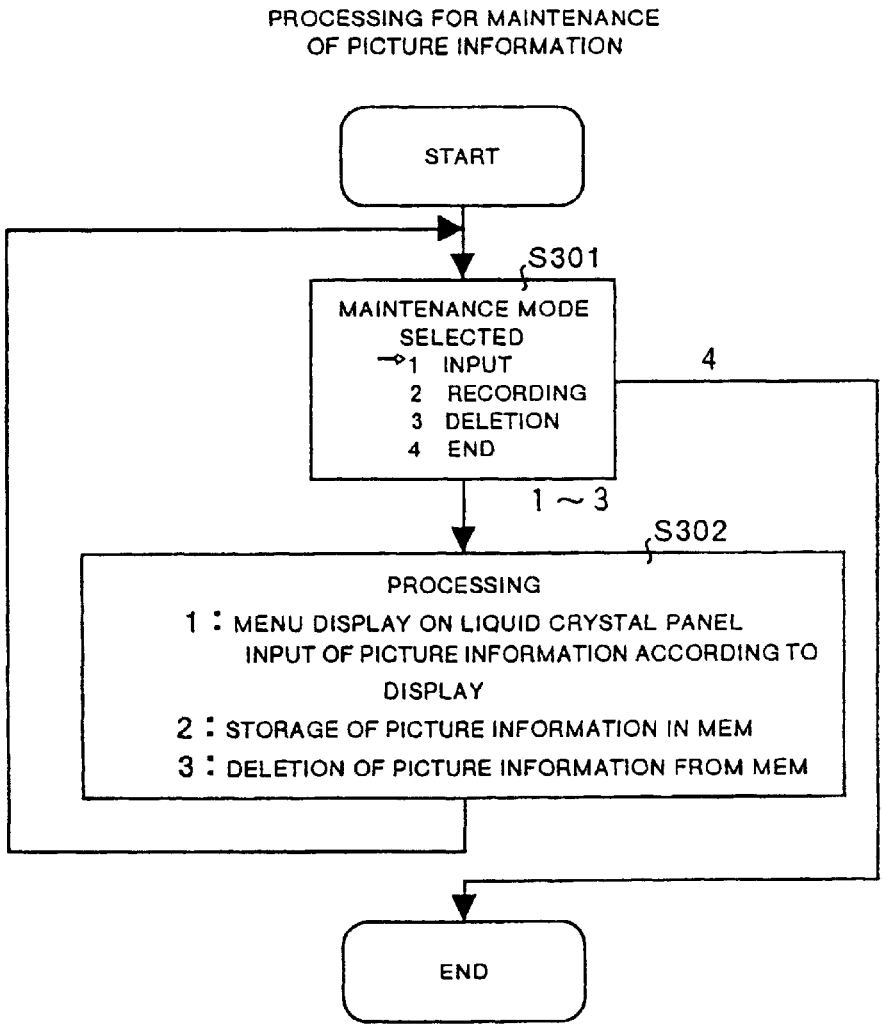
FIG. 3 is a flow chart showing processing for maintenance of picture information according to Embodiment 1.

FIG. 3 is a flow chart showing a processing sequence of operations for picture information maintenance, and when the picture information maintenance processing mode is specified through the operation display section 116, a corresponding program is executed by the CPU 113.

At first, the maintenance mode select screen is displayed on the liquid crystal panel 119 of the liquid crystal monitor 102 to ask a user to select a desired maintenance mode from "1. Input", "2. Recording", "3. Deletion", and "4. End", and when the user selects a desired maintenance mode, system control shifts to the next step (S301) according to the selected maintenance mode. Herein "input" means processing for inputting picture information anew, "recording" means processing for storing the inputted picture information in the MEM 114, "deletion" means processing for deleting picture information stored in the MEM 114, and "end" means termination of the picture information maintenance processing mode.

When "4. End" is selected in step S301, the processing is terminated as it is.

If any of "1. Input", "2. Recording", and "3. Deletion" is selected in step S301, system control advances to step S302 where the corresponding processing is executed, and then system control returns to step S301.

Figure 4A:
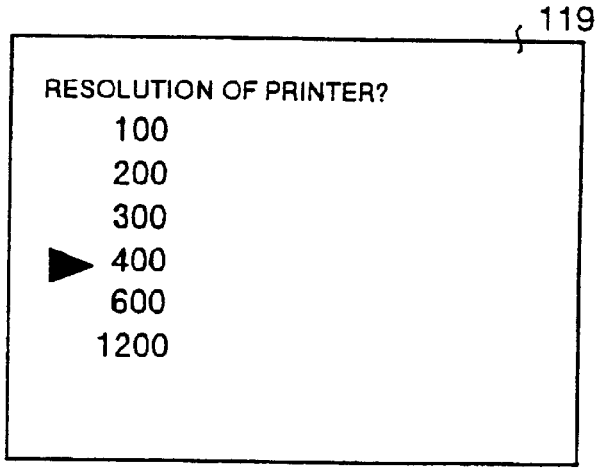
FIGS. 4A and 4B are explanatory views showing an example of a screen on which picture information is inputted.
Figure 4B:
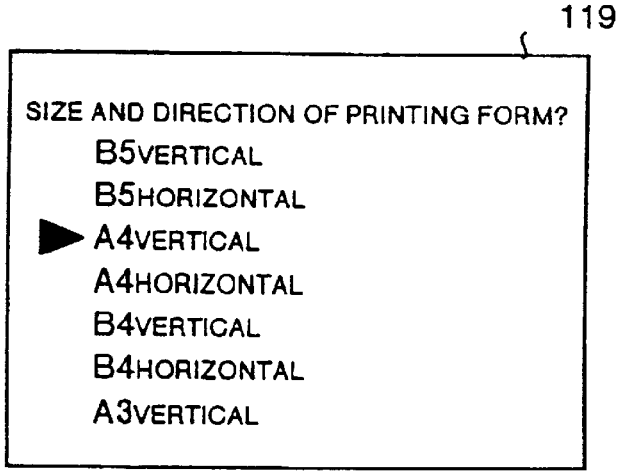

For instance, if "1. Input" is selected in the step, a menu screen for inputting picture information is displayed on the liquid crystal panel 119, and a user is prompted to input picture information. As the picture information to be inputted, there is information about a form size, an orientation of the form, a resolution, a magnification, an offset value (a position for starting printing on recording paper) or the like. Concretely, as shown in FIG. 4A and FIG. 4B, a plurality types of printer resolution as well as of form size and form direction in the printer are displayed and the user is prompted to select any of the data, thus input of picture information being executed easily.

It should be noted that, in this embodiment, an offset value and a magnification are automatically selected by the CPU 113 for the reasons as described below. Namely a main object of the present invention is to directly transfer image data to an image forming apparatus such as a printer without asking assistance by a computer, in other words, to transfer image data from the basic body 101 of the camera to the printer 301 as simply as possible, so that a plurality of offset values OX, OY and magnification n are previously prepared in the MEM 114 to simplify computing in processing for deciding layout described later.

Figure 5:
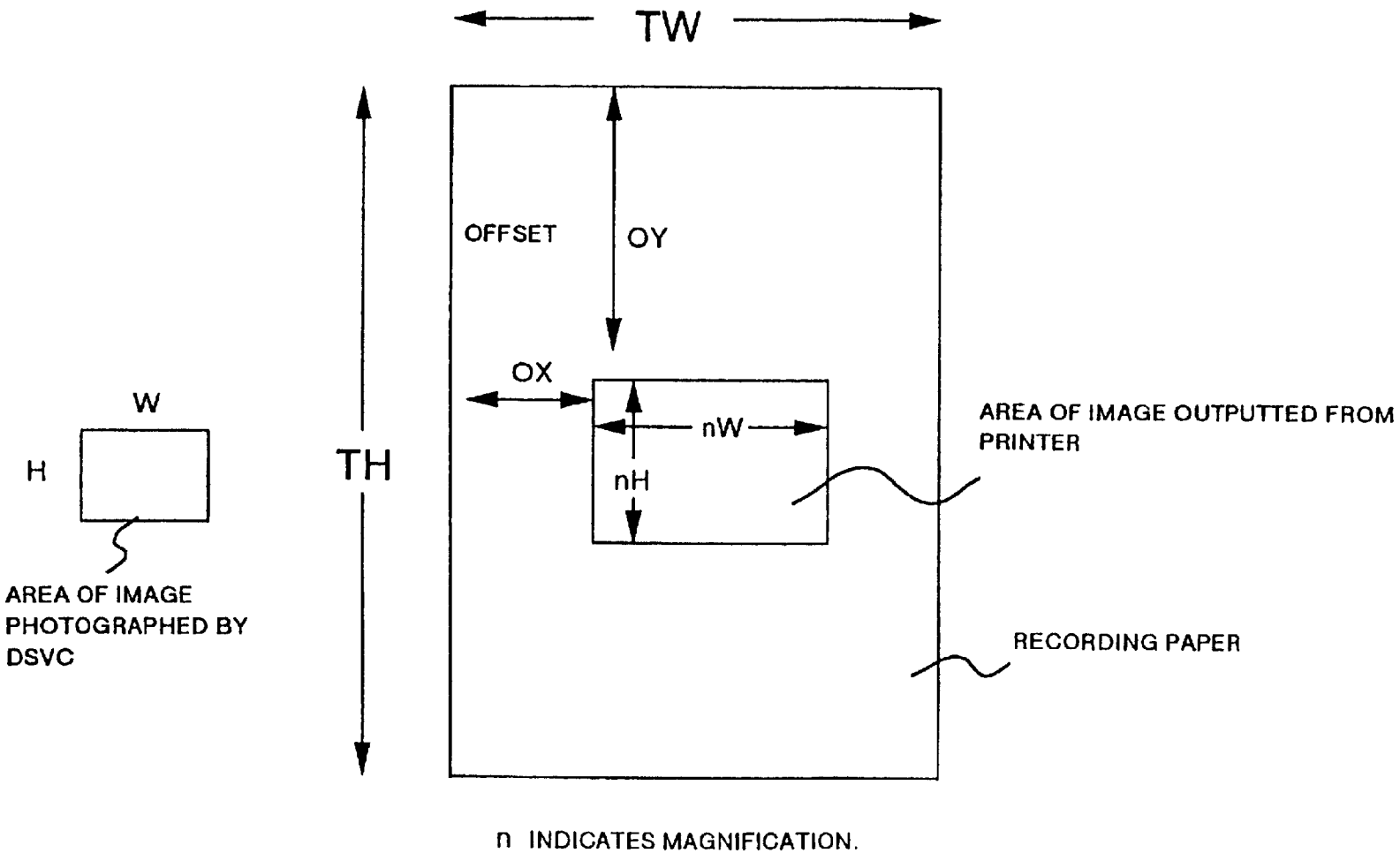
FIG. 5 is an explanatory view showing a relation among an image area for a digital still video camera, an offset value on recording paper, a magnification, and an image area outputted by the printer.

FIG. 5 shows a relation among an image area in a digital still video camera, offset values on recording paper, a magnification, and an image area outputted from a printer, and as shown in this figure, an area of an image photographed by a digital still video camera (pixels of width W×height H) is fixed, and a size of recording paper, an orientation of the recording paper, and a resolution are fixed (already known) when a request for output is issued. For this reason, a printing range on recording paper at the pixel level is already known, so that the processing for deciding layout described hereinafter can easily be executed by firstly selecting offset values OX and OY and executing computing to determine whether a size nW×nH (an area of an image outputted from the printer 303) with a default magnification n is in the printing range or not.

Then in a case where "2. Recording" is selected in step S301, the picture information inputted when "1. Input" was selected is stored in the MEM 114. Also in a case where "3. Deletion" is selected, the picture information stored in the MEM 114 is deleted.

2) Printing with an image data output system for a digital still video camera

Figure 6:
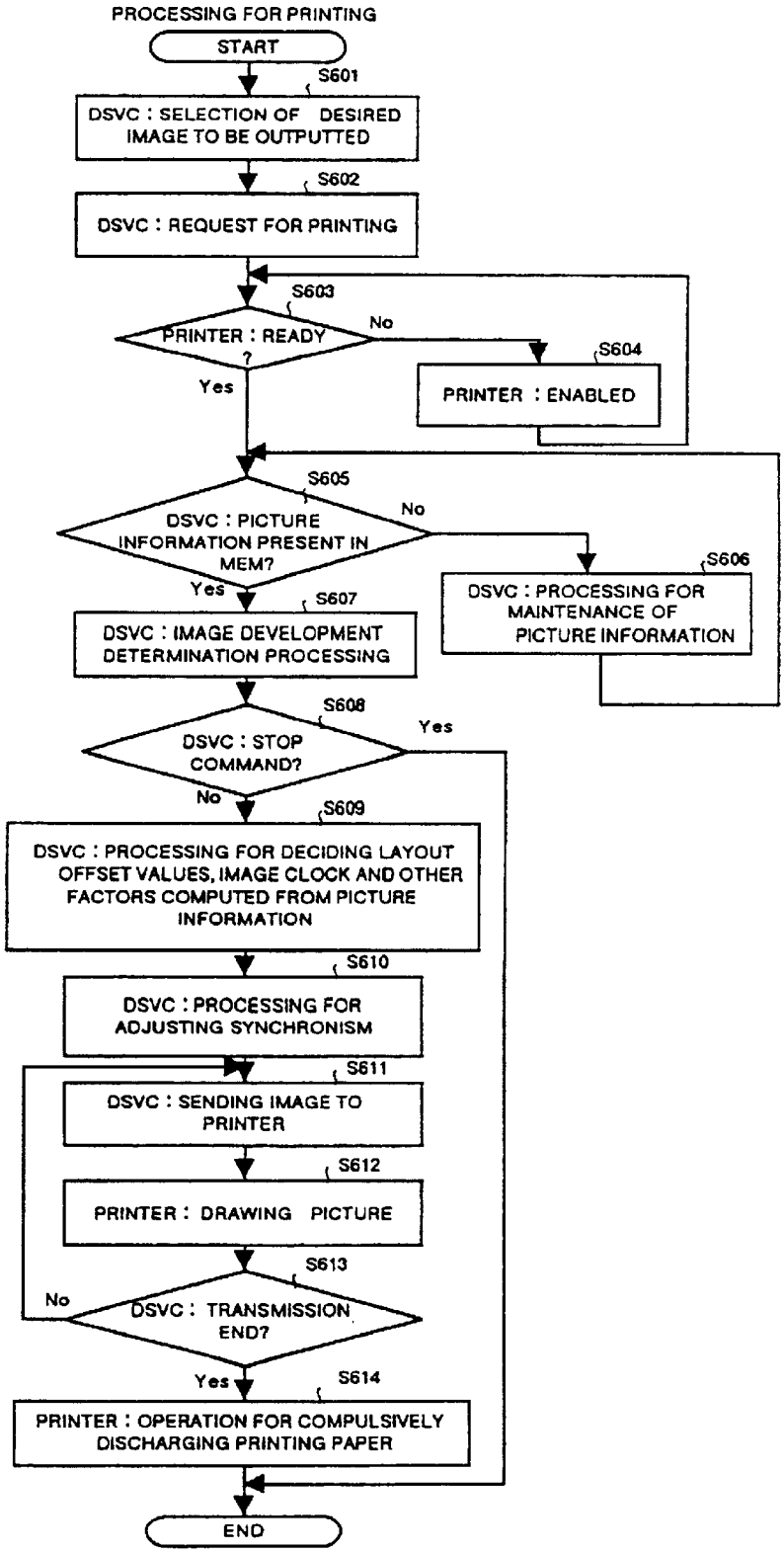
FIG. 6 is a flow chat showing an operational sequence in printing with an image data output system for the digital still video camera according to Embodiment 1.

FIG. 6 is a flow chart showing a processing sequence of printing by an image data output system for a digital still video camera according to Embodiment 1. It should be noted that, in the figure, processing in the side of the digital still video camera is described in "DSVC:", and processing in the side of the printer 301 is described as "printer:".

When printing is executed, if the printing mode is selected in the operation display section 116, the CPU 113 executes operations as shown in the flow chart in FIG. 6.

At first, when a user selects a desired output image using the liquid crystal panel 119 and the operation display section 116 (S601) and then inputs a request for printing (S602), the CPU 113 executes communications with a control section 305 in the printer 301 via the communication I/F section 122, I/F device 201, and I/F circuit 302, and determines whether the printer 301 is ready or not (S603).

If the printer 301 is not ready in this step, the printer 301 is automatically enabled in its side (S604). If the printer 310 is ready, determination is made as to whether picture information is stored in the MEM 114 or not (S605), and if any picture information is not stored therein, the picture information maintenance processing is executed (S606). In this case, the user inputs picture information according to the flow chart shown in FIG. 3 and records the picture information in the MEM 114.

In step S605, if picture information is stored in the MEM 114, the picture development determination processing shown in FIG. 7 as described later is executed, and determination is made as to whether the digital still video camera 301 can follow the printer 301 or not by estimating the time required for the image development processing from the picture information, and if it is determined that the digital still vide0 camera can not follow the printer 301, determination is made as to whether there is a empty memory space enough to develop the image in the memory card 103 or not, and if it is determined that there is a memory space enough to develop the image, the image is developed in the memory card 103, and if it is determined that there is not a memory space enough to develop the image, a stop command is issued (S607).

Then, determination is made as to whether a stop command has been insured in the image development determination processing or not (S608), and if it is determined that a stop command has been issued, the processing is terminated as it is. If it is determined that a stop command has not been issued, the layout deciding processing in FIG. 8 described later is executed to decide offset values and a magnification from the picture information, further a pixel clock (synchronizing signal) is computed (S609), adjustment for synchronism with the printer 301 is executed according to the image clock (S610), and the developed image data (or image data being developed) is sent to the printer 301 (S611).

When the printer 301 receives image data from the digital still video camera, the printer 301 draws the image on recording paper (S612).

The digital still video camera repeats operations in step S611 until transmission of all image data is finished, and when transmission is finished, system control advances to step S614 (S613). In step S614, when a signal indicating end of transmission is received, the printer 301 forcefully discharge recording paper, and terminates the processing. When the transmission is terminated, also processing in the side of the digital still video camera is terminated.

Figure 7:
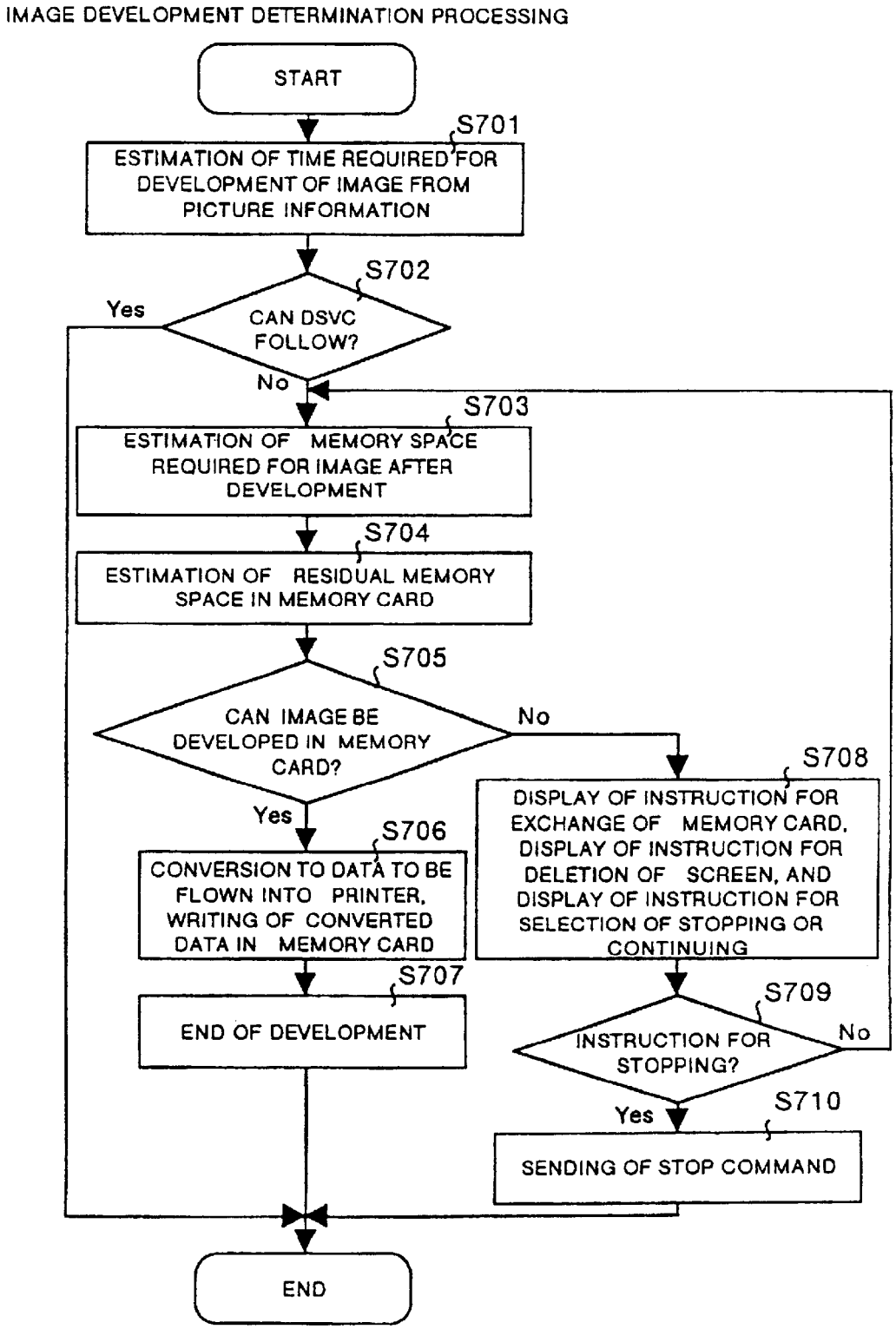
FIG. 7 is a flow chart showing an operational sequence in image development determination processing according to Embodiment 1.

Herein description is made for the image development determination processing with reference to FIG. 7. The CPU 113 estimates the time required for image development from the picture information stored in the MEM 114 (S701), and determines whether the digital still video camera can follow the printer 301 or not (S702). Herein if it is determined that the digital still video camera can follow the printer 301, it is possible to transfer the image, developing it, to the printer 301, so that the processing is terminated as it is. On the other hand, if it is determined that the digital still video camera can not follow the printer 301, the CPU 113 estimates a memory space required for storing the remaining portion of the image (S703), also estimates a residual memory space (empty memory space) in the memory card 103 (S704), and determines whether there is an empty memory space enough to develop the image in the memory card or not from the memory space required for storing the remaining portion of the image as well as from the residual memory of the memory card 103 (S705).

If it is determined that there is a sufficient memory space in step S705, the CPU 113 develops the image, converts the image to data capable of being flown to the printer 301 (or capable of being transferred), and writes the data in the memory card 103 (S706). When development is finished (S707), the processing is terminated as it is.

On the other hand, it is determined that there is not a sufficient memory space in step S705, the CPU 113 displays an instruction of replacement of the memory card 103, displays an instruction for deleting the image in the memory card 103, and also displays choices for stopping and continuing on the liquid crystal panel 119, to prompt the user to select any of the choices (S708). Herein if a user selects a choice for stopping or continuing through the operation display section 116, determination as to whether the processing is to be stopped or not is executed in step S709. For instance, if the user exchanges the memory card 103 with a new one or deletes the image in the memory card 103 and then selects a choice for continuing through the operation display section 116, the CPU 113 executes operations in step S703 to S705, and again executes determination as to whether the image can be developed in the memory card 103 or not. Also if the user selects a choice for stopping, the CPU 113 issues a stop command (S710), and terminates the processing.

Figure 8:
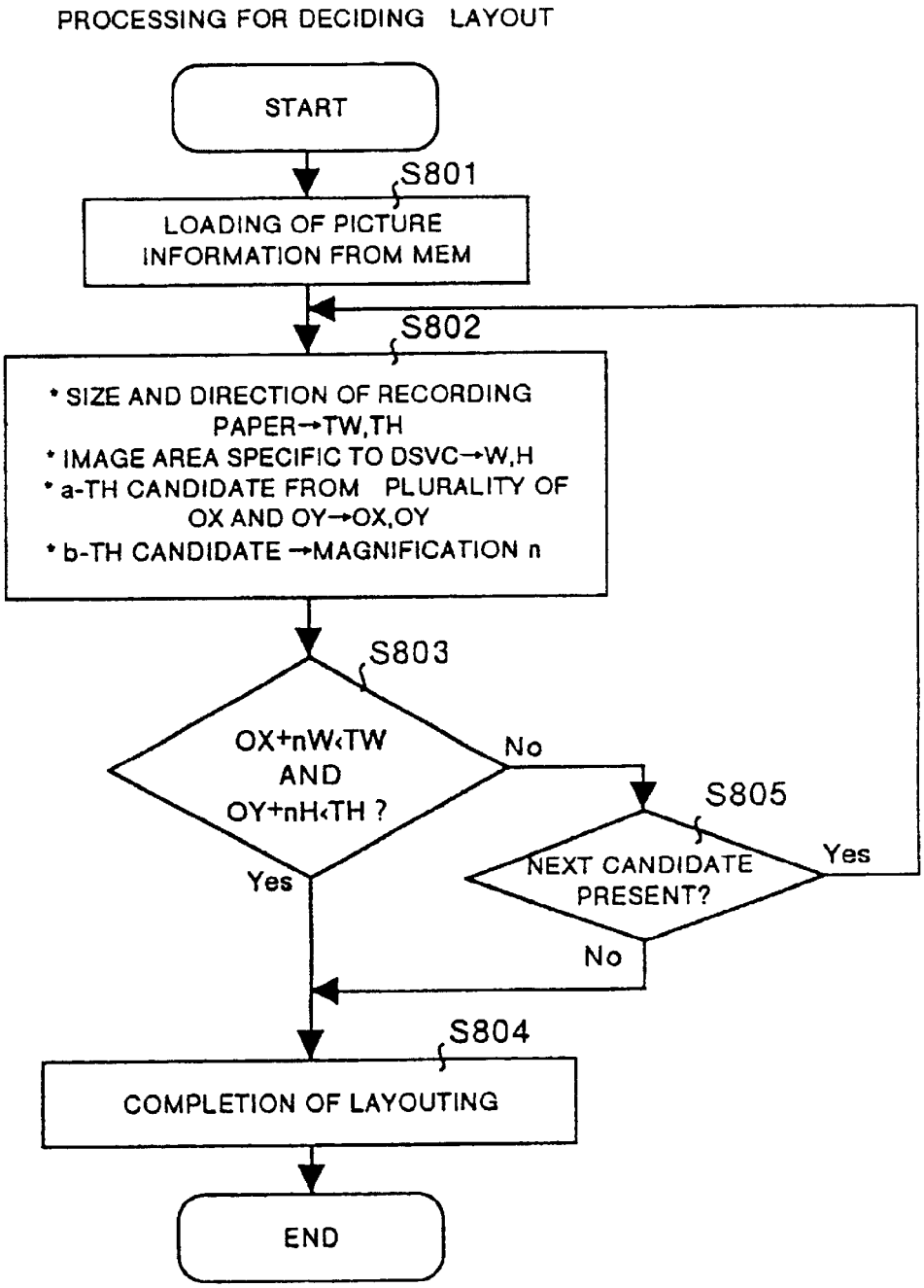
FIG. 8 is a flow chart showing an operational sequence in processing for deciding a layout according to Embodiment 1.

Then description is made for the processing for deciding layout with reference to FIG. 8. At first the CPU 113 loads picture information stored in the MEM 114 (S801), decides a printing range (width TW×height TH) on recording paper according to a size and an orientation of the recording paper, sets a fixed image area size (width W×height H) for the digital still video camera, selects particular offset values OX, OY as candidates (a-th candidate) from a plurality of offset values OX, OY, and then selects a particular magnification n as b-th candidate from a plurality of magnification n (S802).

Then the CPU 113 determines whether the image area (width nW×height nH) outputted from the printer 301 decided according to the selected magnification n can be accommodated within the printing range (width TW×height TH) on the recording paper when the selected offset values OX, OY (S803). Herein if the condition of $OX+nW<TM$ and the condition of $OY+nH<TH$ are satisfied simultaneously, the image area can be accommodated within the printing range on the recording paper, so that the CPU 113 terminates an operation for layout using the selected magnification n as well as selected offset values OX, OY (S804), and terminates the processing.

On the other hand, if the image area can not be accommodated within the printing range on the recording paper, the CPU 113 determines whether there is any alternative candidate or not (S805), and if it is determined that there is any candidate, system control returns to step S802, and if it is determined that there is not any alternative candidate, system control goes to step S804, and the CPU 113 terminates the processing.

As described above, with Embodiment 1, by previously inputting picture information stored in the printer 301 into MEM 114, the digital still video camera converts the image data to be sent to the printer 301 to image data adapted to the printer 301 according to the printer information, and sends the image data using a synchronizing signal adapted to the printer 301, so that the digital still video camera can directly transfer the image data to the printer 301 without interference by a computer. For this reason, a computer is not required, and image data in a digital still video camera having simple and low-cost configuration can be outputted to recording paper.

A digital still video camera according to Embodiment 2 of the present invention previously stores therein a plurality types of picture information each corresponding to a type of a printer (herein a connectable printer) in the MEM 114, selects desired picture information using the liquid crystal panel 119 and the operation display section 116, and the CPU 113 converts the image data to be sent to the printer 301 to image data adapted to the printer 301 according to the picture information, and sends the image data to the printer 301 using a synchronizing signal adapted to the printer 301. It should be noted that configuration in Embodiment 2 is the same as that in Embodiment 1 and description is made herein for only different portions.

In Embodiment 2, the present invention comprises a liquid crystal monitor 102 (liquid crystal panel 119) and the operation display section 116, the MEM 114 corresponds to a memory means according to the present invention, and a converting/sending means according to the present invention comprises the CPU 113, IPP 107, DCT 108, coder 109, and MCC 110.

Figure 9:
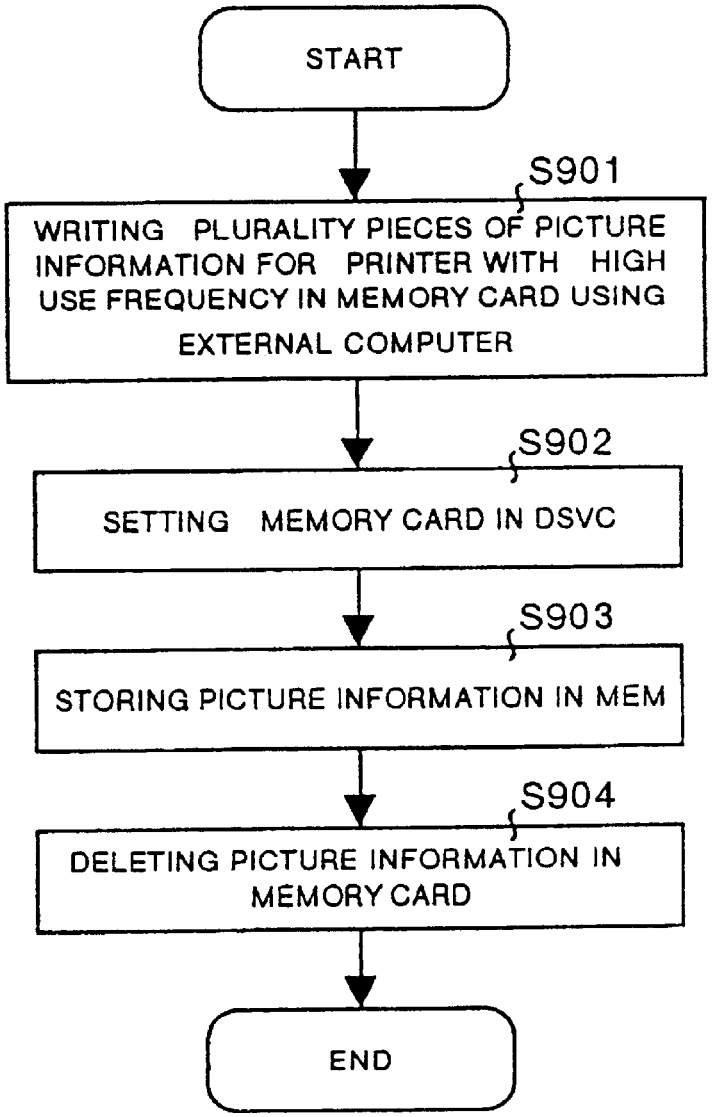
FIG. 9 is a flow chart showing an operational sequence in processing for setting picture information according to Embodiment 2 of the present invention.

FIG. 9 is a flow chart showing the processing for setting picture information according to Embodiment 2, and at first a plurality types of picture information for a printer frequently used are recorded in the memory card 113 using an external computer (S901), the memory card 103 with the picture information recorded therein is set in a digital still video camera (DSVC) (S902), the picture information is stored from the memory card 103 into the MEM 114 (S903), and then the picture information in the memory card 103 is deleted (S904). With the operations described above, picture information is previously stored in the MEM 114.

Figure 10:
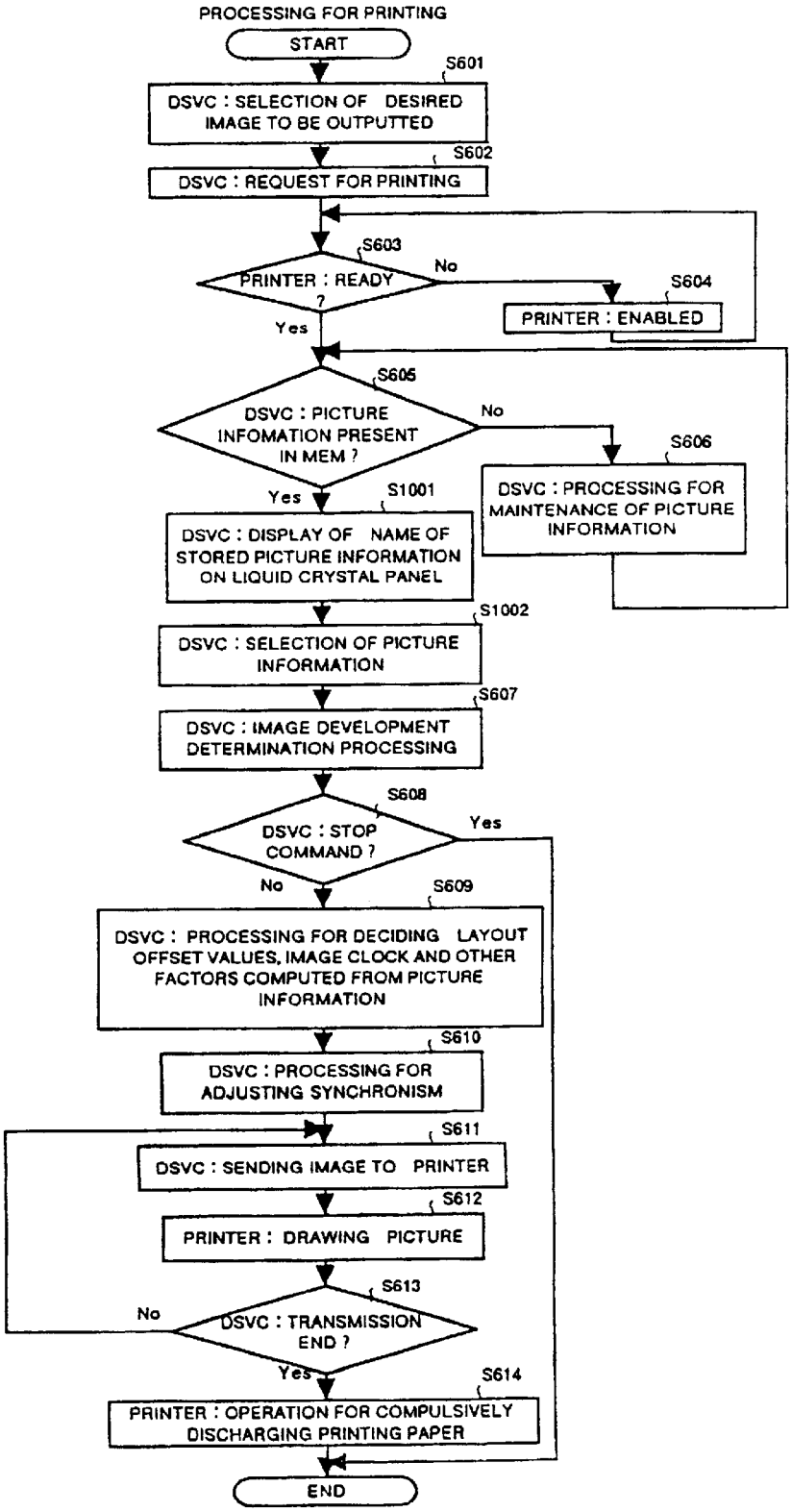
FIG. 10 is a flow chart showing an operational sequence in printing with an image data output system for a digital still video camera according Embodiment 2.

FIG. 10 is a flow chart showing a printing operation with an image data output system for the digital still video camera according to Embodiment 2, and this flow chart is basically the same as that according to Embodiment 1 shown in FIG. 6, and common step numbers indicate the same processing. Also, in this figure, the processing in the side of the digital still video camera is described as "DSVC", and that in the side of the printer 301 is described as "printer".

At first a user selects an image the user hopes to output and then inputs a printing request (S601, S602), when the CPU 113 determines whether the printer 301 is ready or not, and enables the printer 301 (S603, S604). If it is determined that the printer 301 is ready for printing, the CPU 113 determines whether picture data is stored in the MEM 114 or not (S605), and if it is determined that any picture information is not stored in the MEM 114, the CPU 113 executes the picture information maintenance processing (S606).

If it is determined in step S605 that picture information is stored in the MEM 114, names of the stored picture information is displayed on the liquid crystal panel 119 (S1001), and a user is prompted to select any picture information (S1002). Herein when the user selects any picture information, the CPU 113 determines the image development determination processing (S607), and executes the subsequent steps S608 to S614 like in Embodiment 1.

As described above, with Embodiment 2, picture information for the printer 301 is previously stored in the MEM 114 and the picture information for the printer 301 to be used is selected when actually a printing operation is executed, when the digital still video camera converts image data to be sent to the printer 301 to image data adapted to the printer 301 according to the picture information according to the picture information, and at the same time the image data using a synchronizing signal adapted to the printer 301 is sent, so that it is possible to directly transfer image data to the printer 301 without requiring interference by a computer. For this reason, a computer is not required and image data in a digital still video camera can be outputted to recording paper with low cost configuration.

Also as specific information is included in the picture information, general users sometimes get embarrassed, but as it is possible to consistently manage picture information for each printer (image forming apparatus) using a computer and to fetch a plurality types of picture information into the MEM 114 through the memory card 103, so that printing can easily be executed easily even in a case where a user not having any special knowledge uses a digital still video camera. Also a work load for inputting picture information can largely be reduced.

A digital still video camera according to Embodiment 3 of the present invention reads picture information from the printer 301 when outputting image data through the printer 301, converts the image data to be sent to the printer 301 to image data adapted to the printer 301 according to the picture information read as described above, and sends the image data using a synchronizing signal adapted to the printer 301.

Figure 11:
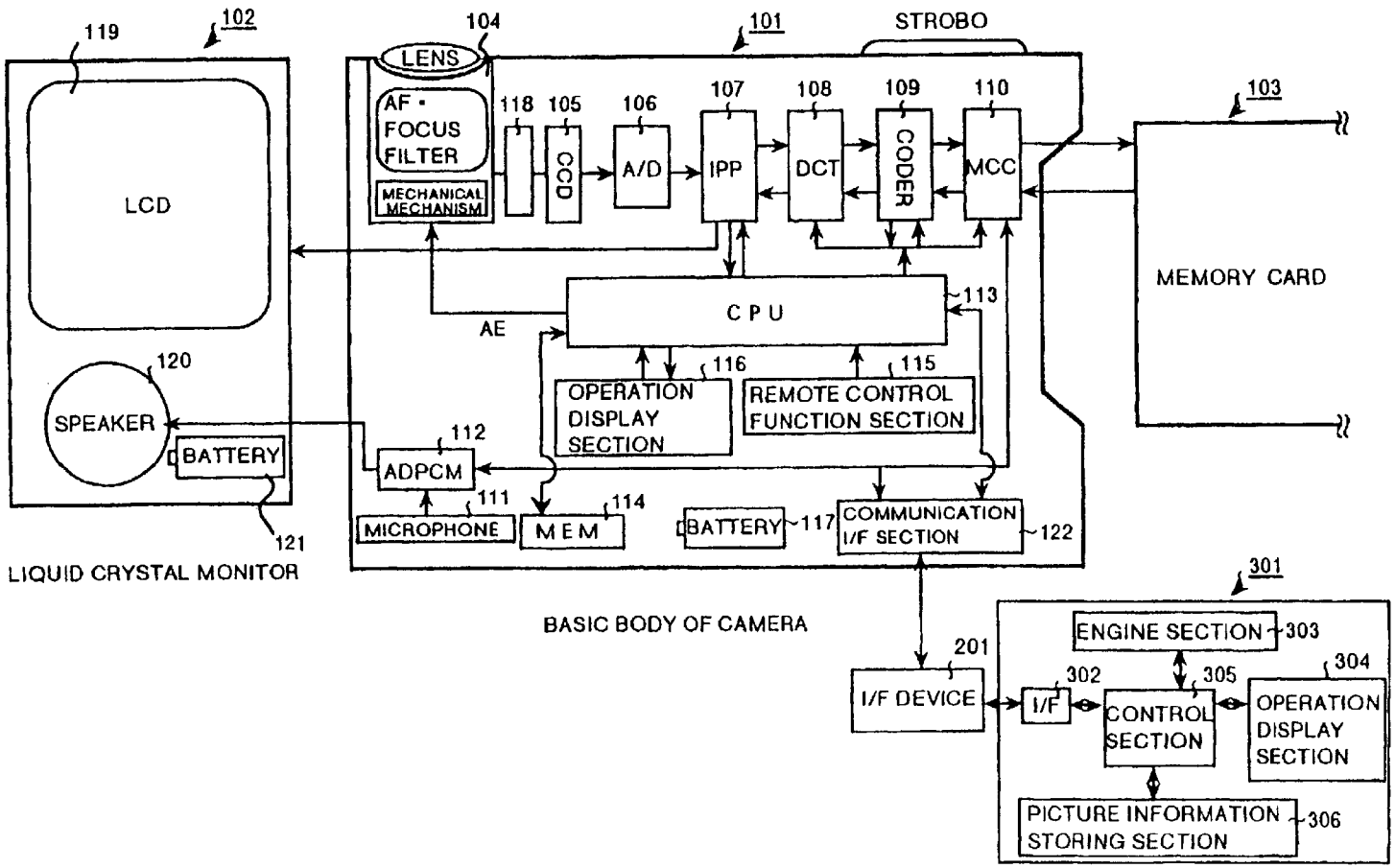
FIG. 11 is a block diagram showing a digital still video camera and an image data output system for a digital still video camera according to Embodiment 3 of the present invention.

FIG. 11 is a block diagram showing configuration of the digital still video camera according to Embodiment 3 as well as of an image data output system for the digital still video camera. Configuration according to Embodiment 3 is realized by adding in the configuration according to Embodiment 1 shown in FIG. 1 a picture information storing section 306 with picture information for the device to the printer 301 stored thereon. Other portions of the configuration are basically the same as those in Embodiment 1, so that description thereof is omitted herein.

It should be noted that, in Embodiment 3, the picture information storing section 306 corresponds to a first memory means according to the present invention, the control section 305 corresponds to a sending means according to the present invention for sending picture information stored in the picture information storing section 306 to the side of the digital still video camera in response to a request from the digital still video camera, the CPU 113 corresponds to a picture information reading means according to the present invention for requesting the control section 305 to send picture information and reading the picture information in a case where the CPU 113 outputs image data through the printer 301, and the MEM 114 corresponds to a second memory means according to the present invention for storing therein the picture information read from the CPU 113. A converting/sending means according to the present invention comprises the CPU 113, IPP 107, DCT 108, coder 109, and MCC 110.

Figure 12:
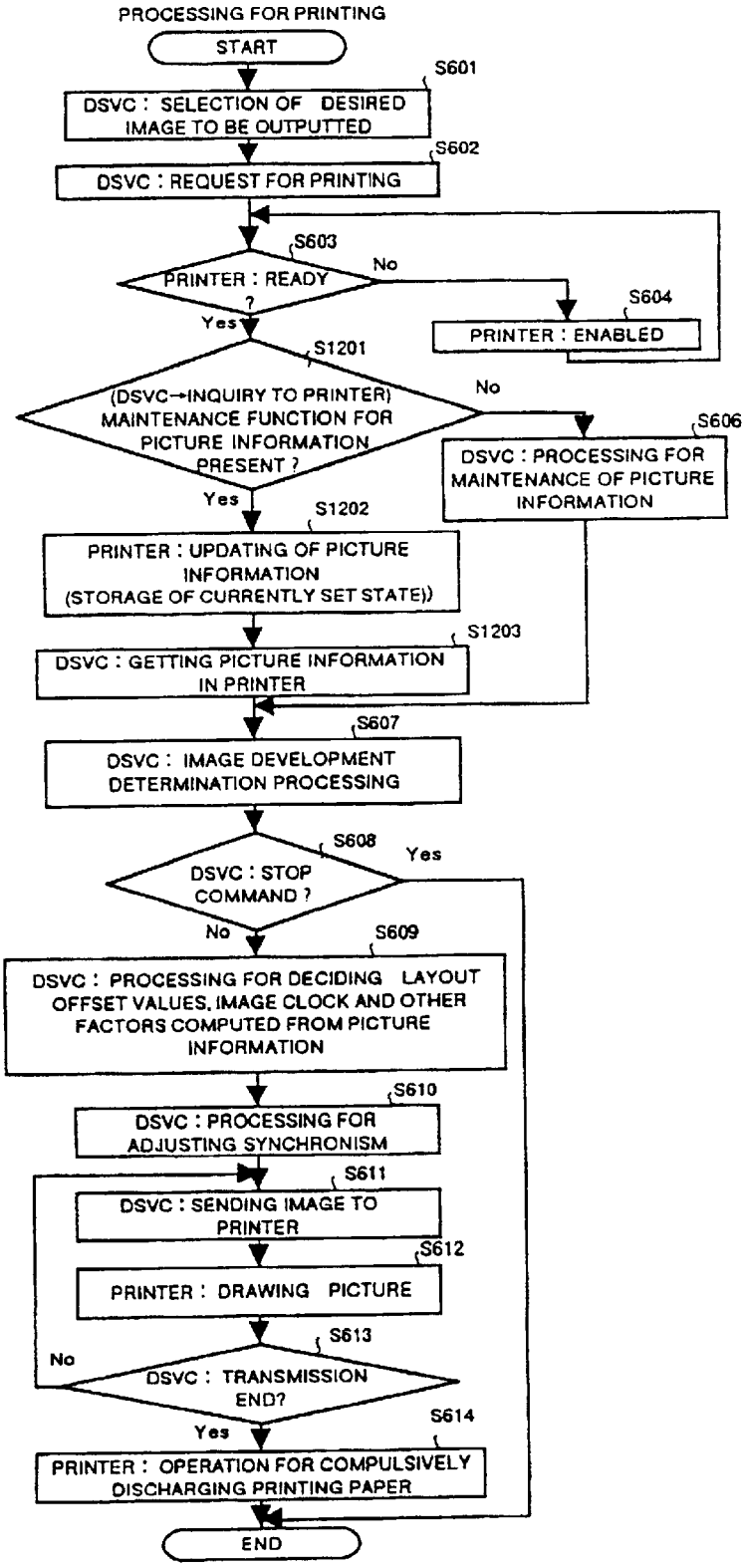
FIG. 12 is a flow chart showing an operational sequence in printing with an image data output system for a digital still video camera according to Embodiment 3.

FIG. 12 is a flow chart showing operations for printing by an image data output system for the digital still video camera according to Embodiment 3 of the present invention, and the flow chart is basically the same as that shown in Embodiment 1 shown in FIG. 6 with the common step numbers indicating the same processing respectively. Also in this figure, the processing executed in the side of the digital still video camera is described as "DSVC:", and that executed in the side of the printer 301 is described as "Printer:".

At first a user selects a desired image to be outputted and then inputs a request for printing (S601, S602), when the CPU 113 determines whether the printer 301 is ready for printing or not, and enables the printer (S603, S604). If the printer 301 is ready for printing, the CPU 113 sends an inquiry concerning the state of the printer 301 to the control section 305 of the printer 301, and determines whether the maintenance function for picture information is available or not (S1201).

In step S1201, if it is determined that the maintenance function for picture information is not available in the side of the printer 301, the picture information maintenance processing in step S606 is executed and the digital still video camera receives the picture information, and then the CPU 113 executes operations in step S607 to step S614.

On the other hand, in step S1201, if it is determined that the picture information maintenance function is available in the side of the printer 301, system control advances to step S1202. In step S1202, the control section 305 of the printer 301 makes the current set-up state (picture information) stored in the picture information storing section 306. On the other hand, the CPU 113 inputs the picture information stored in the picture information storing section 306 from the printer 301 to the MEM 114 to store the picture information therein (S1203). Then the CPU 113 executes subsequent operations in steps S608 to S614 like in Embodiment 1.

As described above, with Embodiment 3 above, by previously storing picture information in the picture information storing section 305 in the side of the printer 301, it becomes possible to further easily and quickly set the picture information. Also by deciding specifications for a format of picture information, picture information can be used also from other equipment (such as, for instance, a computer).

Figure 13:
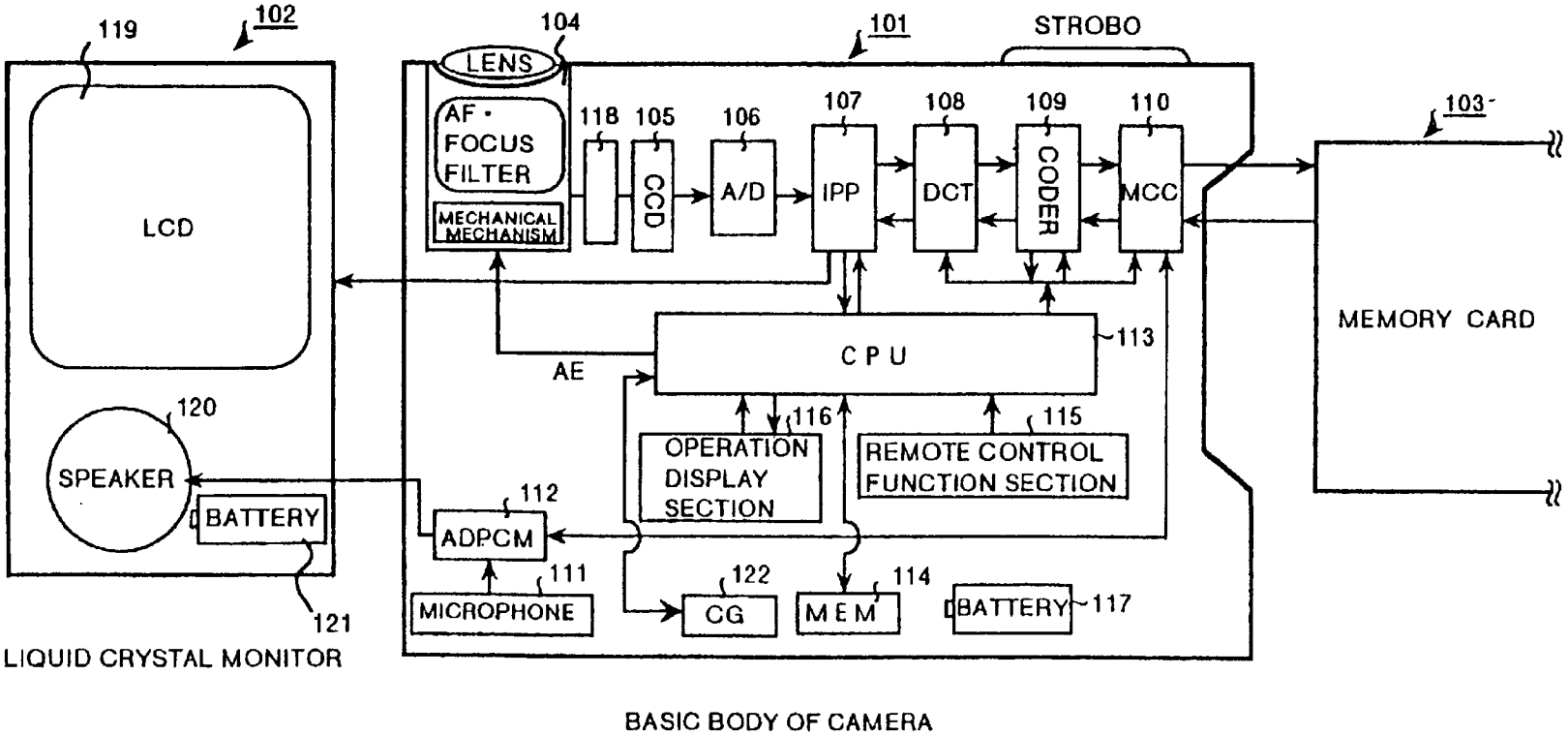
FIG. 13 is a block diagram showing a digital still video camera according to Embodiment 4 of the present invention.

FIG. 13 is a block diagram showing configuration of a digital still video camera according to Embodiment 4, and the digital still video camera according to Embodiment 4 largely comprises the basic body 101 of the camera, the liquid crystal monitor 102 as an image displaying means for displaying image data and various types of information, and the memory card 103 as a recording medium for recording a photographed image.

The basic body 101 of the camera comprises a lens unit 104 comprising a lens, an automatic focus (AF), an iris, a filter, a mechanical component or the like; a CCD (charge coupled device) 105 for converting an image inputted through the lens unit 104 to an electric signal (analog image data); an A/D converter 106 for converting analog image data inputted from the CCD 105 to digital image data; an IPP (image pre-processor) 107 for dividing the digital image data inputted from the A/D converter 106 to data for color difference and those for luminance and subjecting the divided data to data processing for various processing, correction and compression/extension of images; a DCT (Discrete Cosine Transform) 108 for executing D/A conversion which is a step of image compression/extension based on the JPEG standard; a coder (Huffman Encoder/Decoder) 109 for executing encoding and decoding each as a process of the image compression/extension based on the JPEG standard; an MCC (Memory Card Controller) 110 for temporally storing therein compressed image data and voice data fetched from a microphone 111 and digitalized therein, subjecting the image data and voice data to synchronization, and recording the data in or reading the data from the memory card 103; a microphone 111 which is voice data generating means for inputting voices and generating voice data; an ADPCM (Adaptive Differential Pulse Code Modulation) 112 for converting voice inputted through the microphone 111 to digital data and also subjecting the voice data to processing for compression or extension; a CPU 113 for controlling each of the sections described above; an MEM 114 which is a work memory for a system consisting of a ROM and a RAM; a remote control function section 115 having a remotely controlled receiving function; an operation display section 116 for key entry for various types of buttons and switches described later as well as for display control of a display panel; a battery 117 for supplying an electric power to each of the sections described above; an optical low-pas filter 118 provided between the lens unit 104 and the CCD 105; and a CG (character information generating device) 122 for generating character code.

The liquid crystal monitor 102 comprises at least the liquid crystal panel (LCD) 119 and the speaker 120. It should be noted that the reference numeral 121 indicates a battery for the liquid crystal monitor 102.

In FIG. 13, the CPU 113 and a CG 122 play a role as a character code generating means according to the present invention, control programs in the CPU 113 and MEM 114 play roles as a recording control means, a voice data regenerating means, and a regeneration control means each according to the present invention, and the speaker 120 plays a role as a voice output means according to the present invention.

Figure 14A:
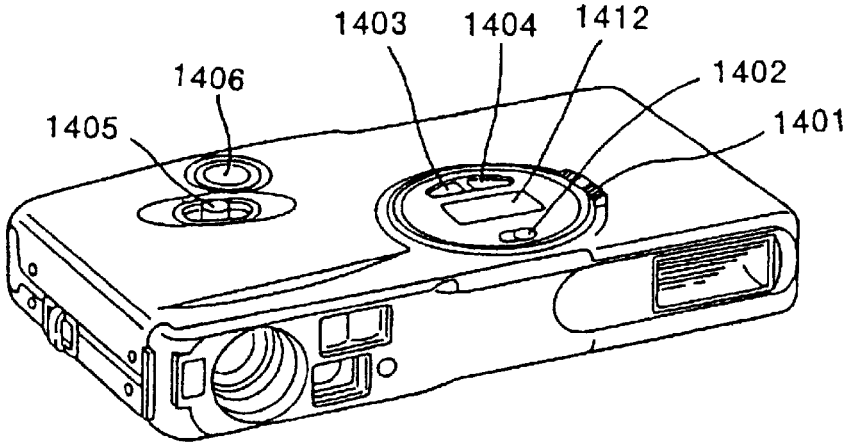
FIGS. 14A and 14B are appearance views showing the digital still video camera according to Embodiment 4.
Figure 14B:
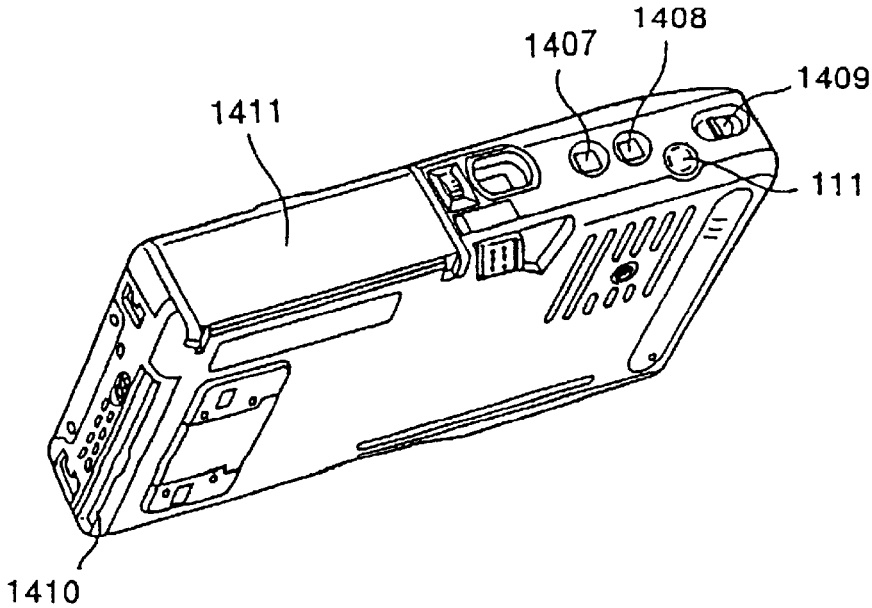

FIG. 14A and FIG. 14B are views each showing appearance of a digital still video camera according to Embodiment 4. The digital still video camera according to Embodiment 4 has various types of recording mode (operating mode) including a still picture mode for recording a photographed image as a still picture, a successively photographing mode for recording still pictures successively, a voice mode for recording a voice, a still picture+voice mode for simultaneously recording a still picture and voices, a moving picture mode for recording moving picture like a vide camera, a moving picture+voice mode for simultaneously recording moving pictures and voices, and a character mode for clearly recording characters or the like.

FIG. 14A and FIG. 14B are views each showing appearance of the basic body 101 of the camera. Herein description is made arrangement of various types of buttons and switches and a display panel each constituting the operation display section 116 with reference to the figures. As the various types of buttons and switches, there are provided a main switch 1401 for the basic body 101 of the camera which is a select switch for selecting any of the following three stages: power OFF, power ON (recording mode), and power ON (regenerating mode), a self mode button 1402 for setting a photographing mode with a self-timer (self mode), a strobo/deletion button 1403 for setting a mode concerning light emission from a strobo, a recording mode button 1404 for setting a recording mode, a zoom lever 1405 for changing a size of an object to be photographed inside a finder, a release button 1406 which is a 2-stage button for enabling an operation of an automatic focus when lightly pressed down and for starting an operation for recording into the memory card 103 when fully pressed down, a date button 1407 for adjusting a display concerning date, a time button 1408 used for adjusting display for time, and an image quality mode switch 1409 for switching an image quality mode (for instance, between the economy mode in which a number of copies to be prepared is preferentially treated and a normal mode in which an image quality is preferentially treated).

It should be noted that, in this figure, the reference numeral 1410 indicates a card insertion port for inserting the memory card 103, and the reference numeral 1411 indicates a battery cover for a battery section in which the battery 117 is accommodated. Also as shown in this figure, the microphone 111 is provided therein.

Also the reference numeral 1412 indicates a display panel, and as shown in this figure, the display panel is provided on a top surface of the basic body of the camera, and displays a state of the battery and a state of a camera such as a number of sheets which can be prepared, a set mode, or the like with marks or figures.

Figure 15:
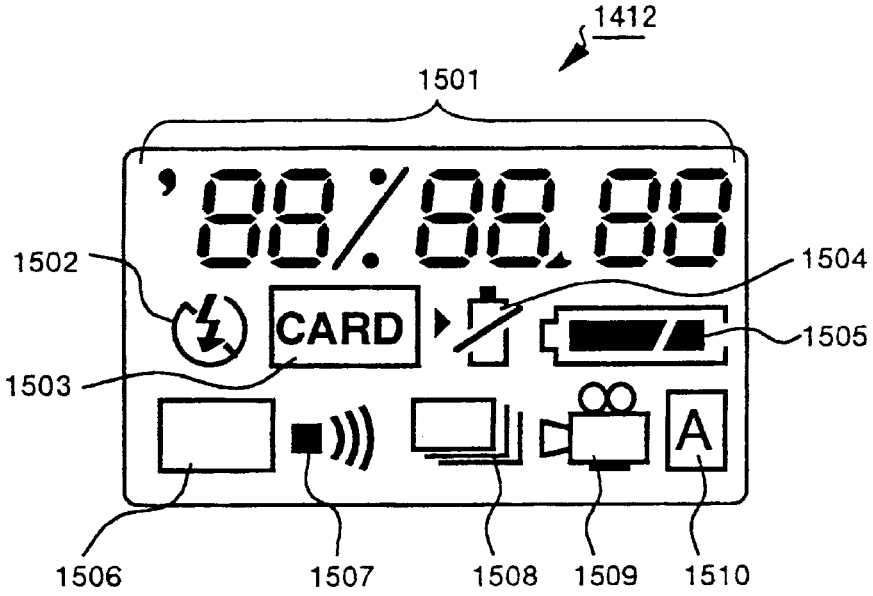
FIG. 15 is an explanatory view showing a display screen on a display panel according to Embodiment 4.

FIG. 15 shows a display screen of the display panel 1412, and the display panel 1412 comprises a recorded information display section 1501 used in recording for displaying a number of remaining copies to be prepared, a remaining period of time, a date, a time, and a card state as well as for an operating mode and also used in regenerating for displaying an image file number, a counter, a card state, and an operation mode; a strobo display section 1502 for showing whether the strobo has been used or not and can be used or not; a card display section 1503 showing whether the memory card 103 has been set or not; a battery mark section for a memory card 1504 showing a residual charge of the battery for the memory card 103; a battery mark 1505 showing a residual charge of the battery 117; a still image mode display section 1506 for displaying that the sill picture mode has been set; a voice mode display section 1507 showing that the voice mode has been set, a successively photographing mode display section 1508 showing that the successively photographing mode has been set; a moving picture mode display section 1509 showing that the moving picture mode has been set, and a character mode display section 1510 showing that the character mode has been set.

It should be noted that, although the figure shows the state in which all types of information are displayed simultaneously, but practically only required information is displayed. Also in Embodiment 4, as described later, it is assumed that display of the still picture+voice mode is provided by using the still picture mode display section 1506 and the voice mode display section 1507 and also display of the moving picture +voice mode is provided by using the moving picture mode display section 1509 and the voice mode display section 1507.

Figure 16:
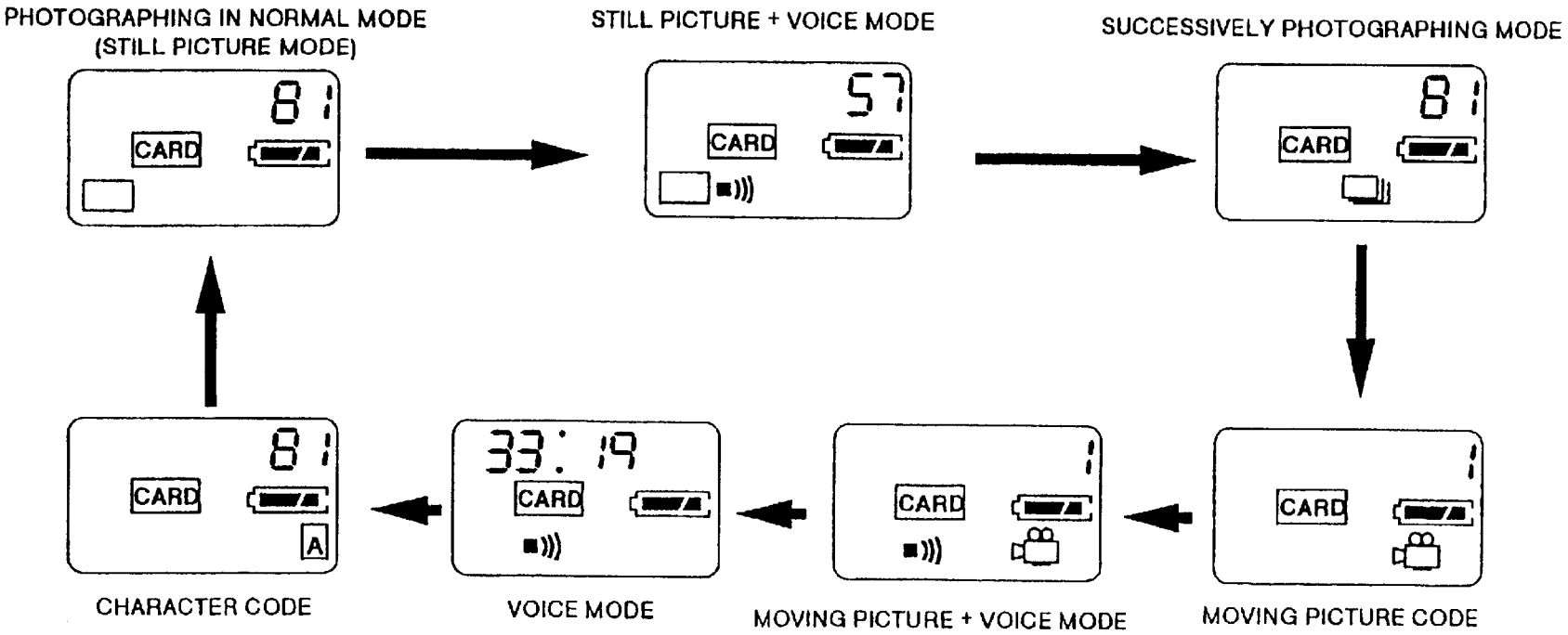
FIG. 16 is an explanatory view showing a switching state of the display screen on the display panel according to one of set record modes.

FIG. 16 shows switching of a display screen of the display panel 1412 in the recording mode set as described above, and each time the recording mode button 1404 shown in FIG. 14A is pressed down, the display screen of the display panel 1412 changes in the order of, for instance, "still picture mode", "still picture+voice mode", "successively photographing mode", "moving picture mode", "moving picture+voice mode", "voice mode", "character mode", and "still picture mode".

Figure 17:
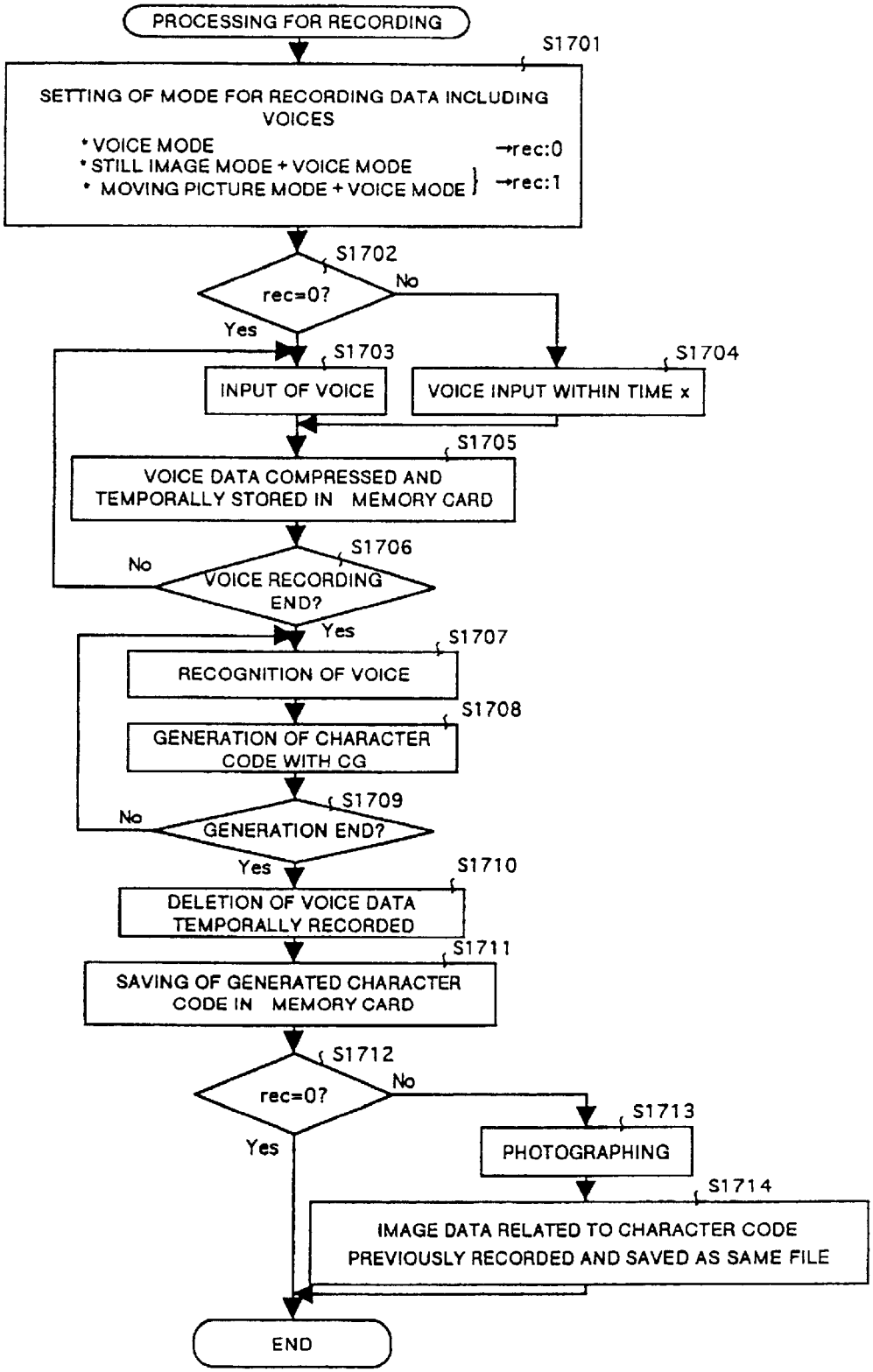
FIG. 17 is a flow chart showing an operational sequence in processing in the mode for recording data including voices according to Embodiment 4.

With the configuration described above, description is made for the operations. FIG. 17 is a flow chart showing an operational sequence in the processing in the recording mode for recording information including therein voices. In Embodiment 4, the camera has three types of recording mode; a voice mode, a still-picture+voice mode, and a moving picture+voice mode each as a mode for recording data including voices. When the main switch 1401 of the basic body of a camera is turned to power ON (a recording mode) and recording mode button 1404 is pressed down to switch a display screen on the display panel 1412 to that for a desired mode for recording data including voices as shown in FIG. 16, the CPU 113 executes processing according to the flow chart shown in FIG. 17.

At first if the selected mode is a voice mode for recording data including voices, zero is set in a mode flag rec, and if it is a still picture+voice mode or a moving picture+voice mode, 1 is set in the mode flag rec (S1701).

Then determination is made as to whether the recording mode rec is 0 or not (S1702), and if it is determined that rec=0, a user executes a voice input through the microphone 111 as long as a user desires (S1703), then system control goes to step S1704. On the other hand, if it is determined that rec is not 0, a user executes a voice input through the microphone 111 within a preset period of time x (S1704), then system control goes to step S1705.

In step S1705, the inputted voice data is converted to digital data with the ADPCM 112, and is compressed and temporarily stored in the memory card 103. Then, the CPU determines whether voice recording is complete or not (S1706) and repeats step S1703 and step S1705 until the voice recording is finished. It should be noted that, in a case wherein the recording mode rec is not 0 (namely, a case of rec=1), the voice recording is finished within the x period of time through step S1704, so that it is determined that the voice recording is always finished in step S1706, then system control goes to step S1707.

In step S1707, the CPU 113 identifies corresponding character information by recognizing voices using the voice data temporarily stored in the memory card 103. Then the CPU 113 generates character code for the corresponding character information by controlling the CG 122 (S1708), and determination is made as to whether generation of character code is finished or not, in other words, whether all of the voice data has been converted to character code or not (S1709), then the CPU 113 repeats step S1707 and step S1708 until generation of all the character code is finished.

In step S1709, in a case where it is determined that generation of the character code is finished, the CPU 113 deletes the voice data temporarily stored in the memory card 103 (S1710), and saves (records) the generated character code in the memory card 103 (S1711).

Then, determination is again made as to whether the recording mode rec is 0 or not (S1712), and if it is determined that rec=0, it is determined that the mode is a voice mode for recording therein only voices, so that the CPU 113 terminates the processing as it is. On the other hand, if it is determined that rec is not 0, the mode is a still picture+voice mode or a moving picture+voice mode each for recording images other than voices, so that the CPU 113 photographs an image (S1713), saves (records) the inputted image data with reference to the character code previously recorded in the memory card 103 as an identical file (S1714), and terminates the processing.

With the processing as described above, the character code generated according to the inputted voice data and the image data related to the character code are recorded in the memory card 103 as an identical file. For this reason, the voice data is recorded therein as character code which can easily be processed by the computer, so that the character code (namely, the inputted voice data) can easily be made use of as an information source for other processing, which makes it possible to improve the operability, workability, convenience in use of the digital still video camera.

Figure 18:
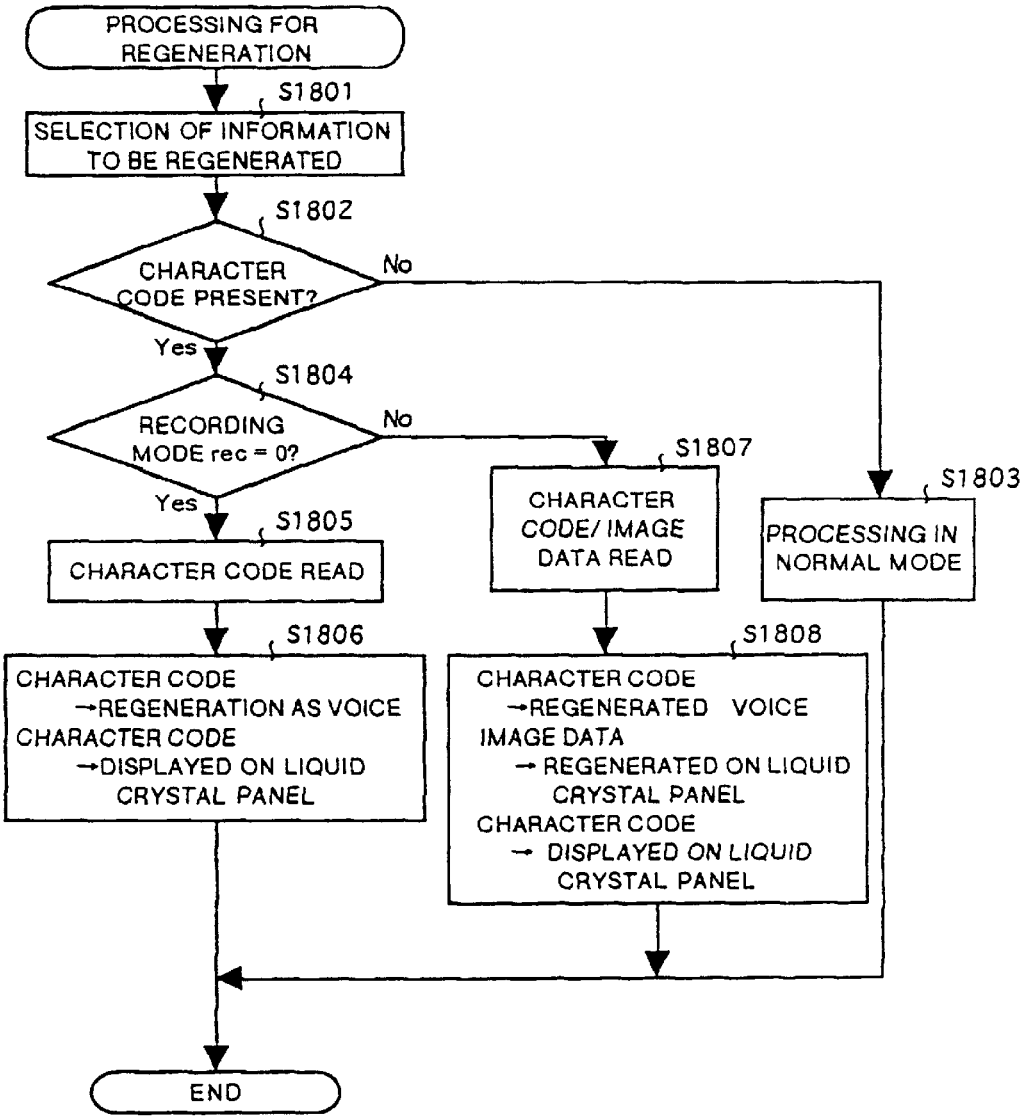
FIG. 18 is a flow chart showing an operational sequence in processing in the mode for regenerating data including therein voices according to Embodiment 4.

Next description is made for regeneration processing in the mode for recording data including voices with reference to FIG. 18. FIG. 18 is a flow chart showing an operational sequence in the regeneration processing in the mode for recording data including voices. When a power is turned ON (a regenerating mode) by operating the main switch 1401 of the basic body of a camera, the CPU 113 executes processing according to the flow chart shown in FIG. 18.

At first, when a power is turned ON by operating the main switch 1401 in the regenerating mode, the CPU 113 displays a file name or a number of the information (images and voices) recorded in the memory card 103 on the liquid crystal panel 119, and prompts a user to select information for regeneration. Herein, when the user selects desired information to be regenerated from the file name or the number each displayed on the liquid crystal panel 119 through the operation display section 116 (S1801), the CPU 113 determines whether character code is included in the selected information to be regenerated or not (S1802).

In a case where it is determined that there is not character code in the selected information to be regenerated, system control goes to step S1803, and the CPU 113 executes the ordinary regeneration processing and terminates the processing although detailed description thereof is omitted herein.

Also, in a case where it is determined that there is character code in the selected information to be regenerated, determination is made as to whether the recording mode rec=0 or not (S1804), and if it is determined that rec=0, the CPU 113 reads out the character code for the corresponding information to be regenerated from the memory card 103 (S1805), regenerates the character code to voice data, regenerates the voice data to voices through the speaker 120 for outputting, and displays the character code on the liquid crystal panel 119 (S1806), and then terminates the processing.

If it is determined that rec is not 0, as the regeneration information indicates that it has character code and image data, the CPU 113 reads the character code and the image data each for the corresponding regeneration information from the memory card 103 (S1807), regenerates the character code to voice data, then regenerates the voice data to voices through the speaker 120 for outputting, regenerates the image data to be displayed on the liquid crystal panel 119, and further displays the character code on the liquid crystal panel 119 (S1808), and terminates the processing.

Figure 19:
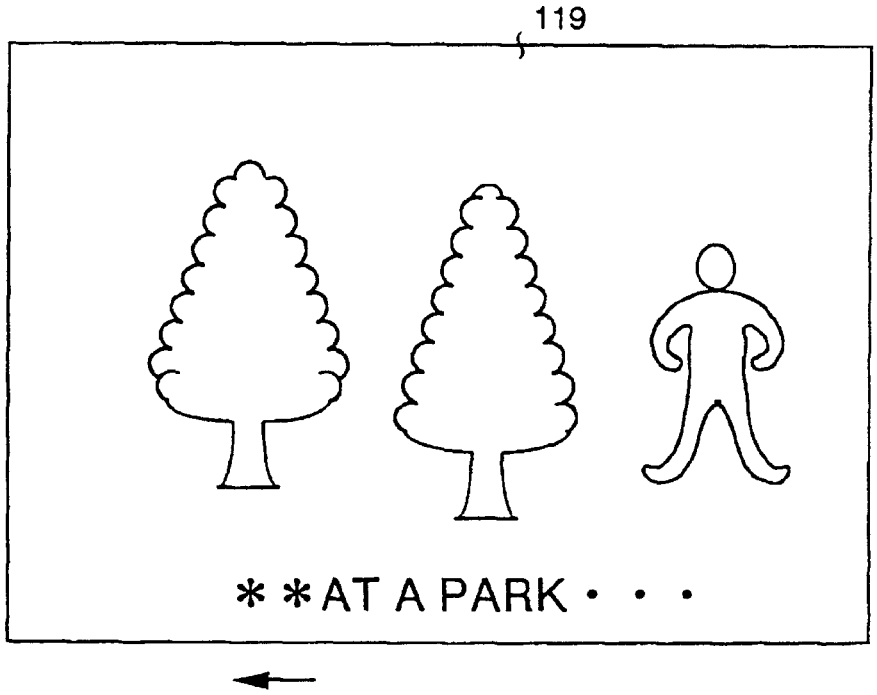
FIG. 19 is an explanatory view showing an example of displaying image data as well as character code each regenerated on the liquid crystal panel.

FIG. 19 shows an example of display of image data as well as character code each regenerated on the liquid crystal panel 119 in step S1808. As for display of character code, as shown in the figure, there may be employed a method of repeatedly displaying character code in the lower section of the screen on the liquid crystal panel 119 by scrolling the screen in the direction indicated by the arrow, or a method of displaying character code in the lower section of the screen as it is if only a small number of characters are included in the data, so that the method is not particularly limited to the methods described above. Also, in a case where the information to be regenerated includes only voice data, a method of displaying the information page by page on the screen of the liquid crystal panel 119 can be used.

As described above, in Embodiment 4, as voice data is previously converted to character code to be recorded in the memory card 103, the character code can be converted to and regenerated as voices (voice data), and can also be recognized by displaying the character code on the liquid crystal panel 119, which makes it possible to improve the convenience for users in use thereof.

Furthermore, by recording therein character code converted from voices, for instance, it is possible to fetch the character code on a personal computer which is an external device and to edit it to a document (for instance, by pasting) as it is (or by converting it to kanji). Reversely, by recording a document edited on the personal computer in the memory card 103 and regenerating it with the digital still video camera, image data and character code (kanji) can simultaneously be regenerated. Also, even in a case where voices are hardly heard, or even in a case where voices can not be outputted, it is possible to know the information with the characters displayed on the screen. In other words, by making use of the inputted voice data as an information source for other processing, the operability, workability, and convenience in use of the digital still video camera can be improved.

Also, after voice data is inputted to generate character code, an image is photographed and image data for the image is generated, then the character code and image data are recorded in a recording medium as an identical file, so that it is easy to relate character code to image data.

The digital still video camera according to Embodiment 5 generates voiceprint information from the inputted voice data, and determines whether the digital still video camera is enabled or is inhibited to use by making use of the voiceprint information, whereby security of the information can be improved. It should be noted that the configuration in Embodiment 5 is basically the same as that in Embodiment 4 shown in FIG. 13, so that description is made hereinafter only different portions.

In Embodiment 5, the CPU 113 and the CG 122 in FIG. 13 play a role as a character code generating means according to the present invention, control program in the CPU 113 and MEM 114 play roles as a recording control means, a voice data regenerating means, a regeneration control means, a voiceprint information generating means, a voiceprint registering means, a determining means, and an enabling/disabling control means each according to the present invention, the speaker 120 plays a role as a voice output means according to the present invention, and the MEM 114 plays a role as a memory means according to the present invention.

Figure 20:
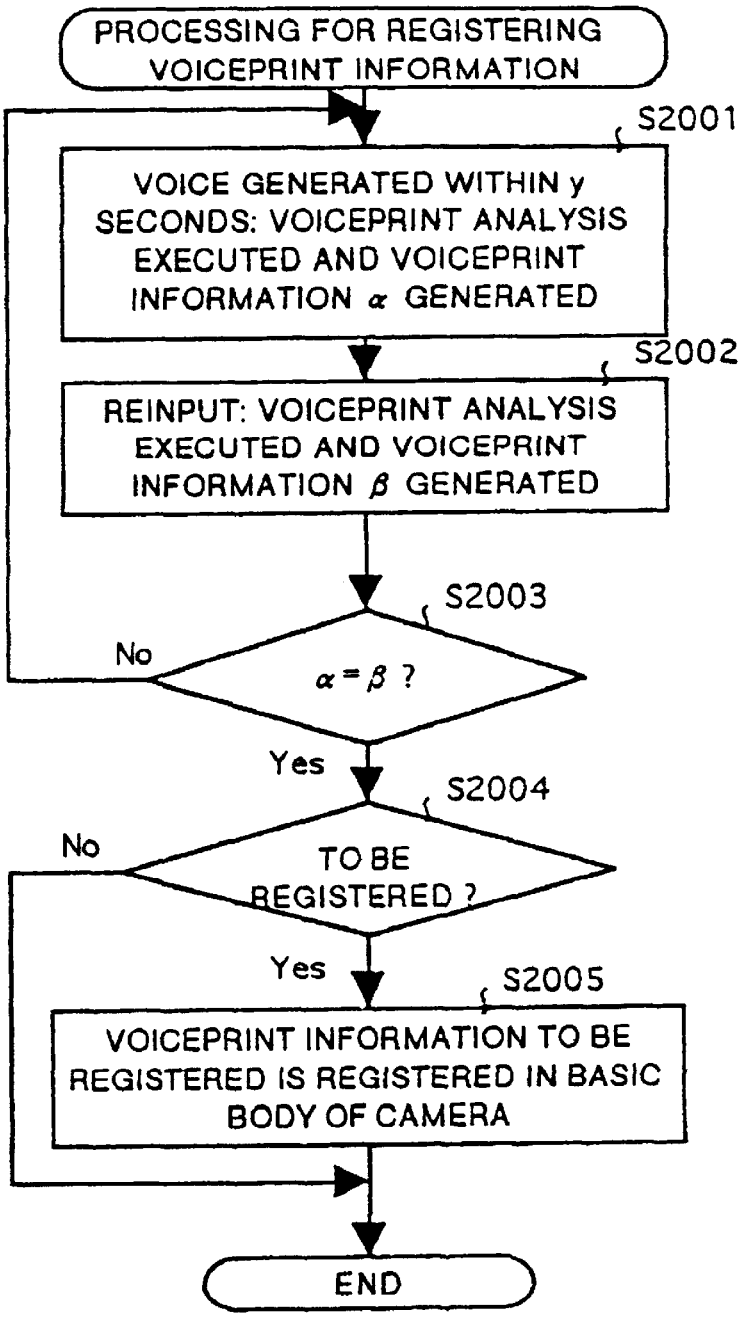
FIG. 20 is a flow chart showing an operational sequence in processing for registering voiceprints according to Embodiment 5 of the present invention.

FIG. 20 is a flow chart showing an operational sequence in the processing for registering voiceprint information to the basic body 101 of the camera, and when a user sets a voiceprint registering mode through the operation display section 116, the CPU 113 executes the control program for the processing for registering voiceprint information stored in the MEM 114.

At first, when a user makes voice (sound) within the preset y seconds, the CPU 113 receives voice data through the microphone 111 and analyzes the voiceprint data to generate voiceprint information $\alpha$ (S2001). Then, when the user makes voice again, the CPU 113 receives the voice data through the microphone 111, analyzes the voiceprint of the data to generate voiceprint information $\beta$ (S2002), and makes determination as to whether the voiceprint information $\alpha$ and the voiceprint information $\beta$ are identical to each other or not (S2003). Herein, if it is determined that the voiceprint information $\alpha$ is not identical to the voiceprint information $\beta$, system control returns to step S2001 and the CPU 113 executes the same processing again. On the other hand, if it is determined that the voiceprint information $\alpha$ is identical to the voiceprint information $\beta$, the user is prompted to select processing whether the voiceprint information is to be registered or not (S2004), and if "to be registered" is selected, the CPU 113 registers the generated voiceprint information ($\alpha$ or $\beta$) to the MEM 114 in the basic body 101 of the camera as registered voiceprint information (S2005). On the contrary, if "not to be registered" is selected, the CPU 113 terminates the processing immediately.

Figure 21:
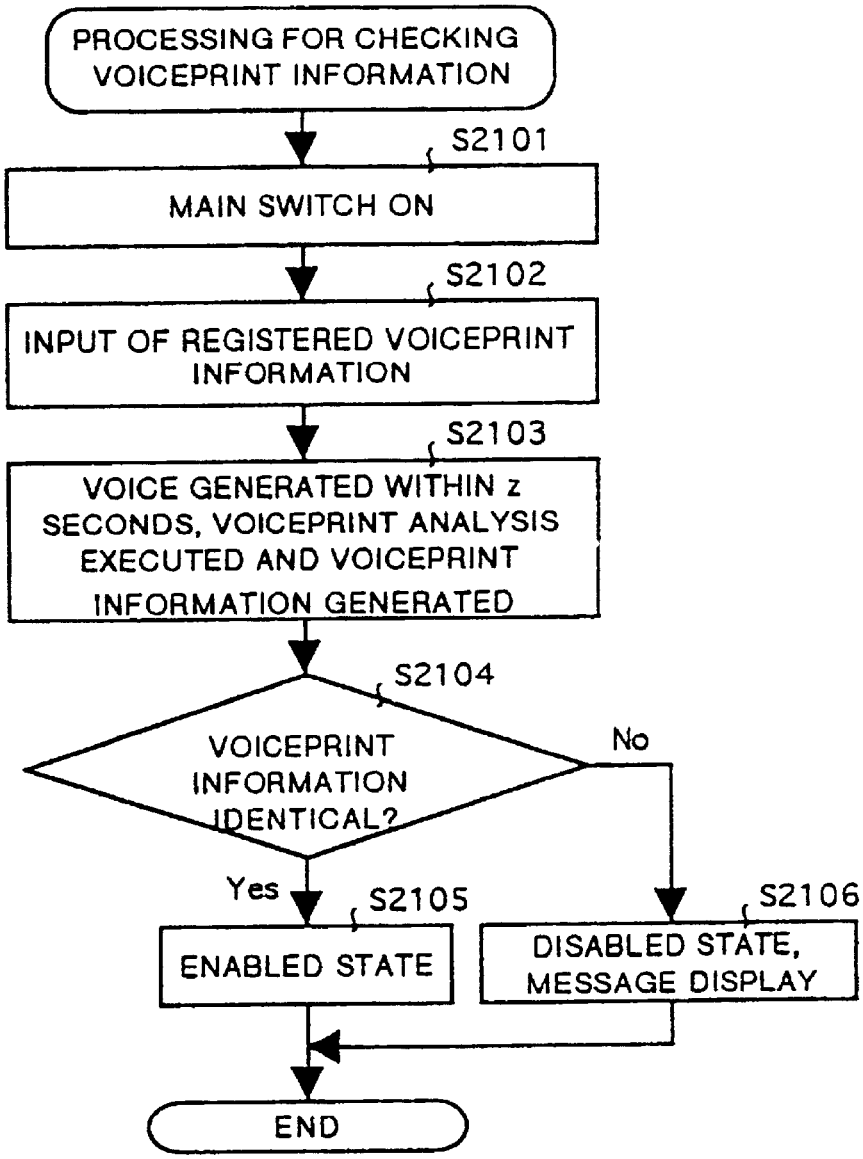
FIG. 21 is a flow chart showing an operational sequence in processing for checking a voiceprint (processing for identifying a voiceprint) according to Embodiment 5.

FIG. 21 is a flow chart showing an operational sequence in the processing for checking voiceprint information (voiceprint information identification processing). This voiceprint information checking processing is automatically executed by the CPU 113 before all the processing is executed for each time when a user turns ON a power for the digital still video camera.

At first, when the user turns ON the main switch 1401 in the basic body 101 of the camera (S2101), the registered voiceprint information previously registered in the MEM 114 in the voiceprint information registering processing is inputted (S2102). Then, when the user makes voice (sound) within the preset z seconds, the CPU 113 receives voice data through the microphone 111, and analyzes the voiceprint of the data to generate inputted voiceprint information (S2103).

Then the CPU 113 compares the registered voiceprint information to the inputted voiceprint information, and makes determination as to whether both of the voiceprint information are identical to each other or not (S2104). Herein if it is determined that the registered voiceprint information and the inputted voiceprint information are identical to each other, the fact indicates that a person who uses the basic body 101 of a camera is identical to the person having the registered voiceprint information for which the camera is permitted to be used, so that the basic body 101 of the camera is enabled (S2105), and the processing is terminated. On the other hand, if it is determined that the registered voiceprint information and the inputted voiceprint information are not identical to each other, the fact indicates that a person who uses the basic body 101 of a camera is not identical to the person having the registered voiceprint for which the camera is permitted to be used, so that the basic body 101 of the camera is disabled and a message indicating the disabled state is displayed on the screen (S2106), and the processing is terminated.

As described above, with Embodiment 5, by previously generating voiceprint information from voice data to be registered to the camera, voiceprint information for an individual can be used like a password used for a personal computer or the like, which makes it possible to enhance security of digital still video camera. Also, in addition to the security, various types of conditions concerning photographing set in the basic body 101 of the camera are not changed without permission, and for this reason convenience in use thereof is improved.

Namely, inputted voice data is made use of as an information source for other processing, which makes it possible to improve the operability, workability, and convenience in use of the digital still video camera.

The digital still video camera according to Embodiment 6 generates voice information from inputted voice data to be registered in a recording medium, and security of the information in the recording medium is improved by making determination with the voiceprint information as to whether each of recording mediums is permitted to be used or is inhibited to be used. It should be noted that the configuration in Embodiment 6 is basically the same as that in Embodiment 4 shown in FIG. 13, so that description is made herein for only different portions.

In Embodiment 6, the CPU 113 and the CG 122 in FIG. 13 play a role as a character code generating means according to the present invention, control programs in the CPU 113 and MEM 114 play roles as a recording control means, a voice data regenerating means, a regeneration control means, a voiceprint information generating means, a voiceprint information registering means, a determining means, and an enabling/disabling control means each according to the present invention, the speaker 120 plays a role as a voice output means according to the present invention, and the MEM 114 plays a role as a memory means according to the present invention.

Figure 22:
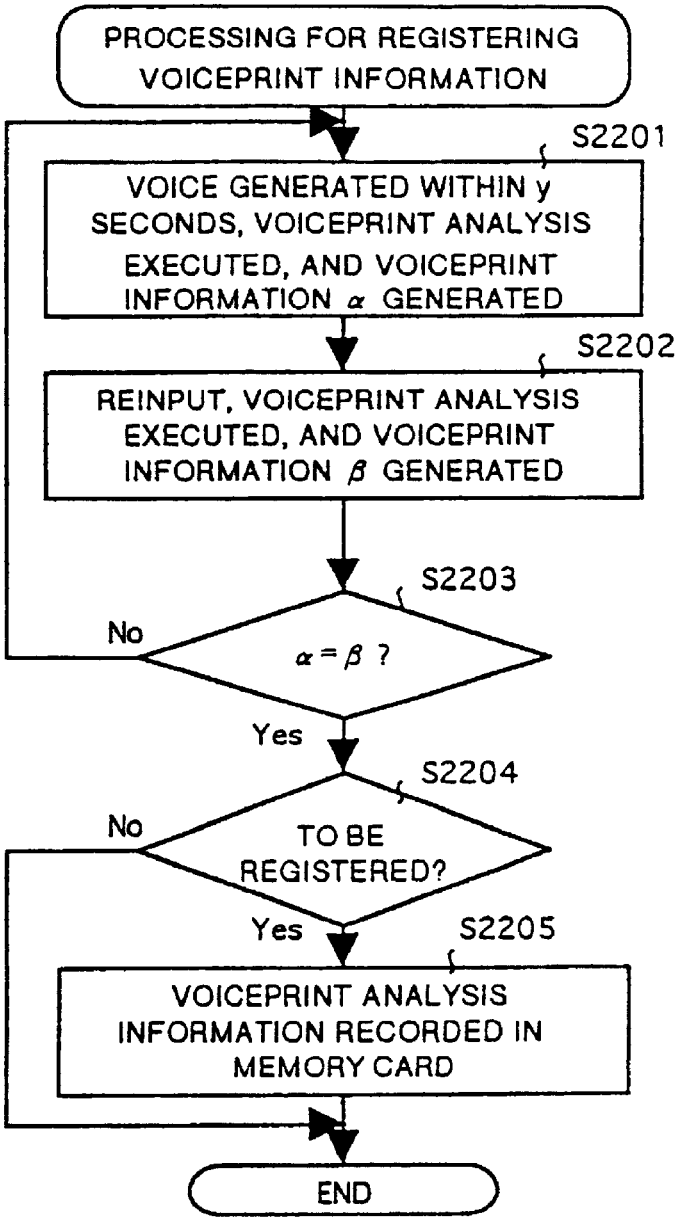
FIG. 22 is a flow chart showing processing for registering voiceprints according to Embodiment 6 of the present invention.

FIG. 22 is a flow chart showing an operating sequence in the processing for registering voiceprint information into the memory card 103 which is a recording medium, and when a user sets a voiceprint registering mode through the operation display section 116, the CPU 113 executes the control program for voiceprint information registering processing stored in the MEM 114.

At first, when a user makes voice (sound) within the preset y seconds, the CPU 113 receives voice data through the microphone 111 and analyzes the voiceprint of the data to generate voiceprint information $\alpha$ (S2201). Then, when the user makes voice again, the CPU 113 receives voice data through the microphone 111, analyzes the voiceprint of the data to generate voiceprint information $\beta$ (S2202), and makes determination as to whether the voiceprint information $\alpha$ and the voiceprint information $\beta$ are identical to each other or not (S2203). Herein, if it is determined that the voiceprint information $\alpha$ is not identical to the voiceprint information $\beta$, system control returns to step S2201 and the CPU 113 executes the same processing again. On the other hand, if it is determined that the voiceprint information $\alpha$ is identical to the voiceprint information $\beta$, the user is prompted to select processing whether the voiceprint information is registered or not (S2204), and if "to be registered" is selected, the CPU 113 registers the generated voiceprint information ($\alpha$ or $\beta$) to the memory card 103 as registered voiceprint information (S2205). On the contrary, if "not to be registered" is selected, the CPU 113 terminates the processing as it is.

Figure 23:
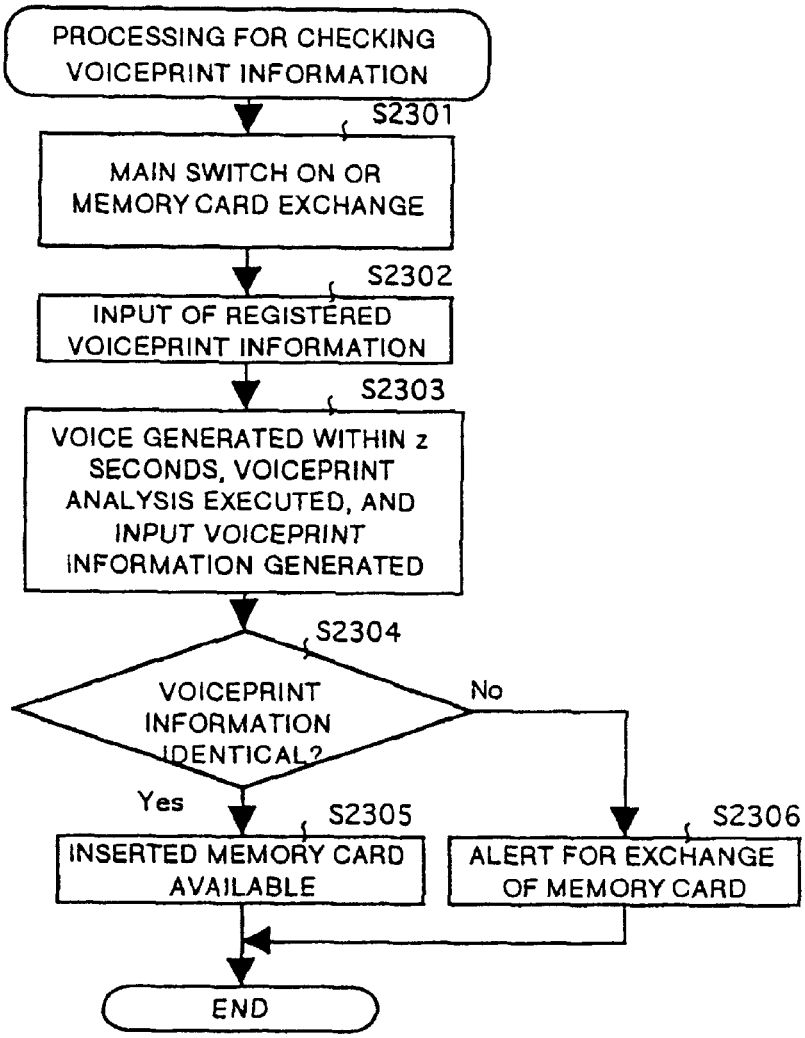
FIG. 23 is a flow chart showing an operational sequence in processing for checking a voiceprint (processing for identifying a voiceprint) according to Embodiment 6.

FIG. 23 is a flow chart showing an operational sequence in the processing for checking voiceprint information (voiceprint information identification processing). This voiceprint information checking processing is automatically executed by the CPU 113 before all the processing is executed for each time when a user turns ON a power for the digital still video camera or when the memory card 103 is exchanged with other one.

At first, when the user turns ON the main switch 1401 in the basic body 101 of the camera or exchanges the memory card 103 with other one (S2301), the registered voiceprint information previously registered in the memory card 103 with the voiceprint information registering processing is inputted (S2302). Then, when the user makes voice (sound) within the preset z seconds, the CPU 113 receives voice data through the microphone 111, and analyzes the voiceprint of the data to generate inputted voiceprint information (S2303).

Then the CPU 113 compares the registered voiceprint information to the inputted voiceprint information, and makes determination as to whether both of the voiceprint information are identical to each other or not (S2304). Herein if it is determined that the registered voiceprint information and the inputted voiceprint information are identical to each other, the fact indicates that a person who uses the inserted memory card 103 is identical to the person having the registered voiceprint information for which the memory card 103 is permitted to be used, so that the memory card 103 is permitted to be used (S2305), and the processing is terminated. On the other hand, if it is determined that the registered voiceprint information and the inputted voiceprint information are not identical to each other, the fact indicates that a person who uses the inserted memory card 103 is not identical to the person having the registered voiceprint information for which the memory card 103 is permitted to be used, so that the memory card 103 is disabled and alert indicating that the memory card 103 has to be exchanged with other one is issued (S2306), and the processing is terminated.

As described above, with Embodiment 6, by previously generating voiceprint information from voice data to be registered into the memory card 103, voiceprint information for an individual can be used like a password used for a personal computer or the like, which makes it possible to enhance security of each of memory cards. Especially, in Embodiment 6, different from Embodiment 5, the basic body 101 of a camera is permitted to be used by a large number of unspecified users, and only the memory card 103 can confidentially be handled. Furthermore, by executing the voiceprint information checking processing shown in FIG. 23 on the personal computer, the security of the memory card 103 can be maintained also on the PC.

Namely, inputted voice data is made use of as an information source for other processing, which makes it possible to improve the operability, workability, and convenience in use of the digital still video camera.

Figure 24:
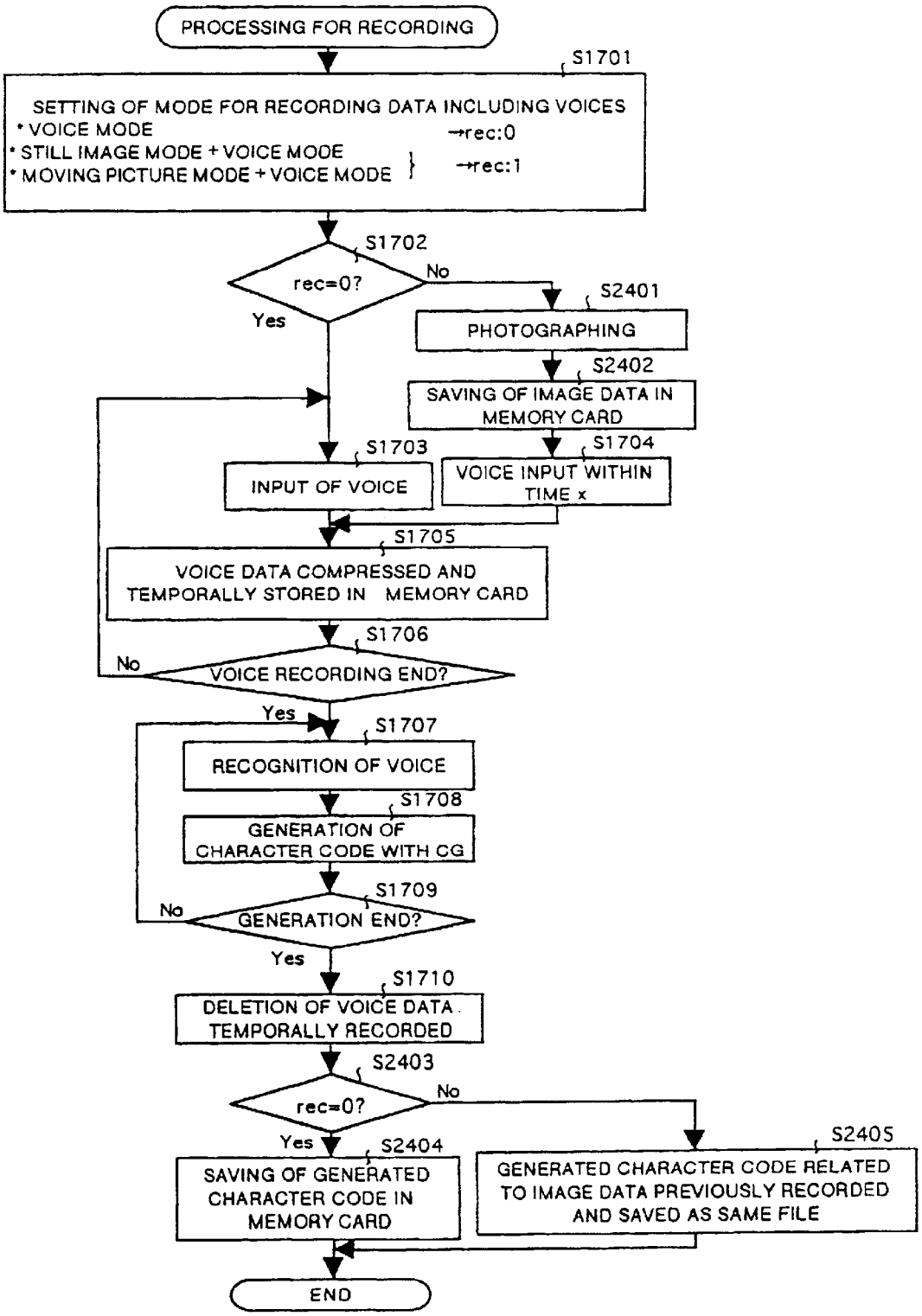
FIG. 24 is a flow chart showing an operational sequence in processing in the mode for recording data including voices according to Embodiment 7 of the present invention.

As for a digital still video camera according to Embodiment 7 having the same configuration and operations as those in Embodiment 4, operations are executed according to an operational sequence shown in the flow chart for recording processing in the recording mode including therein voices shown in FIG. 24, and not according to an operational sequence shown in the flow chart shown in FIG. 17. Namely, after an image is photographed and image data for the image is generated, voice data is inputted to generate character code, and the image data and the character code are recorded in the memory card 103 as an identical file.

FIG. 24 is a flow chart showing an operational sequence in the recording processing in the mode for recording data including voices according to Embodiment 7, and reference code common to those in the flow chart shown in FIG. 17 indicate the same processing step, so that description is made herein for only different portions.

At first if the selected mode is a voice mode in the mode for recording data including voices, zero is set in a mode flag rec, and if it is a still picture+voice mode or a moving picture+voice mode, 1 is set in the mode flag rec (S1701). Then determination is made as to whether the recording mode rec is 0 or not in step S1702, and if it is determined that rec=0, a user executes a voice input through the microphone 111 as long as a user desires (S1703) because zero indicates a voice mode for recording only voices, then system control goes to step S1705.

On the other hand, if it is determined that rec is not 0, which indicates that the mode is a still picture+voice mode or a moving picture+voice mode each for recording images other than voices, so that the CPU photographs an image (S2401), saves (records) the inputted image data in the memory card 103 (S2402), then a user executes a voice input through the microphone 111 within x period of time preset in step S1704, then system control goes to step S1705.

Then, the CPU 113 executes the processing from step S1705 to step S1710, and then makes again determination as to whether the recording mode rec is 0 or not (S2403), and if it is determined that rec=0, the mode is a voice mode for recording only voices, so that the CPU 113 saves (records) the generated character code in the memory card 103 (S2404), and terminates the processing. On the other hand, if it is determined that rec is not 0, the mode is a still picture+voice mode or a moving picture+voice mode each for recording images other than voices, so that the CPU 113 relates the generated character code to the image data previously recorded in the memory card 103 and saves (records) the data as an identical file (S2405), and terminates the processing.

As described above, with Embodiment 7, in addition to the same effect as that obtained in Embodiment 4, the CUP 113 photographs an image and generates image data for the image, then inputs voice data to generate character code, and records the image data and the character code in the recording medium as an identical file, so that it is easy to relate character code to image data.

Figure 25:
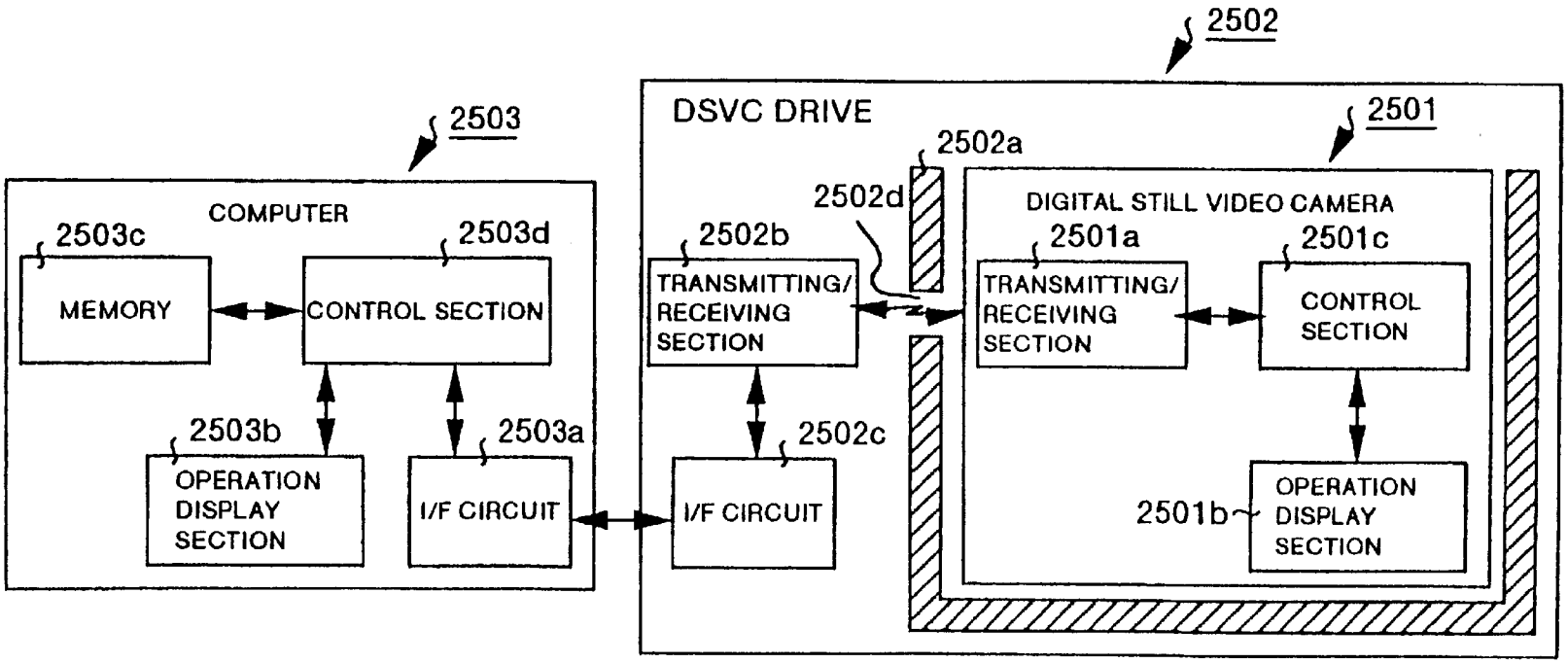
FIG. 25 is a block diagram showing a key section of a data transfer system for a digital still video camera using a frame for data relay according to Embodiment 8 of the present invention.

FIG. 25 is a block diagram showing a key section of the configuration of a data transfer system for a digital still video camera using a frame for data relay according to Embodiment 8, and the system largely comprises a digital still video camera 2501 having a function for radio communication making use of infrared rays, a DSVC drive (Digital Still Video Camera Drive) 2502 as a frame for data relay for stably retaining the digital still video camera 2501 and relaying data by means of transaction with the digital still video camera 2501 to external equipment, and a computer 2503 as external equipment.

The digital still video camera 2501 comprises a transmitting/receiving section 2501a for data transaction through radio communications making use of infrared rays, an operation display section 2501b for operating the digital still video camera 2501, and a control section 2501c for controlling the digital still video camera 2501.

The DSVC drive 2502 comprises a mounting tray 2502a as a retaining means for stably supporting the digital still video camera 2501, a transmitting/receiving section 2502b as a radio communicating means for data transaction through radio communications with the digital still video camera 2501 mounted (retained) by the mounting tray 2502a, and an I/F (interface) circuit 2502c as a data input/output means for outputting data inputted from the transmitting/receiving section 2502b to the computer 2503 and also outputting data inputted from the computer 2503 to the transmitting/receiving section 2502b. It should be noted that, in the figure, the reference numeral 2502d indicates a window for communications provided on the mounting tray 2502a in which the transmitting/receiving section 2502b and the transmitting/receiving section 2501a of the digital still video camera 2501 are provided at positions opposite to each other.

The computer 2503 comprises an I/F circuit 2503a for inputting data to/outputting data from an I/F circuit 2502c of the DSVC 2502, an operation display section 2503b for operating the computer 2503, a memory 2503c storing therein a DSVC application program (the application means according to the present invention) for controlling operation of the digital still video camera 2501, and a control section 2503d for controlling the computer 2503.

Figure 26:
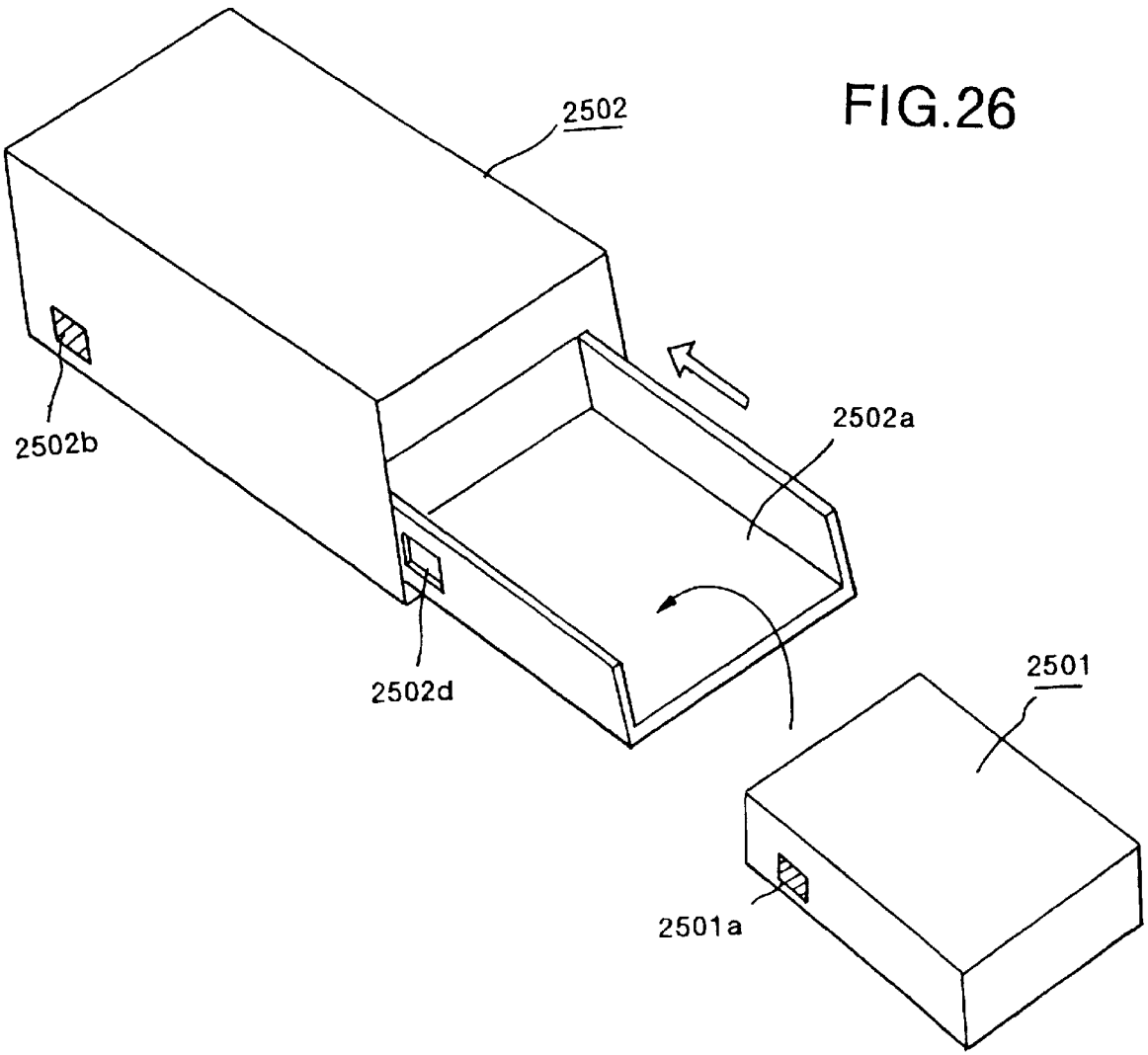
FIG. 26 is an appearance view showing a DSVC drive (a frame for data relay)

FIG. 26 is a view showing appearance of the DSVC drive 2502. As shown in this figure, when the digital still video camera 2501 is placed on the mounting tray 2502a, the transmitting/receiving section 2501a of the digital still video camera 250 is positioned at the communication window 2502d of the mounting tray 2502a. In this state, the digital still video camera 2501 is supported by the mounting tray 2502a under stable conditions.

After mounted, when the mounting tray 2502a is pulled into the DSVC drive 2502, the digital still video camera 2502 is accommodated together with the mounting tray 2502a in the DSVC drive 2502, the transmitting/receiving section 2501a and the transmitting/receiving section 2502b are fixed at positions correcting opposing to each other with the communication window 2502d therebetween.

Figure 27:
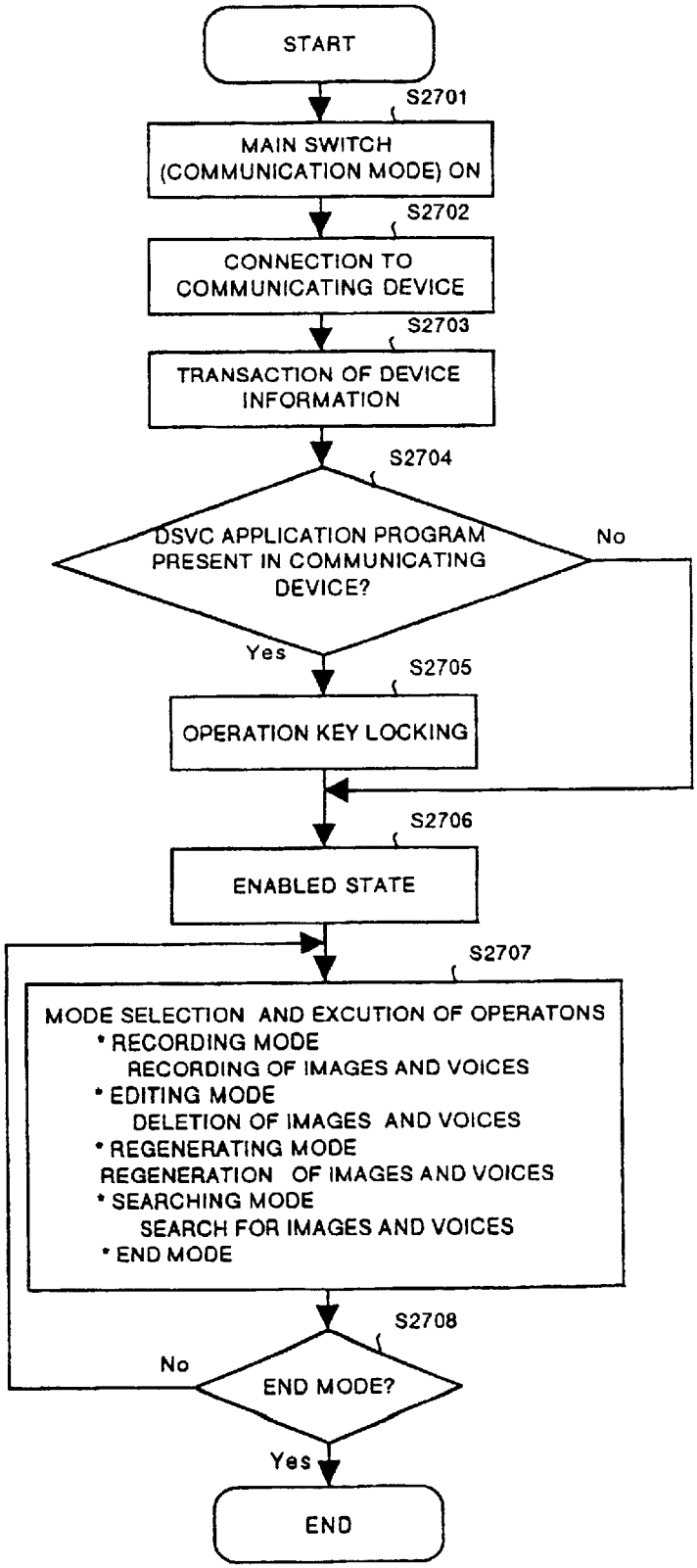
FIG. 27 is a schematic flow chart showing the digital still video camera according to Embodiment 8.
Figure 28:
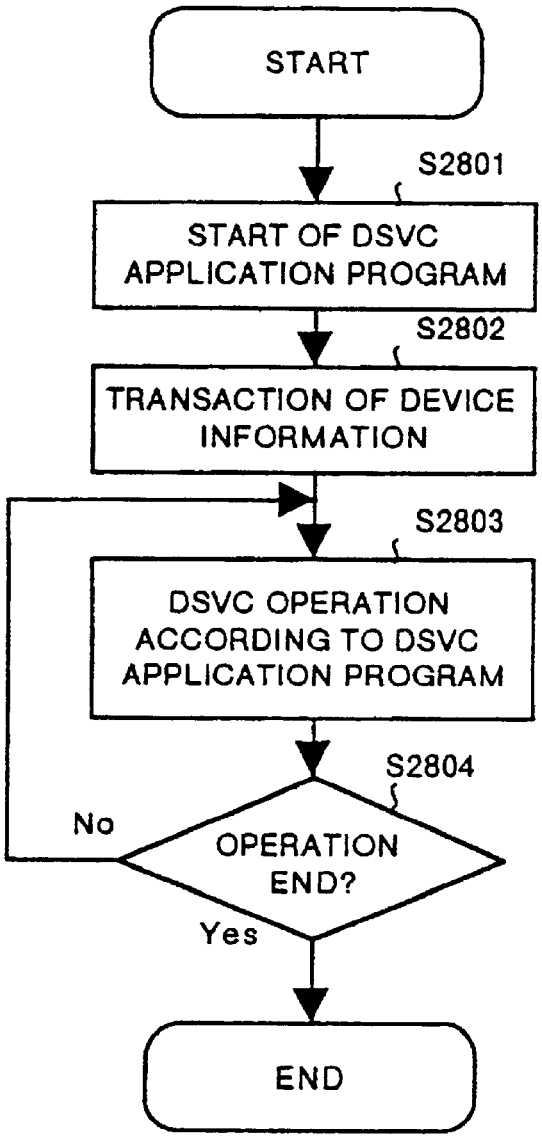
FIG. 28 is a schematic flow chart in a case where a computer controls operations of the digital still video camera according to Embodiment 8.

With the configuration described above, next description is made for operations thereof with reference to FIG. 27 and FIG. 28. FIG. 27 is a general flow chart showing operations of the digital still video camera 2501, and FIG. 28 a is a flow chart showing a case where operations of the digital still video camera 2501 are controlled by the computer 2503.

As shown in FIG. 27, in the side of the digital still video camera 2501, at first the mains witch is turned ON in the communication mode (S2701). In this state, as shown in FIG. 26, when the digital still video camera 2501 is mounted on the mounting tray 2502a of the DSVC drive 2502 and is accommodated in the DSVC drive 2502, the control section 2501c connects to a communicating device (herein the computer 2503) via the transmitting/receiving section 2501a according to a specified protocol (S2702), and then transacts information with the communicating device (S2703). Whether a DSVC application program has been installed on the communicating device or not is checked through this information transaction.

Then, determination is made as to whether the DSVC application program has been installed in the communicating device or not (S2704), and if it is determined that the DSVC application program has been installed therein, an operation key of the operation display section 2501b in the DSVC drive is locked (S2705), and system control advances to step S2706. On the other hand, if it is determined that the DSVC application program has not been installed, system control goes to step S2706.

In step S2706, the DSVC drive 2507 is enabled. Then, an operating mode is selected, operations are executed in the selected mode (S2707) under operation control with the operation display section 2501b of the DSVC drive 2502 or under control by the DSVC application program installed in the communicating device, and then when the end mode is selected (S2708), the processing is terminated.

It should be noted that modes executable in the digital still video camera 2501 include, for instance, a recording mode for recording image and voice data, an editing mode for deleting image and voice data, a regenerating mode for regenerating image and voice data, a searching mode for searching image and voice data, and end mode for instructing end of the processing.

Also in a case where operations of the digital still video camera 2501 are controlled by the computer 2503, operations as shown in FIG. 28 are executed in the side of the computer 2503. At first, when the DSVC application program stored in the memory 2503c is started (S2801), the control section 2503d executes information transaction with the digital still video camera 2501 via the I/F circuit 2503a according to a specified protocol (S2802). Through this information transaction, the information indicating that the DSVC application program has been installed is sent to the digital still video camera 2501.

Then with the DSVC application program, operation control for the digital still video camera 2501 is executed (S2803), and when all the operations are executed, an end command is inputted (S2804), when the processing is terminated.

As described above, with Embodiment 8, radio communications is executed between the transmitting/receiving section 2501a and the transmitting/receiving section 2502b in the state where the digital still video camera 2501 is stably supported on the mounting tray 2502a of the DSVC drive 2502, and also data is transferred from the transmitting/receiving section 2502b via the I/F circuit 2502c to the computer 2503, so that data in the digital still video camera 2501 is simply and accurately transferred to the computer 2503 (external device).

In a case where the DSVC application program has been installed in the computer 2503, entry from the operation key of the digital still video camera 2501 is inhibited and operation control for the digital still video camera 2501 is executed using the DSVC application program from the side of the computer 2503, so that operability and convenience in data transfer from a digital still video camera to a computer (external device) can be improved.

Figure 29A:
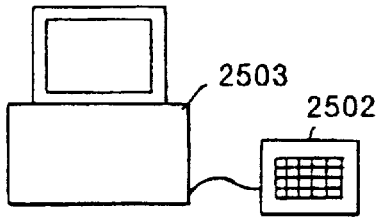
FIGS. 29A to 29D are explanatory views showing an example of connection of the DSVC drive (frame for data relay)
Figure 29B:
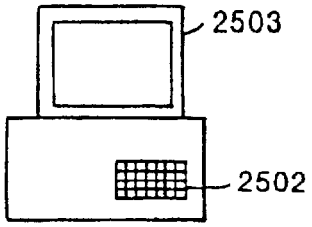
Figure 29C:
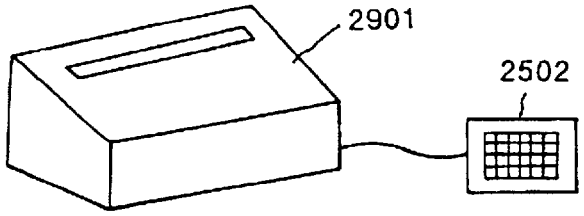

It should be noted that, in Embodiment 8, as shown in FIG. 29A, the DSVC drive 2502 as a frame for data relay is an independent device and is connected to the computer 2503, but that configuration of the present invention is not limited to this case and as shown in FIG. 29B, the DSVC drive 2502 may be incorporated in the computer 2503.

Figure 29D:
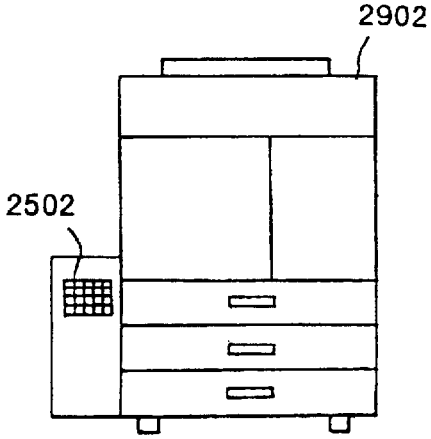

Further, although description of Embodiment 8 assumes a case where an external device to which the DSVC drive 2502 is connected is the computer 2503, the configuration is allowable in which the DSVC drive 2502 is connected to the printer 2901 and data in the digital still video camera 2501 is directly outputted to the printer 2901. Further as shown in FIG. 29D, the DSVC drive 2502 may be connected to a digital copying machine 2902.

Further a form of the DSVC drive 2502 as a frame for data relay is not limited to that described above, and for instance the construction is allowable in which an upper section of the DSVC drive 2502 is opened so that operation keys of the digital still vide camera 2501 can be operated in the state where the digital still video camera 2501 is mounted on the mounting tray 2502a.

A data transfer system of the digital still video camera according to Embodiment 9 has the same configuration as that in Embodiment 8 shown in FIG. 25, said data transfer system comprising a selecting means for specifying with which of the digital still vide camera 2501 and the computer (external device) 2503 operation control for the digital still video camera should be executed, and an operation control validating means for validating operation control by either the device itself or the computer 2503 according to a result of selection in the selecting means each provided in the side of the digital still video camera 2501, and in a case where the computer 2502 is selected by the selecting means, operation control by the computer 2503 is validated so that operation control for the digital still video camera 2501 can be executed with a DSVC application program.

It should be noted that, in FIG. 25, the operation display section 2501b plays a role of the selecting means according to the present invention and the control section 2501c plays a role of the operation control validating means according to the present invention.

Figure 30:
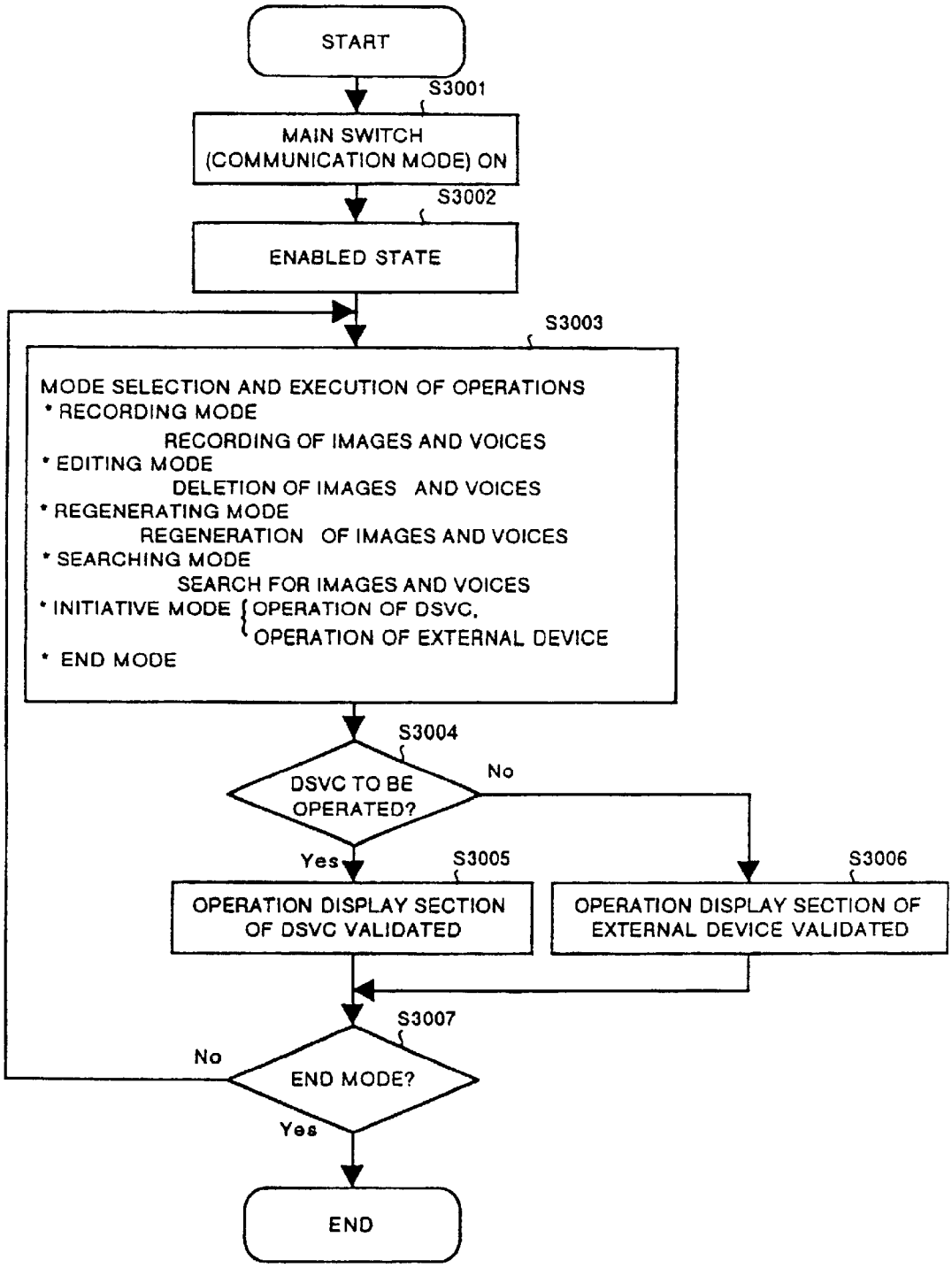
FIG. 30 is a schematic flow chart showing a digital still video camera according to Embodiment 9 of the present invention.

FIG. 30 is a general flow chart showing operation of the digital still video camera according to Embodiment 9, and in the side of the digital still video camera 2501, at first when the main switch is turned ON in the communication mode (S3001), the digital still video camera 2501 is enabled (S3002). Then a user executes operation control using the operation display section 2501b of the digital still video camera 2501 to select a mode, when operations are executed in the selected mode (S3003). Herein it is possible to specify with which of the digital still video camera 2501 and the external device (herein the computer 2503) operation control for the digital still video camera is to be executed by specifying a DSVC operation and external device operation in the initiative mode.

Then in step S3004, determination is made as to which of the DSVC operation and external device operation has been selected in the initiative mode, and if it is determined that the DSVC operation has been selected, the operation display section 2501b of the digital still video camera 2501 is validated (S3005). If it is determined that the DSVC operation has not been selected, the operation display section 2503b of the external device (computer 2503) is validated (S3006).

Then determination is made as to whether the current operating mode is the end mode or not (S3007), and if it is determined that the current operating mode is the end mode, the processing is terminated. If it is determined that the current operating mode is not the end mode, system control returns to step S3003, and mode selection and execution of operations are repeated according to the operation control from the operation display section selected in the initiative mode.

As described above, with Embodiment 9, with which of the digital still video camera 2501 and an external device operation control for the digital still video camera is executed can be selected in the side of the digital still video camera 2501, so that, in a case where an external device is a machine capable of executing advanced operation control, the external device operation is selected so that the external device take a charge for image output like a printer or the like, and in a case where the external device is a machine with low operability, the digital still video camera 2501 can be selected. In other words, it is possible to improve the operability and convenience in data transfer from the digital still video camera 2501 to an external device.

A data transfer system of the digital still vide camera according to Embodiment 10 of the present invention has the same configuration as that in Embodiment 8 shown in FIG. 25, and in the configuration a operation section function selecting means for comparing functions of an operation section of the digital still video camera 2501 to those of an external device (herein the computer 2503) and selecting either more excellent functions and an operation control validating means for validating operation control by either the digital still video camera 2501 itself or an external device according to a result of selection by the operation section function selecting means are provided in the side of the digital still video camera 2501, and in a case where an external device is selected by the operation section function selecting means, operation control by the external device is validated so that operation control for the digital still video camera 2501 can be executed by using a DSVC application program installed in the external device.

Figure 31:
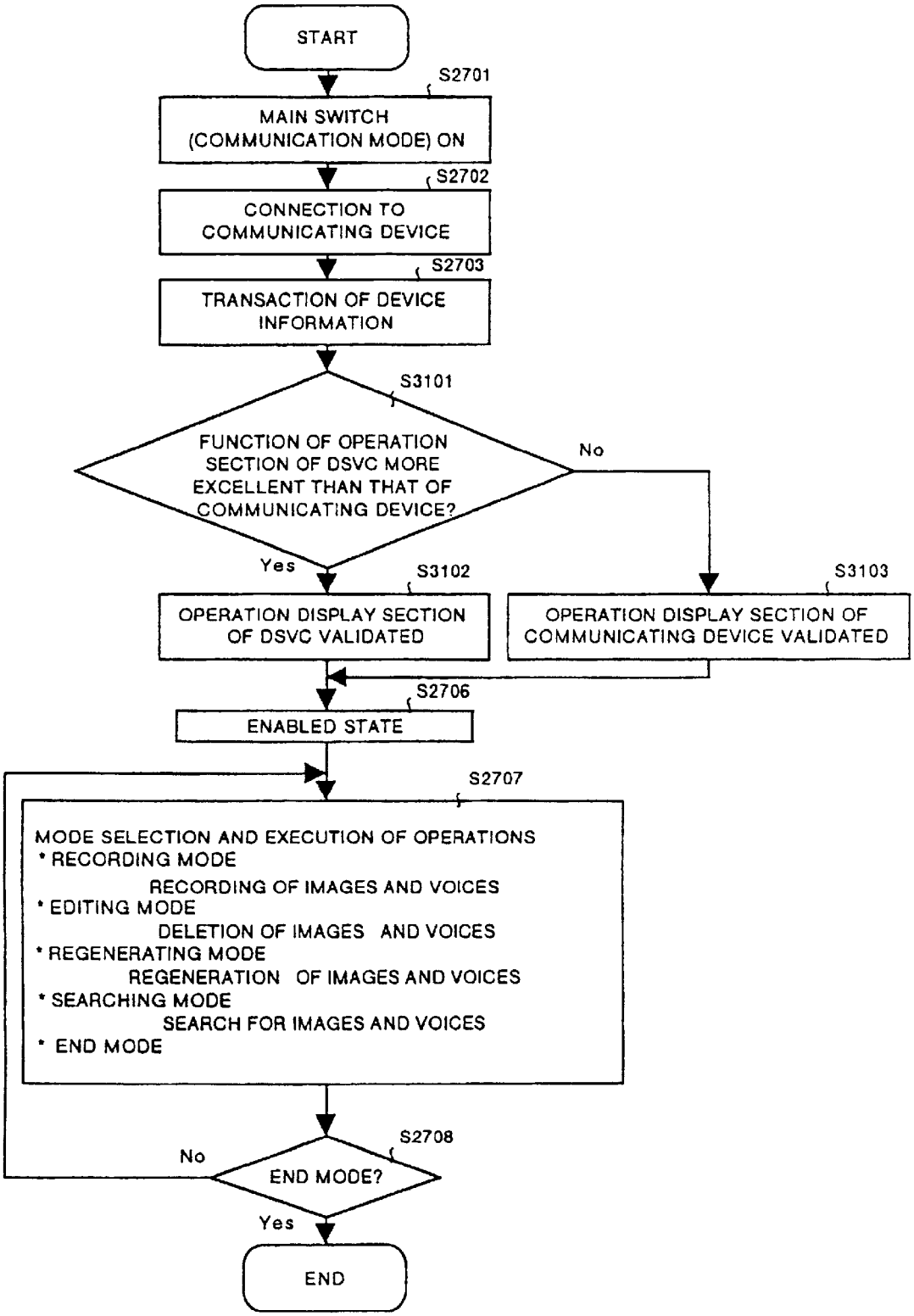
FIG. 31 is a schematic flow chart showing a digital still video camera according to Embodiment 10 of the present invention.

FIG. 31 is a general flow chart showing operations of the digital still video camera according to Embodiment 10. It should be noted that the basic operations are the same as those shown in the general flow chart for Embodiment 8 shown in FIG. 27, and common signs indicate the same processing respectively, so that description is made herein for only different points. In the side of the digital still video camera 2501, at first the main switch is turned ON in the communication mode (S2701). In this state, when the digital still video camera 2501 is placed on the mounting tray 2502a of the DSVC drive 2502 and is accommodated in the DSVC drive 2502, the digital still video camera 2501 is connected to a communicating device (herein the computer 2503) (S2702), and then executes information with the communicating device (S2703). In this information transaction, functions of the operation section of the communicating device (herein functions of the operation display section 2503b) are inputted.

The functions of the operation section of the digital still video camera 2501 are compared to those of the communicating device, and determination is made whether the functions of the operation section of the digital still video camera 2501 are more excellent as compared to those of the communicating device or not (S3101).

Herein if it is determined that functions of the operation section of the digital still video camera 2501 are more excellent, the operation display section 2501b of the digital still video camera 2501 is validated (S3102), and system control advances to step S2706.

If it s determined that functions of the operation section of the communicating device are more excellent, the operation display section of the communicating device (herein the operating display section 2503b of the computer 2503), is validated (S3103), and system control advances to step S2706.

In step S2706, the digital still video camera 2501 is enabled. Then mode selection and operations in the selected mode are executed according to operation control from the validated operation display section (S2707), and if the end mode is selected (S2708), the processing is terminated.

As described above, with Embodiment 10, an operation display section of the digital still video camera 2501 or an external device, either one with more excellent operability, is automatically validated, so that it is possible to improve operability and convenience in data transfer from a digital still video camera to an external device.

FIG. 13 described above is a block diagram showing a digital still video camera according to Embodiment 11 of the present invention, and FIG. 14A and FIG. 14B each show appearance of the basic system 101 of the camera. Detailed description was already made for FIG. 13 and FIGS. 14A and 14B, so that description thereof is omitted herein.

In the configuration shown in FIG. 13, and FIGS. 14A and 14B, the MEM 114 plays a role of a memory means according to Embodiment 11, and a plurality of mask information consisting of a plurality of regions each with at least one of two different types of compression rate set therein is stored in the MEM 114. Also the operation display section 116 (display panel 1412 and recording mode button 1404) constitutes a specifying means according to the present invention for specifying the mask compression mode for executing compression processing using the mask information. Also an image compressing means, an image extending means, an image compressing/extending means, and an adding means each according to the present invention are realized by a control program stored in the CPU 113 as well as in a ROM of the MEM 114 (flow charts shown in FIG. 37 to FIG. 40) and by the IPP 107. Furthermore, the selecting means and the mask information generating/registering means according to the present invention are realized by the liquid crystal monitor 102 and the operation display section 116.

Figure 32:
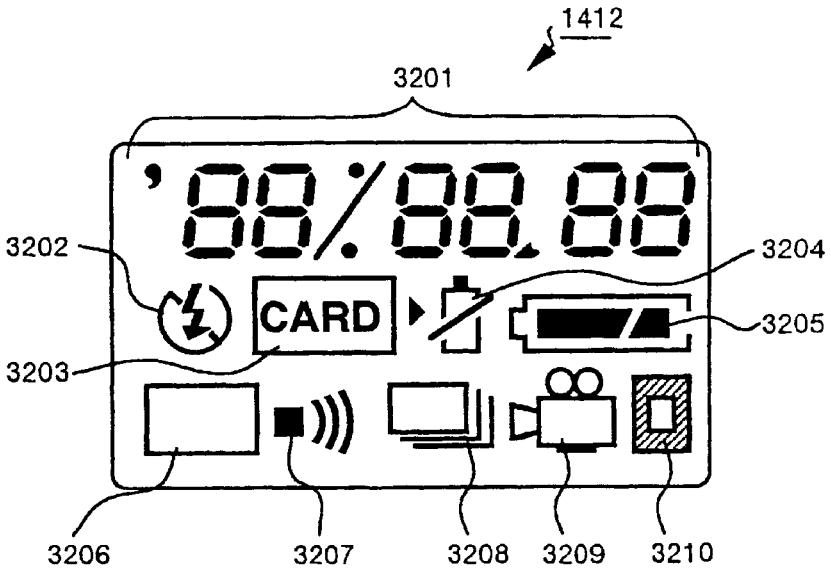
FIG. 32 is an explanatory view showing a display screen on a display panel.

FIG. 32 shows a display screen of the display panel 1412 comprising a recorded information display section 3201 used in recording for displaying a remaining copies to be prepared, a remaining period of time, a date, a time, a card state, and a mode and also used in regenerating for displaying an image file number, a counter, a card state, and a mode; a strobo display section 3202 for showing whether a strobo has been used or not or can be used or not; a card display section 3203 for showing whether the memory card has been set or not; a battery mark section 3204 for memory card showing whether a residual charge is present in a battery for the memory card 103 or not; a battery mark 3205 for showing whether a residual charge is present in the battery 117 or not; a still picture mode display section 3206 for showing that the still picture mode has been set; a voice mode display section 3207 for showing that the voice mode has been set; a successively photographing mode display section 3208 for showing that the successively photographing mode has been set; a moving picture mode display section 3209 for showing that the moving picture mode has been set; and the mask compression mode display section 3210 for showing that the mask compression mode for compression processing using the mask information according to the present invention has been set.

It should be noted that, although the figure shows the state where all types of information are simultaneously displayed, actually only necessary information is displayed.

Figure 33:
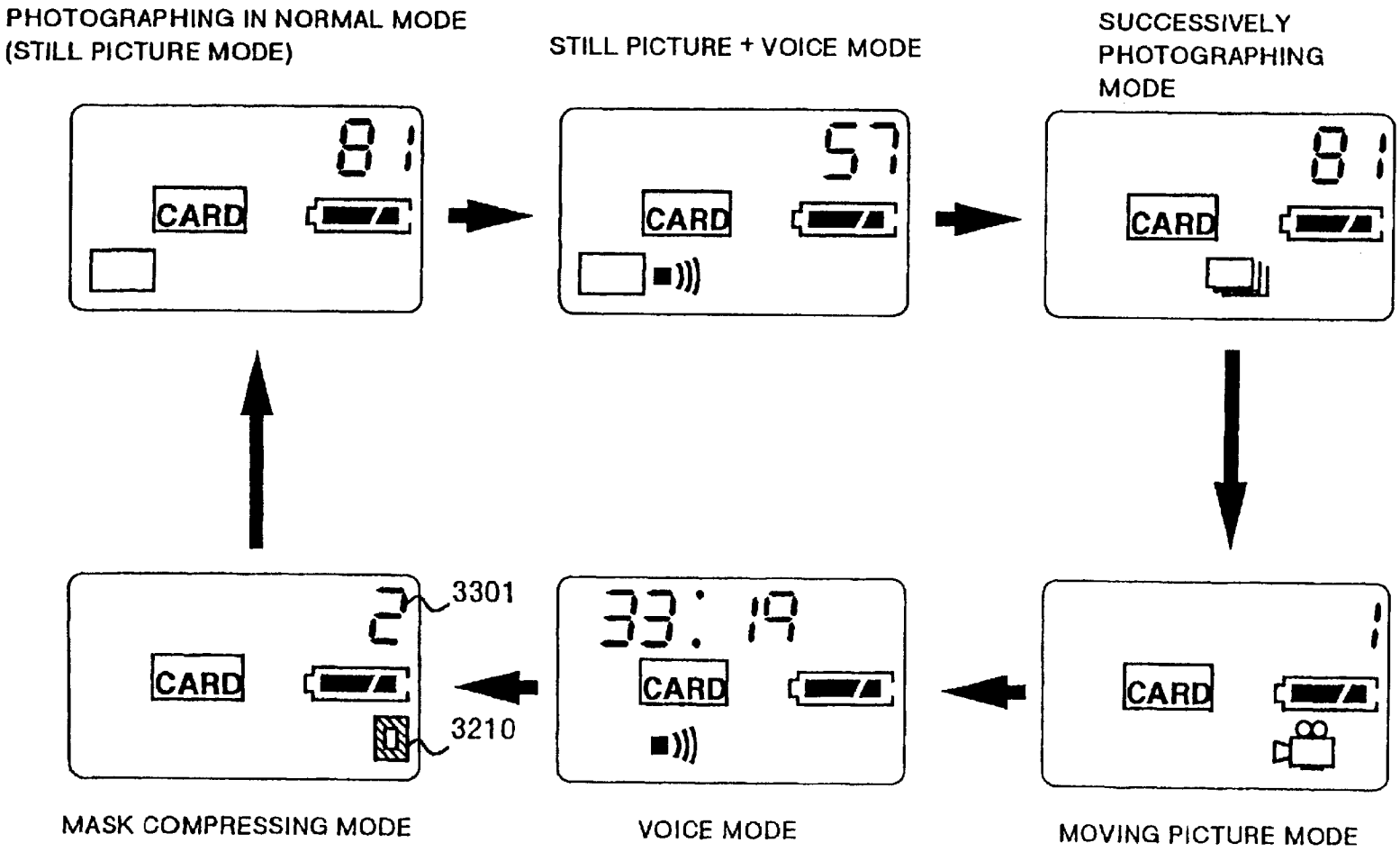
FIG. 33 is an explanatory view showing a switching state of the display screen on the display panel according to one of the set record modes.

FIG. 33 shows a switching of a display screen of the display panel 1412 in the recording mode set as described above, and each time the recording mode button 1404 shown in FIG. 14A is pressed down, as shown in the figure, the display screen of the display panel 1412 is switched. To set the mask compression mode, the mask compression mode display section 3210 is displayed, and a user selects a required mask information number 3301 described later.

Figure 34:
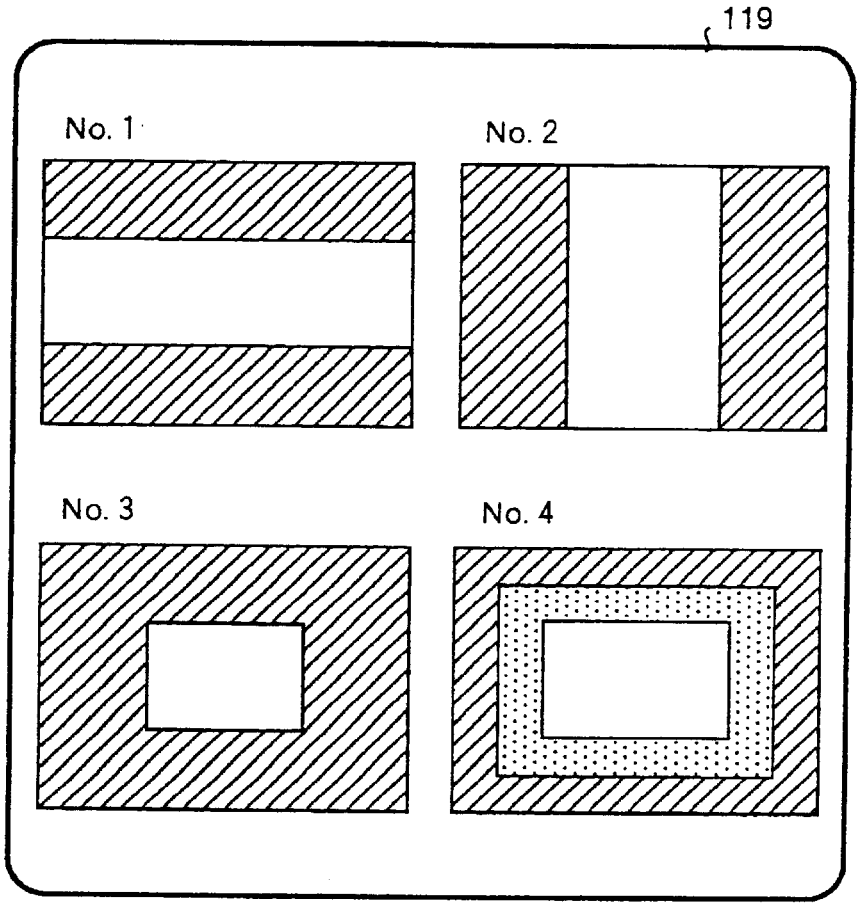
FIG. 34 is an explanatory view showing an example of a selected screen for mask information displayed on the liquid crystal panel of a liquid crystal monitor.

Next description is made for a method of selecting mask information (a method of specifying mask information) as well as for configuration of mask information with reference to FIG. 34 to FIG. 36. It should be noted that FIG. 34 shows a mask information select screen display on the liquid crystal panel 119 of the liquid crystal monitor 102. FIG. 35 shows an example of configuration of mask information corresponding to the mask information number "No. 2" in FIG. 34, and FIG. 36 shows an example of mask information corresponding to the mask information number "No.4" shown in FIG. 34.

As described in relation to FIG. 33, when the recording mode button 1404 is operated and the mask compression mode display section 3210 is displayed on the display panel 1412, a signal indicating that the mask compression mode has been set is outputted from the operation display section 116 to the CPU 113. When the CPU 113 receives the signal, a plurality types of mask information previously stored in the MEM 114 are displayed on the liquid crystal panel 119 of the liquid crystal monitor 102. For instance, as shown in FIG. 34, 4 types of mask information are displayed. When a user presses down a specified button or switch on the operation display section 116 to specify any of mask information numbers (No. 1 to No. 4) added to these mask information, in the subsequent mask compression mode, compression processing or extension processing is executed using the mask information corresponding to the specified mask information number.

As shown in the figure, each mask information is built with a combination of a blank section and a shadowed section, and the black section indicates a portion to be processed with a low compression rate or without compression, and the shadowed section indicates a portion to be processed with a high compression rate. In other words, an object to be photographed as a basic body to be recorded is present in the blank section so that recording is executed without losing information so much (or the information has been recorded), while the shadowed section is a portion in which recording is executing (or was executed) with a substantial portion of the information lost.

Furthermore, the mask information corresponding to each of the mask information numbers No.1 to No.3 indicates two types of compression rate indicated by the black section (a section with a low compression rate or without compression) and a shadowed section (with a high compression rate), and the mask information corresponding to the mask information number No.4 indicates a case where three types of compression rate including the two types above and a dot point section (with a intermediate compression rate) are used.

Herein an example of configuration of the mask information corresponding to the mask information number "No.2" shown in FIG. 34 is described with reference to FIG. 35. The mask information has size of an image area for one screen photographed by the basic body 101 of the camera. Herein it is assumed herein that a size of an image area for one screen is height H×width W. The image area for one screen is divided to M×N pieces of blocks (regions), and one block has a size of height h×width w (n=H/M, w=W/N). It should be noted that one or more sets of 8×8 pixels required for image compression exist in this block size (h×w).

As for the mask information corresponding to the mask information number "No.2", "0" is set in each of the blocks in the shadowed section where compression (or extension) is executed with a high compression rate, and "1" is set in each of the blocks in the blank section where compression (or extension) is executed with a low compression rate or with no compression is not executed. It should be noted that, in the processing for recording or regeneration described later, by using "0" and "1" set in the blocks respectively, an image can be obtained by regenerating the black section in which a photographed object as a basic body is present with a large volume of information and the peripheral shadowed section with a small quantity of information.

FIG. 36 shows an example of configuration of the mask information corresponding to the mask information number "No.4" shown in FIG. 34, and in this configuration "0" is set in each of the blocks in the shadowed section where compression (or extension) is executed with a high compression rate and "1" is set in each of the blocks in the blank section where compression is executed with a low compression rate or with no compression, and "2" is set in each of the blocks in the dot point section where compression (or extension) is executed with an intermediate compression rate. As described above, two or more types of compression rate can be used.

With the configuration described above, next description is made for operations thereof in the order of 1) processing for recording (compression) in the mask compression mode, 2) processing for regeneration (or for extension) of an image, and 3) processing for editing mask information (generation and updating of mask information).

1) Processing for recording (compression) in the mask compression mode

Figure 37:
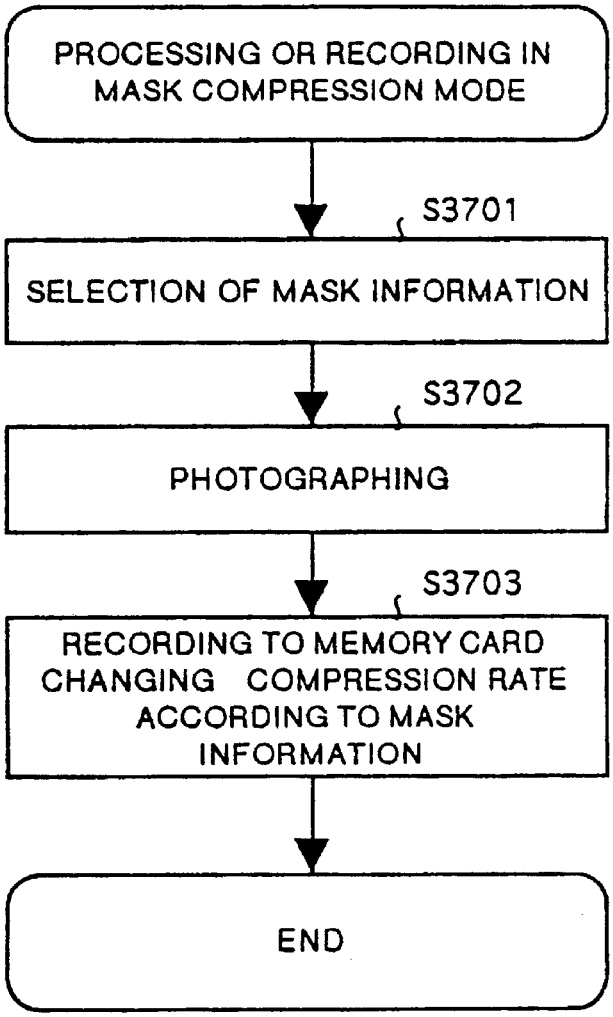
FIG. 37 is a flow chart showing processing for recording data (compression processing) according to mask compression mode.

FIG. 37 is a flow chart showing the processing for recording (compression) in the mask compression mode. When a user sets the mask compression mode display section 3210 in the displayed state and sets up a mask compression mode, the CPU 113 executes step S3701, and the mask information select screen is displayed on the liquid crystal panel 119 as shown in FIG. 34, and the user is prompted to select any of the mask information. Herein, if the user specifies the mask information number 3301 for desired mask information, the CPU 113 at first reads out the corresponding mask information from the MEM 114 and sets the mask information in the MEM 114.

Then when the user presses down the release button 1406, photographing is started and image data is inputted via the lens unit 104, CCD 105 and A/D converter 106 into the IPP 107 (S3702).

The IPP 107 executes the processing for compression changing the compression rate according to each blocks for the specified mask information and a compression rate thereof. It should be noted that change of a compression rate in this embodiment means change of a compression rate according to chrominance of image data. The image data outputted from the IPP 107 is recorded via the DCT 108, coder 109, MCC 110 into the memory card 103 (S3703). It should be noted that the CPU 113 adds, when recording compressed image data via the MCC into the memory card 103, mask identifying information for identifying the mask information used in the image data.

Figure 38:
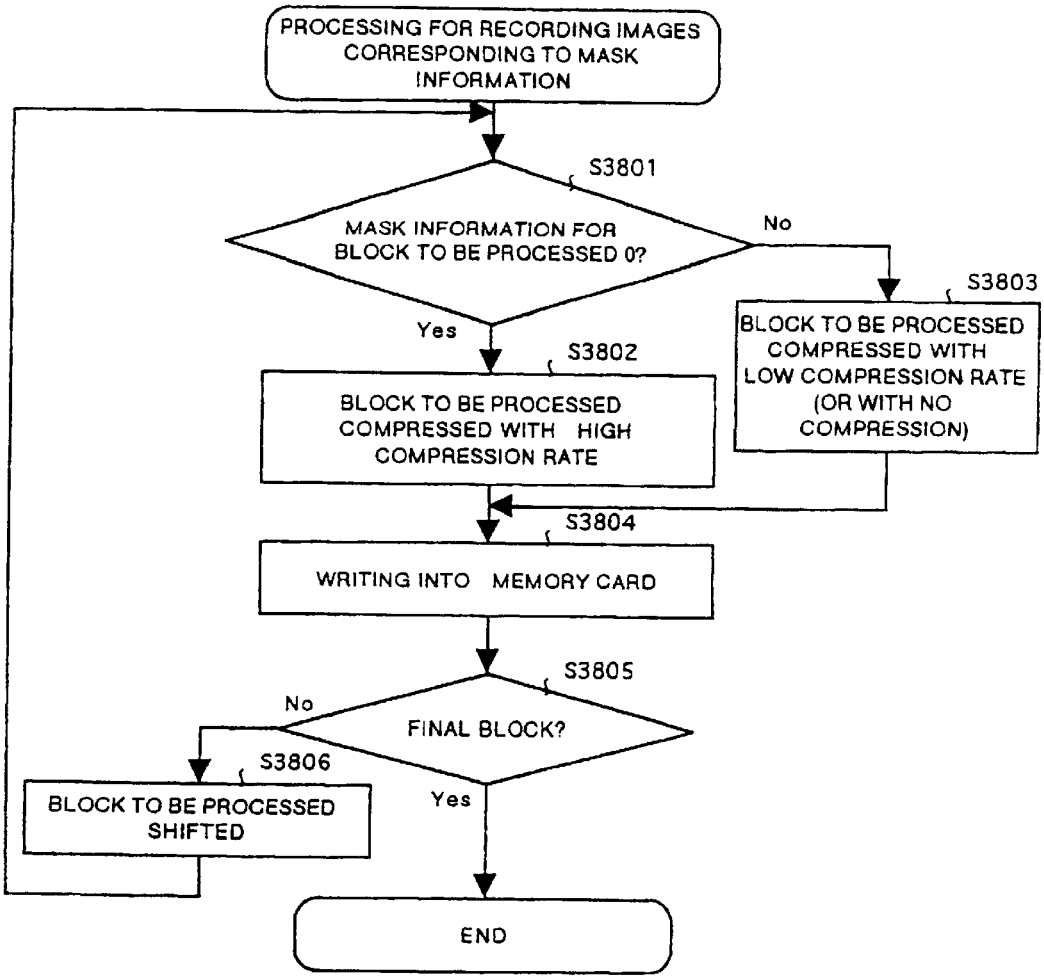
FIG. 38 is a flow chart showing processing for recording images according to mask information.
Figure 39:
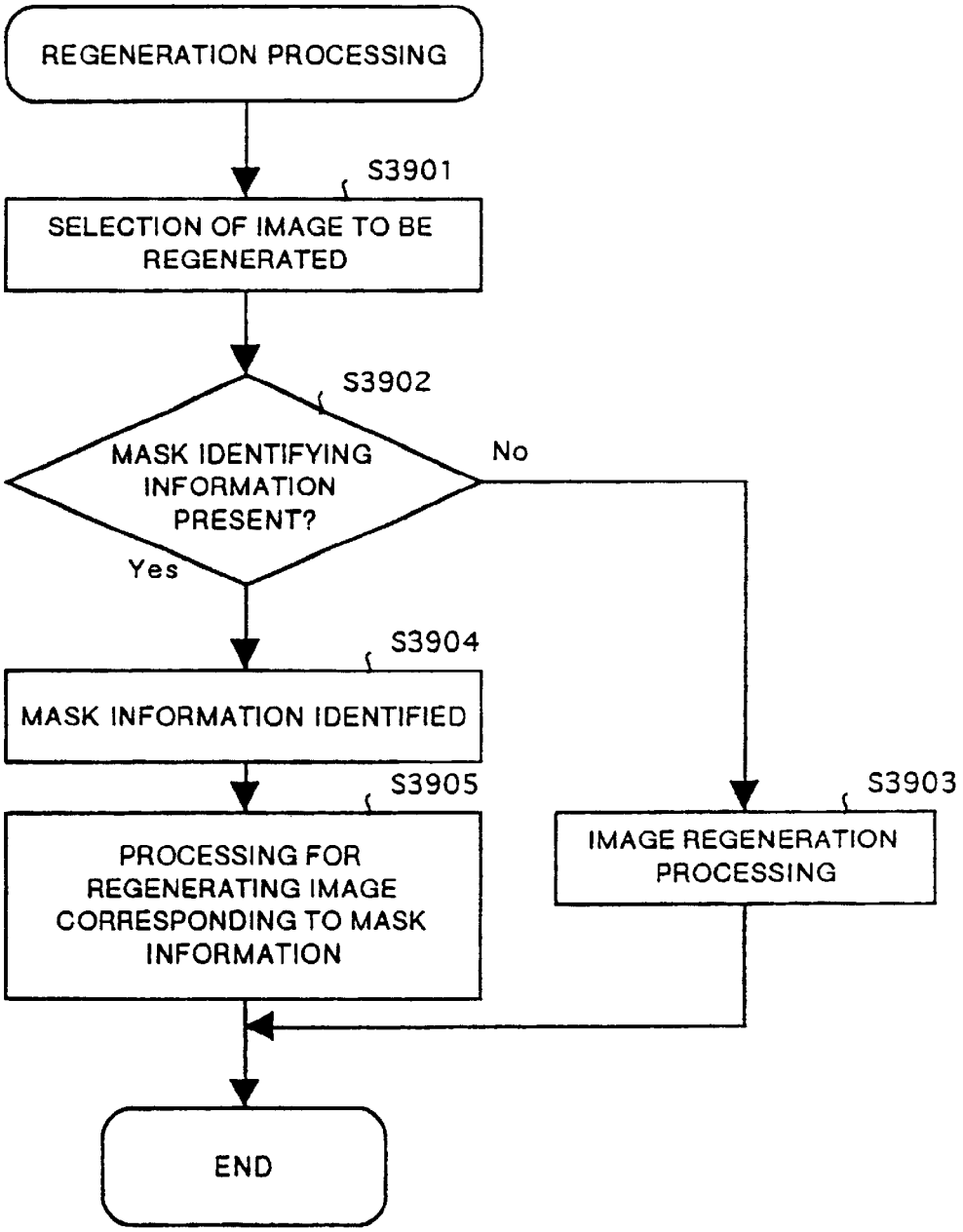
FIG. 39 is a flow chart showing processing for regenerating data (drawing processing)

Herein description is made for processing for recording an image according to the mask information in step S3703 with reference to the flow chart shown in FIG. 38. It should be noted that the following description is made for the purposes of simplification for a case where the processing for recording is executed using two types of compression rate (low compression rate; 0, and high compression rate: 1). At first, the image data is divided according to block of the mask information, determination is made as to whether mask information for a block to be processed is "0" or not (S3801), and if it is determined that the mask information for the block is "0", the block to be processed is compressed with a high compression rate (S3802), the corresponding image data is written in the memory card 103 (S3804), determination is made as to whether the block to be processed is a final one or not (S3805), and if it is determined that the block is not a final one, the block for processing is shifted (S3806), and system control returns to step S3801.

On the other hand, if it is determined in step S3801 that the mask information is not "0", the block to be processed is compressed with a low compression rate or with no compression (S3803), and the operations in step S3804 and on are executed.

As described above, image data is recorded in the memory card 103 changing a compression rate using the mask information, so that an image in the intended area (a main portion) can be recorded with a high volume of information according to a design intended by the user.

2) Processing for regenerating (extension of) an image

Next description is made for the processing for regenerating image data having been subjected to compression using mask information. In a case where an image recorded in the memory card 103 is regenerated, when a main switch 1401 is set in the regeneration mode, the image (a name or a number of an image file) stored in the memory card 103 is displayed on the liquid crystal panel 119. When a user selects a desired image to be regenerated via the operation display section 116 from the displayed images (S3901), the CPU 113 determines whether mask identifying information has been added to the image or not (S3902), and if it is determined that the mask identifying information has not been added, the CPU 113 reads out the image (compressed image) from the memory card 103, extends the corresponding image through the coder 109, DCT 108, and IPP 107, and displays the regenerated image on the liquid crystal panel 119 (S3903).

On the other hand, if it is determined that the mask identifying information has been added, the CPU 113 identifies the used mask information from the mask identifying formation, reads out the mask information from the MEM 114, and sets the mask information in the IPP 107 (S3904). Then the CPU 113 reads out the image (compressed image) from the memory card 103, transfers the image data via the coder 109, DCT 108 to the IPP 107, executes the processing for extension changing a compression rate (herein, an extension ratio) according to each of the blocks of the mask information set in the IPP 107 and a compression thereof as described above, and displays the regenerated image on the liquid crystal panel 119 (S3905).

As described above, it is possible to regenerate an intended area (a main portion) of an image recorded in the memory card 103 by using mask information and changing a compression rate according to a layout intended by a user and with a high volume of information.

It should be noted that, although the description of this embodiment above assumes a case where the digital still video camera itself is an image regenerating device, configuration of the embodiment is not limited to that described above, and for instance, an image regenerating device dedicated to a computer or a work station may be used.

Also it is possible to provide a selecting means for selecting desired mask information from a plurality of mask information in the side of the image regenerating device so that a user can select mask information to regenerate (or extend) the image.

3) Processing for editing mask information (processing for preparing and updating mask information)

Figure 40:
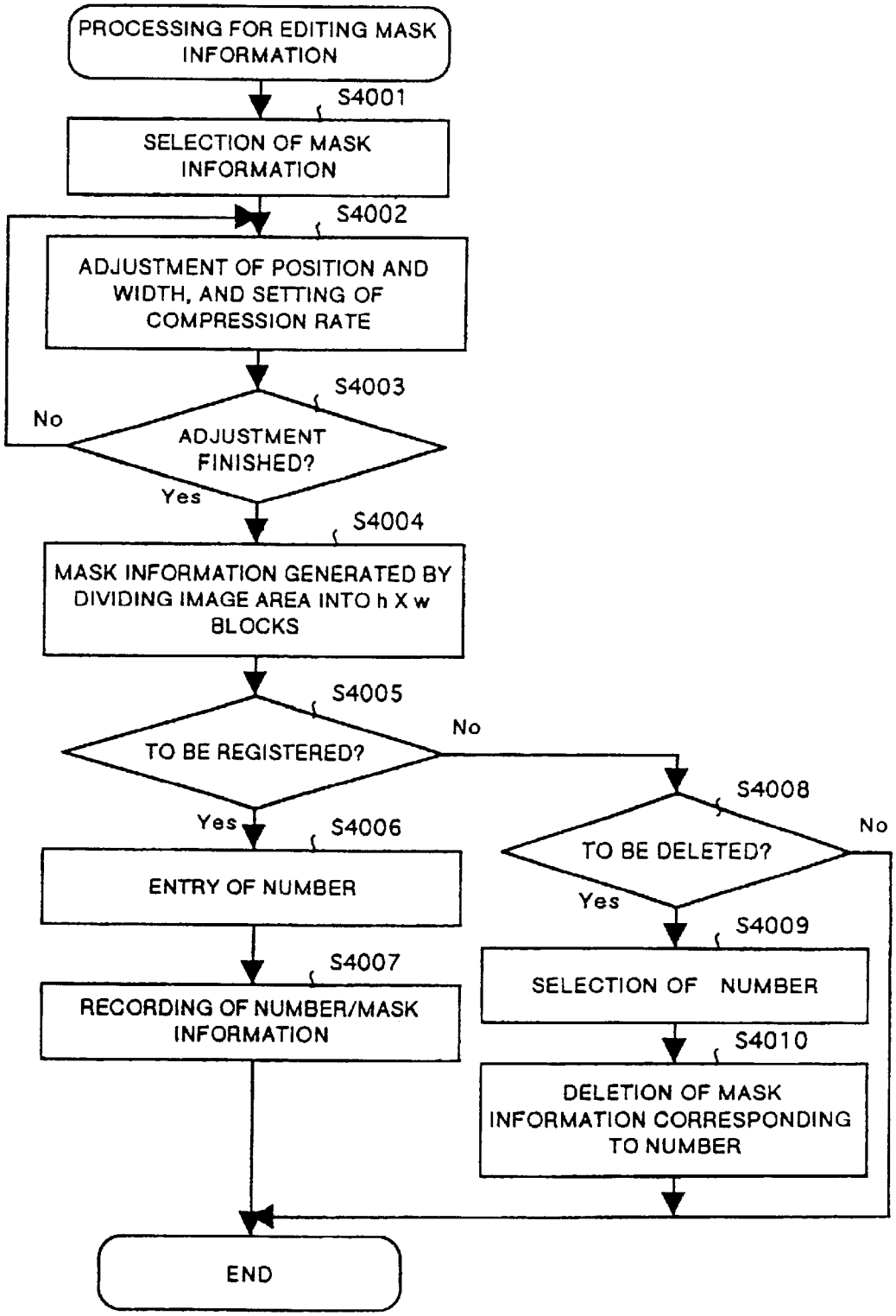
FIG. 40 is a flow chart showing processing for editing mask information (processing for preparing and updating mask information)

Next description is made for the processing for editing mask information (processing for preparing the updating mask information) with reference to FIG. 40. When the processing for editing mask information is executed, when a user calls out the mask information select screen shown in FIG. 34 according to the same procedure as that in the mask compression mode and presses down a specified switch in the operation display section 116, execution of operations indicated by the flow chart showing the processing for editing mask information as shown in FIG. 40 is started.

At first when a user specifies a mask information number from the mask information select screen and selects desired mask information, the selected mask information is displayed on the liquid crystal panel 119 (S4001). Then, the user adjusts a position and a width for dividing the image changing the compression rate with the liquid crystal panel 119 and the operation display section 116 to further set a new compression rate (S4002). Then the user presses down a specified button to input end of the adjustment (S4003), when the mask information is generated with the h×w blocks described above (S4004).

Then whether mask information is to be registered in the liquid crystal panel 119 or not is displayed (S4005), and if it is specified to register the mask information in the liquid crystal panel 119, the user is prompted to input (specify) a mask information number to be registered, and when the number is inputted (S4006), the mask information is recorded with the corresponding number in the MEM 114 (S4007), and then the processing is terminated.

On the other hand, if it is specified not to register the mask information in step S4005, whether the mask information is to be deleted or not is displayed on the liquid crystal panel 119 (S4008), and if deletion is selected, the user is prompted to input (specify) a mask information number to be deleted, and when the number is inputted (S4009), the mask information corresponding to the number is deleted from the MEM 114 (S4010), and the processing is terminated. If no deletion is selected in step S4008, the processing is terminated immediately.

As described above, as a user can prepare and update arbitrary mask information, for instance in a case where many images each having a specified distance and a layout are to be photographed, it is possible to record the required portion according to the user's intention without substantially reducing a volume of information. Also it is possible to set a compression rate according to the layout and a freedom in setting a compression rate increases.

FIG. 13 is a block diagram showing a digital still video camera according to Embodiment 12 of the present invention, and FIGS. 14A and 14B each show appearance of the basic body 101 of the camera. In the configuration shown in FIG. 13 and FIGS. 14A and 14B, the speaker 120 and earphone jack 122 play a role of plurality of voice output means according to the present invention, the operation display section 116 plays a role of the setting means according to the present invention, and the residual memory space computing means and the residual memory space reporting means comprises control programs stored in the CPU 113 and MEM 114, respectively. Further, FIG. 15 show display screens of the display panel according to Embodiment 12. Details of FIG. 13 to FIG. 15 were already described above, so that description thereof is omitted herein.

It should be noted that, although FIG. 15 shows a case where all types of information are displayed simultaneously, actually only necessary information is displayed. Also it is assumed that, in Embodiment 12, display in the still picture+voice mode is provided by using the still picture mode display section 1506 and the voice mode display section 1507 as described later.

Figure 41:
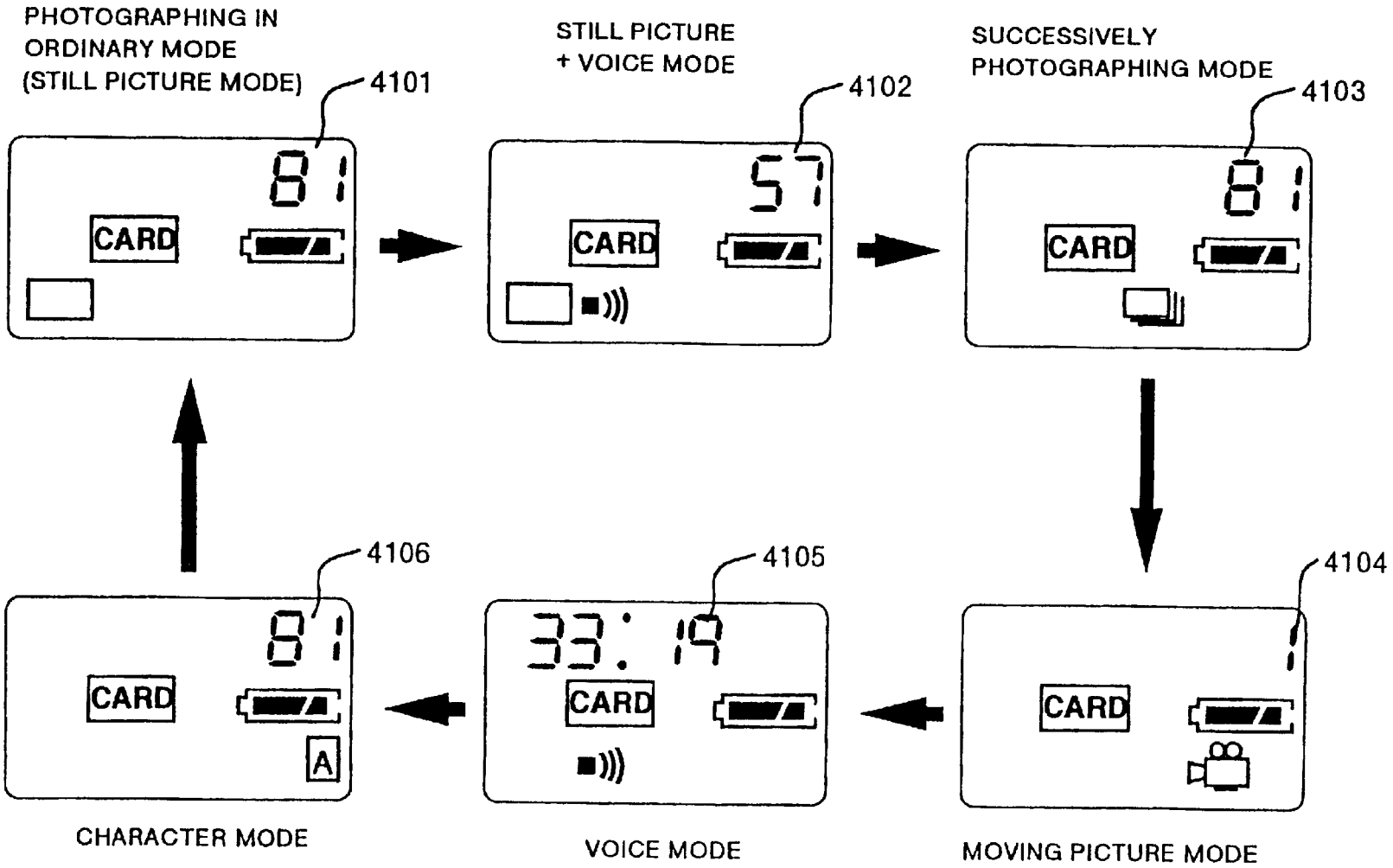
FIG. 41 is an explanatory view showing a switching state of the display screen on the display panel according to one of the set record mode.

In Embodiment 12, FIG. 41 shows switching of a display screen of the display panel 1412 in the set recording mode, and each time the recording mode button 1404 shown in FIGS. 14A and 14B is pressed down, as shown in the figure, a display screen of the display panel 1412 is switched. In this figure, designated at the reference number 4101 is a number of remaining sheet of sill pictures which can be photographed in the still picture mode, at 4102 a number of sheets of picture, which can be photographed in the still picture+voice mode, at 4103 a number of sheets of pictures which can be photographed in the successively photographing mode, at 4104 remaining times for photographing in the moving picture more, at 4105 a remaining period of time for photographing in the voice mode, and at 4106 a number of remaining sheets of picture which can be photographed in the character code, and a value computed according to a quantity of memory space for recording in the memory card 103 is displayed each time the recording mode is switched.

Figure 42:
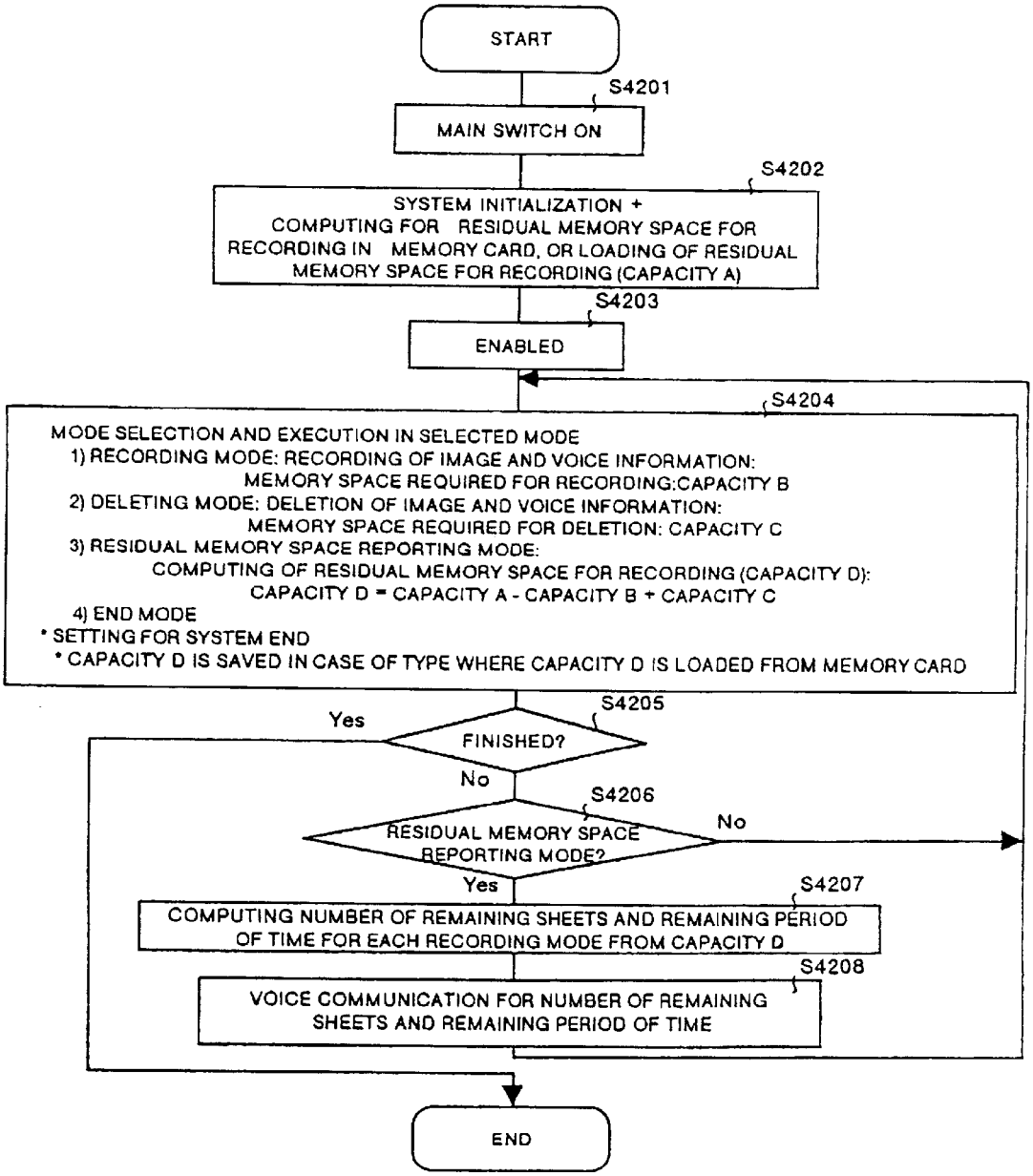
FIG. 42 is a schematic flow chart showing an operational sequence in Embodiment 12 of the present invention.

With the configuration above, now description is made for operations thereof. FIG. 42 is a flow chart showing operations in Embodiment 2. It should be noted that the digital still video camera according to Embodiment 12 has various types of operating mode including a recording mode for photographing an image and/or receiving voices and recording the data in the memory card 103, a deleting mode for deleting a file of images and/or voice recorded in the memory card 103, a residual memory space reporting mode for reporting a residual space memory in the memory card 103, a regenerating mode for regenerating images and/or voices recorded in the memory card 103, a searching mode for searching a file of images and/or voices recorded in the memory card 103, a communication mode for transferring a file of images and/or voices recorded in the memory card 103 to an external device by means of communications, and an end mode for executing the processing for termination upon power turn OFF by the main switch 1401, but herein to simplify description, description is made only for the recording mode and deleting mode each giving influence to a remaining memory space for recording in the memory card 103 and the residual memory space reporting mode which is a key portion of the present invention.

When the main switch 1401 of the basic body 101 of the camera is switched to power ON (recording mode) or power ON (regenerating mode) (S4201), the CPU 113 starts initial setting for the system, and at the same time computes a residual memory space variable for recording in the memory card 103 (S4202).

It should be noted that the residual memory space (capacity A) for recording in the memory card 103 can be computed by subtracting memory space having been used for recording various types of memory space from a rate memory capacity of the memory card 103. Also a method is allowable in which a residual space memory is recorded at a certain area of the memory card 103, and in this case, after power is turned ON, the recorded residual space may be read out from the memory card 103.

Then, initial setting for the system is finished, and so long as any error is not generated, the system is enabled (S4203).

When the system is enabled, a user selects a mode through the operation display section 116 and inputs the selected mode, when the CPU 113 executes operation (1) to (4) in the selected mode (S4204). Although detailed description is not made herein, the recording mode is selected by setting the main switch 1401 in power ON (recording mode), and the deleting mode as well as the residual memory space reporting mode is set as the power is turned ON (regenerating mode) and the mode selection is executed. Also the end mode is selected by setting the main switch 1401 in power OFF and is executed before actually the power is disconnected.

(1) When the recording mode is selected, the CPU 113 records image and voice information in the memory card 103, then computes a memory space (capacity B) required for recording the information, and maintains the data.

(2) When the deleting mode is selected, the CPU 113 computes a memory space (capacity C) for the image/voice data having been deleted from the memory card 103, and stores the data.

(3) When the residual space memory reporting mode is selected, the CPU 113 sets the residual memory space reporting mode and computes a memory space currently available for recording (capacity D).

It should be noted that the capacity D=Capacity A−Capacity B+Capacity C.

(4) When the power is turned OFF and the end mode is selected, system end is set. In this step, in a case where the capacity A is read from the memory card 103, the memory space available for recording at the current point of time (capacity D) is recorded in a specified area of the memory card 103.

Then, determination is made as to whether system operation is to be terminated or not (S4205), and if it is determined that the system operation is to be terminated, the processing is terminated. If not, determination is made as to whether the residual memory space reporting mode has been set or not (S4206), and if it is determined that the residual memory space reporting mode has not been set, system control returns to step 4204, and if it is determined that the residual memory space reporting mode has been set, system controls goes to step S4207.

In step S4207, a number of remaining sheets of pictures which can be photographed and a remaining period of time operable in each recording mode (such as the still picture mode or voice mode) is computed from a residual memory space (capacity D) at the current point of time. Then the number of remaining sheets of pictures and remaining period of time (namely the residual memory space D) are communicated in voice through the speaker 120, and then system control returns to step S4204.

It should be noted that there are a number of recording modes in a digital still vide camera including a still picture mode, a still picture+voice mode, a successively photographing mode, a moving picture mode, a voice mode, and character mode. For this reason, a memory space required for recording in the memory card 103 varies according to the recording mode. So it is important to compute a residual memory space available for recording in each recording mode and communicate it in voice through the speaker 120.

Also when an image is recorded, if a plurality levels of compression rates in recording can be selected, a memory space available for recording is computed for each compression rate, and further when a compression rate automatically changes according to an object to be photographed, a residual memory space is computed using a compression rate for the highest image quality. Also in a case of voices, if the compression rate can be changed, a residual memory space is computed for each compression rate.

As described above, by setting the residual memory space reporting mode, each time the recording mode or the deleting mode is executed, a residual memory space available for recording at the point of time is communicated in voice, so that it is possible to alert a user with voice communications and accurately tell the user the residual memory space for recording in the memory card 103. Also it is not necessary to check the display panel 1412 of the basic body 101 of the camera, so that the user can concentrate only to an object to be photographed when photographing an image. Also it is not necessary for a user to remember many display codes even in a case where the display panel 1412 is small, so that the user can always check a residual memory space available for recording, which improves convenience in use of the digital still vide camera.

In the digital still video camera according to Embodiment 13 of the present invention, in a case where the residual memory space reporting mode is set, it is possible to specify any of a plurality of voice output means (speaker 120 and earphone jack 122) for output of voice for reporting the residual memory space to the user.

It should be noted that, as configuration of the digital still video camera is the same as that in Embodiment 12, description is made herein only for different portions.

Figure 43:
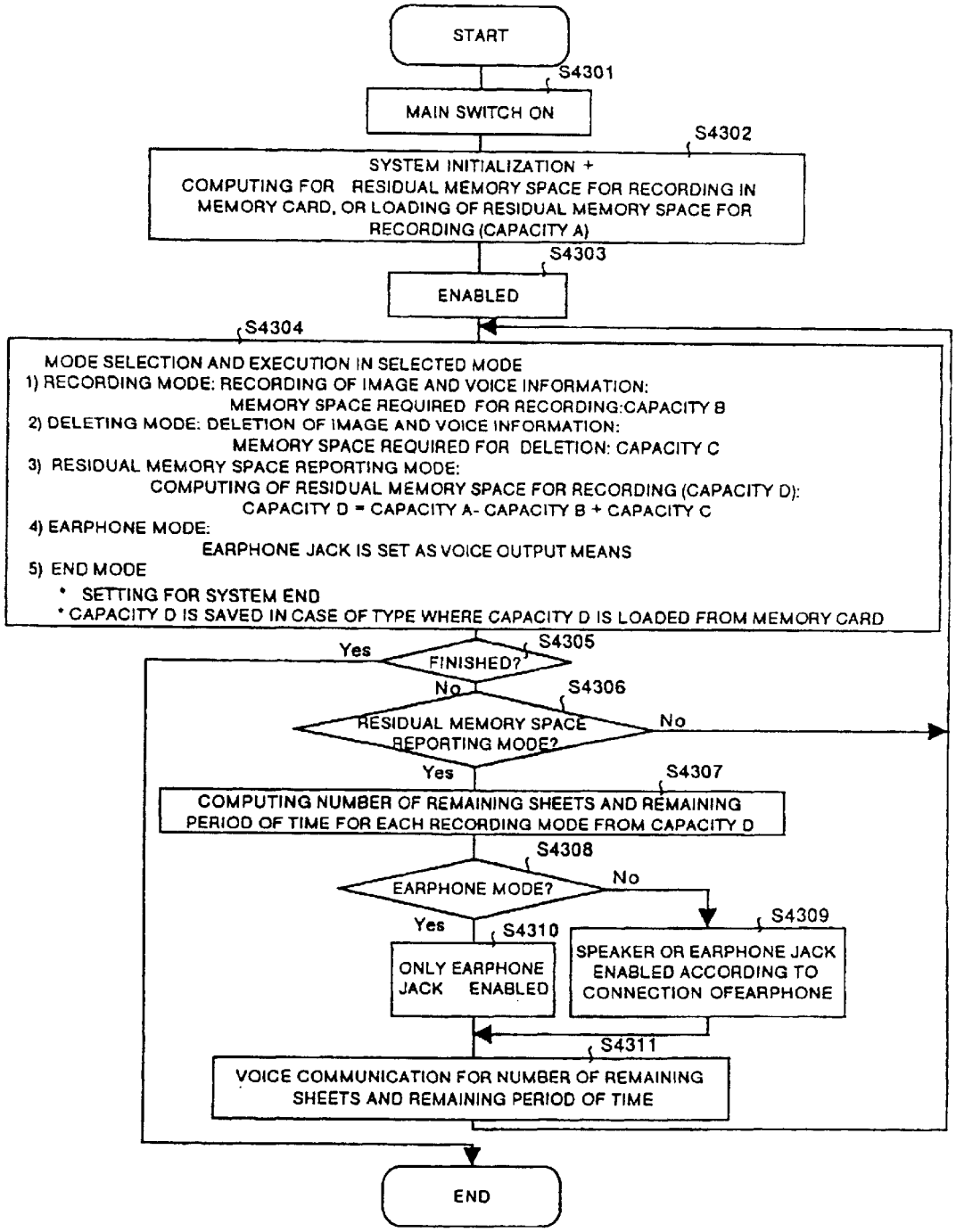
FIG. 43 is a schematic flow chart showing an operational sequence in Embodiment 13 of the present invention.

FIG. 43 is a general flow chart showing operations in Embodiment 13, and when the main switch 1401 on the basic body 101 of the camera is switched to power ON (recording mode) or power ON (regenerating mode) (S4301), the CPU 113 starts initialization of the system and at the same time computes a residual memory space (capacity A) for recording in the memory card 103 (S4302).

Then system initialization is finished, and if there has occurred no error, the system is enabled (S4303).

When the system is enabled, a user selects a mode through the operation display section 116 and inputs the selected mode, when the CPU 113 executes operation (1) to (4) in the selected mode (S4304). Although detailed description is not made herein, the recording mode is selected by setting the main switch 1401 in power ON (recording mode), and the deleting mode, the residual memory space reporting mode, and the earphone mode (a mode in which the earphone jack 122 is specified as a voice output means) are set as the power is turned ON (regenerating mode) and the mode selection is executed. Also the end mode is selected by setting the main switch 1401 in power OFF and is executed before actually the power is disconnected.

(1) When the recording mode is selected, the CPU 113 records image and voice information in the memory card 103, then computes a memory space required for recording the information, and maintains the data.

(2) When the deleting mode is selected, the CPU 113 computes a memory space (capacity C) for the image/voice data having been deleted from the memory card 103, and stores the data.

(3) When the residual space memory reporting mode is selected, the CPU 113 sets the residual memory space reporting mode and computes a memory space (capacity B) currently available for recording (capacity D).

It should be noted that the capacity D=Capacity A−Capacity B+Capacity C.

(4) When the earphone mode is selected, the earphone jack 122 is set as a voice output means.

(5) When the power is turned OFF and the end mode is selected, system end is set. In this step, in a case where the capacity A is read from the memory card 103, the memory space available for recording at the current point of time (capacity D) is recorded in a specified area of the memory card 103.

Then, determination is made as to whether system operation is to be terminated or not (S4305), and if it is determined that the system operation is to be terminated, the processing is terminated. If not, determination is made as to whether the residual memory space reporting mode has been set or not (S4306), and if it is determined that the residual memory space reporting mode has not been set, system control returns to step 4304, and if it is determined that the residual memory space reporting mode has been set, system controls goes to step S4307.

In step S4307, a number of remaining sheets of pictures which can be photographed further and a remaining period of time operable further in each recording mode (still picture mode, voice mode, etc) are computed from a residual memory space available at the current point of time (capacity D). Then determination is made as to whether the current mode is the earphone mode or not (S4308), and if it is determined that the current mode is not the earphone mode, system control goes to step S4309, and if it is determined that the current mode is the earphone mode, system control goes to step S4310.

In step S4309, as shown in Table 1, either one of the speaker 120 or the earphone jack 122 is enabled as a voice output means according to whether an earphone has been connected to the earphone jack 122 or not. Then the number of remaining sheets and the remaining period of time (namely capacity D) are communicated in voice via the enabled speaker 120 or earphone jack 122 (S4311), and system control goes to step S4304.

TABLE 1

| | CONNECTION OF EARPHONE | |
|---|---|---|
| | DISCONNECTED | CONNECTED |
| SPEAKER | ○ | x |
| EARPHONE JACK | x | ○ |

○: VOICE IS OUTPUTTED (ENABLE TO USE)
x: VOICE IS NOT OUTPUTTED

In step S4310, as shown in Table 2, only the earphone jack 122 is enabled as a voice output means regardless of whether an earphone has been connected to the earphone jack 122 or not. Then the number of reamining sheets and the remaining period of time (namely the capacity D) are communicated in voice via the earphone jack 122 (S311), and system control returns to step S4304.

TABLE 2

| | CONNECTION OF EARPHONE | |
|---|---|---|
| | DISCONNECTED | CONNECTED |
| SPEAKER | x | x |
| EARPHONE JACK | x | ○ |

○: VOICE IS OUTPUTTED (ENABLE TO USE)
x: VOICE IS NOT OUTPUTTED

As described above, in Embodiment 13, as it possible to specify the earphone jack 122 as a voice output means by setting the earphone mode, even in a case, for instance, where the mode for recording voices and the residual memory space reporting mode have been specified simultaneously, it is possible to record only voices as an object for recording. Namely, even in a case where the residual memory space reporting mode is selected while recording voices in a conference or others, it is possible to prevent voice communications for reporting the residual memory space and voices as an object for recording from being recorded simultaneously, which improves convenience in use.

In the digital still video camera according to Embodiment 14, in a case where the residual memory space reporting mode is set, it is possible to select a recording mode for which a residual memory space for recording is communicated, and voice output for a residual memory space is provided only in the selected recording mode.

It should be noted that configuration of the digital still video camera according to Embodiment 14 is the same as that in Embodiment 12 and description is made herein only for different portions.

Figure 44:
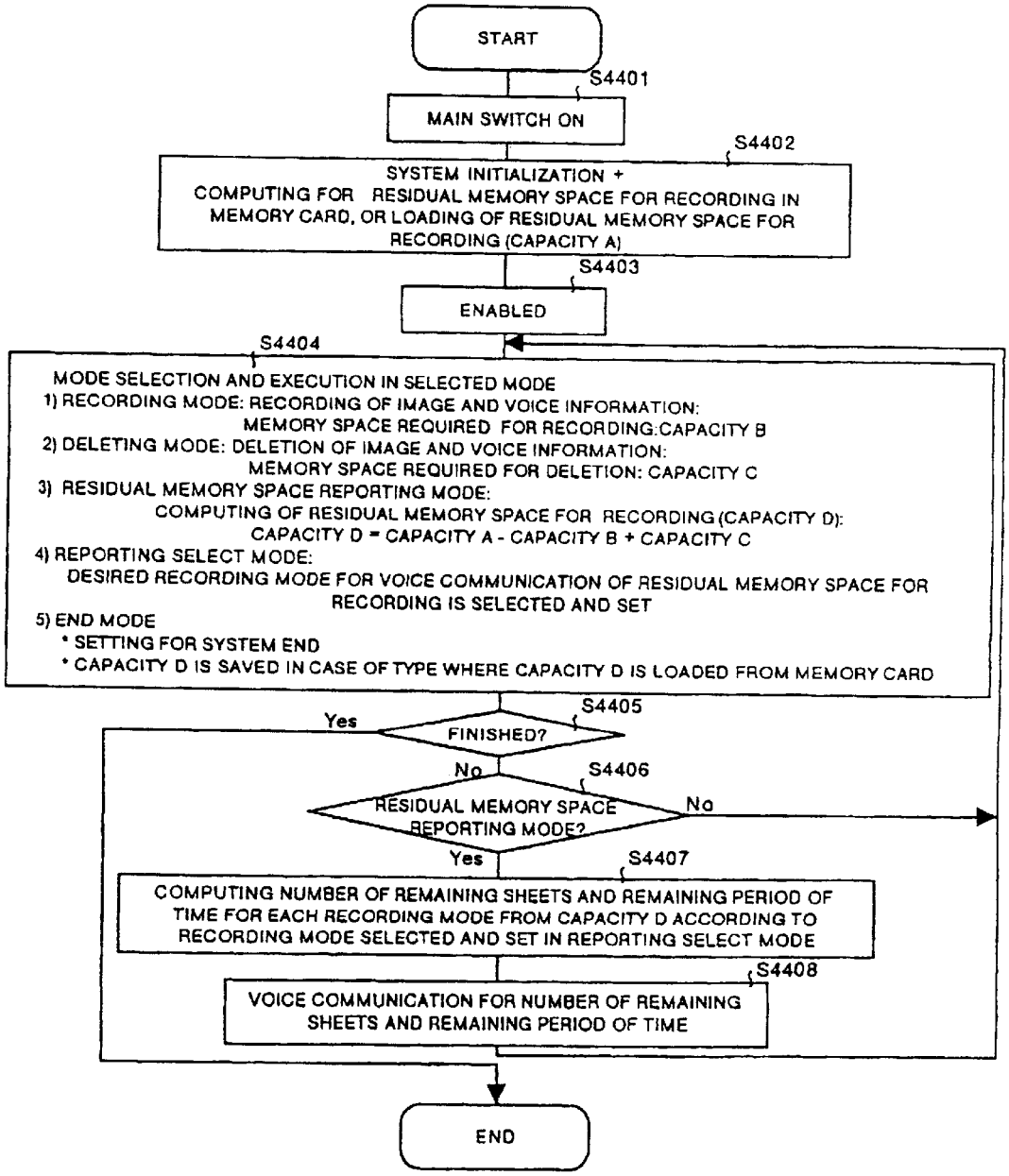
FIG. 44 is a schematic flow chart showing an operational sequence in Embodiment 14 of the present invention.

FIG. 44 is a general flow chart showing operations in Embodiment 14, and when the main switch 1401 on the basic body 101 of the camera is switched to power ON (recording mode) or power ON (regenerating mode) (S4401), the CPU 113 starts initialization of the system and at the same time computes a residual memory space (capacity A) for recording in the memory card 103 (S4402).

Then system initialization is finished, and if there has occurred no error, the system is enabled (S4403).

When the system is enabled, a user selects a mode through the operation display section 116 and inputs the selected mode, when the CPU 113 executes operation (1) to (5) in the selected mode (S4404). Although detailed description is not made herein, the recording mode is selected by setting the main switch 1401 in power ON (recording mode), and the deleting mode, the residual memory space reporting mode, and the reporting select mode (a mode in which any among a plurality of reporting modes is selected for reporting the residual memory space) are set as the power is turned ON (regenerating mode) and the mode selection is executed. Also the end mode is selected by setting the main switch 1401 in power OFF and is executed before actually the power is disconnected.

(1) When the recording mode is selected, the CPU 113 records image and voice information in the memory card 103, then computes a memory space required for recording the information (capacity B), and maintains the data.

(2) When the deleting mode is selected, the CPU 113 computes a memory space (capacity C) for the image/voice data having been deleted from the memory card 103, and stores the data.

(3) When the residual space memory reporting mode is selected, the CPU 113 sets the residual memory space reporting mode and computes a memory space currently available for recording (capacity D).

It should be noted that the capacity D=Capacity A−Capacity B+Capacity C.

(4) When the reporting select mode is specified, a recording mode for which communicating is voice of a residual memory space available for recording is required is selected and set.

(5) When the power is turned OFF and the end mode is selected, system end is set. In this step, in a case where the capacity A is read from the memory card 103, the memory space available for recording at the current point of time (capacity D) is recorded in a specified area of the memory card 103.

Then, determination is made as to whether system operation is to be terminated or not (S4405), and if it is determined that the system operation is to be terminated, the processing is terminated. If not, determination is made as to whether the residual memory space reporting mode has been set or not (S4406), and if it is determined that the residual memory space reporting mode has not been set, system control returns to step 4404, and if it is determined that the residual memory space reporting mode has been set, system controls goes to step S4407.

In step S4407, a number of remaining sheets of pictures which can be photographed further and a remaining period of time operable further in each recording mode are computed from a residual memory space available at the current point of time (capacity D) according to the recording mode selected and set in the reporting select mode. Then the number of remaining sheets and the remaining period of time (namely capacity D) are communicated in voice through the speaker 120 (S4408), and system control returns to step S4404.

In Embodiment 14, as described above, a residual memory space can be communicated in voice only in the recording mode selected and set in the reporting select mode. For this reason, in a digital still video camera having a number of complicated recording modes, a user can save a time required for communicating in voce a residual memory space for recording by setting a recording mode frequency used by the user.

In the digital still video camera according to Embodiment 15, it is possible to specify conditions for reporting a residual memory space for recording in the memory card 103, and in a case where the conditions for reporting have been specified and also a residual memory space in the memory card 103 satisfies the conditions for reporting above, the residual memory space is communicated in voice.

It should be noted that, as configuration of the digital still video camera according to Embodiment 15 is the same as that in Embodiment 12, description is made only for different portions.

Figure 45:
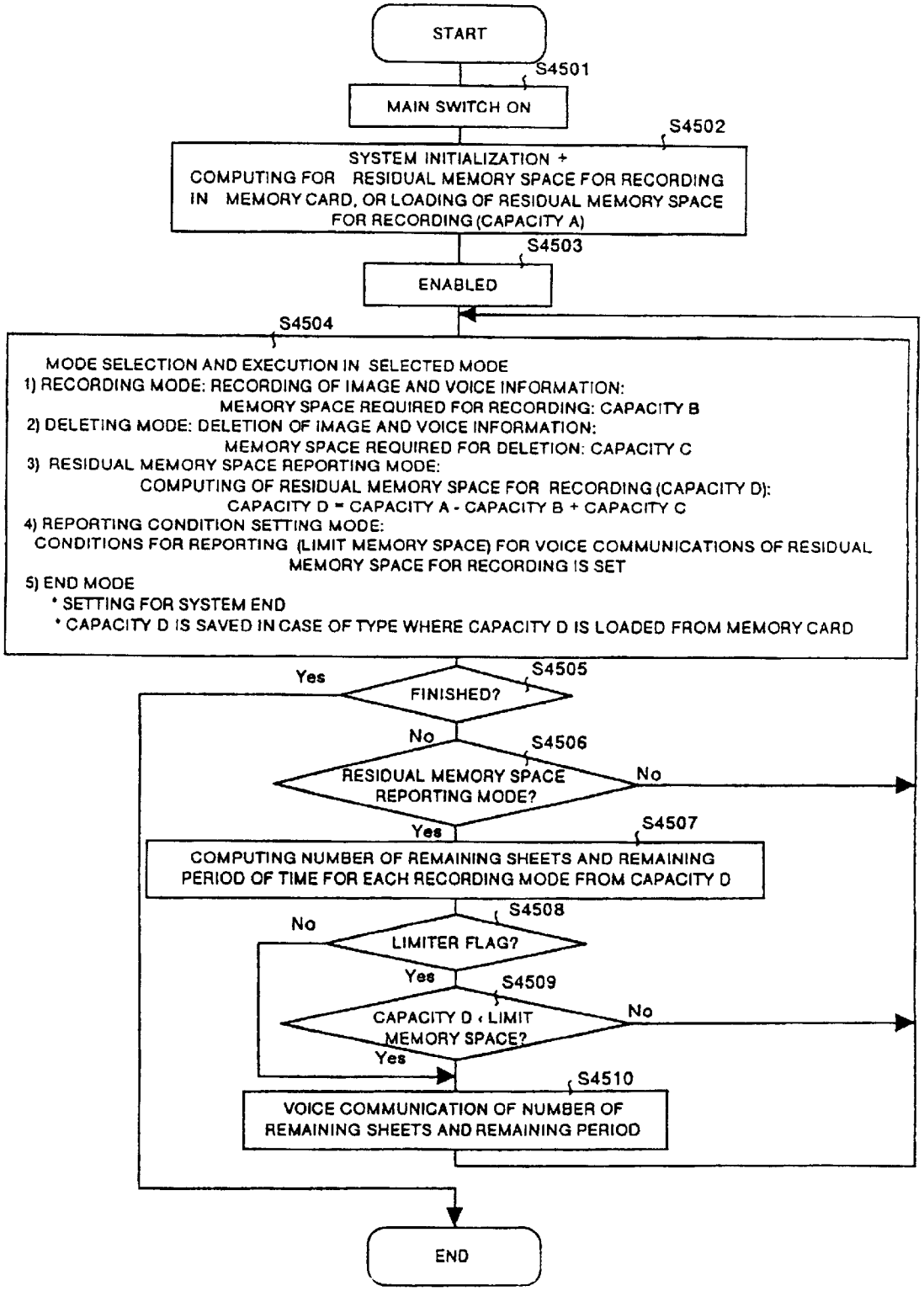
FIG. 45 is a schematic flow chart showing an operational sequence in Embodiment 15 of the present invention.

FIG. 45 is a general flow chart showing operations in Embodiment 15, and when the main switch 1401 on the basic body 101 of the camera is switched to power ON (recording mode) or power ON (regenerating mode) (S4501), the CPU 113 starts initialization of the system and at the same time computes a residual memory space (capacity A) for recording in the memory card 103 (S4502).

Then system initialization is finished, and if there has occurred no error, the system is enabled (S4503).

When the system is enabled, a user selects a mode through the operation display section 116 and inputs the selected mode, when the CPU 113 executes operation (1) to (5) in the selected mode (S4504). Although detailed description is not made herein, the recording mode is selected by setting the main switch 1401 in power ON (recording mode), and the deleting mode, the residual memory space reporting mode, and the reporting condition setting mode (a mode in which conditions for reporting a residual memory in the memory card 103 is specified) are set as the power is turned ON (regenerating mode) and the mode selection is executed. Also the end mode is selected by setting the main switch 1401 in power OFF and is executed before actually the power is disconnected.

(1) When the recording mode is selected, the CPU 113 records image and voice information in the memory card 103, then computes a memory space required for recording the information (capacity B), and maintains the data.

(2) When the deleting mode is selected, the CPU 113 computes a memory space (capacity C) for the image/voice data having been deleted from the memory card 103, and stores the data.

(3) When the residual space memory reporting mode is selected, the CPU 113 sets the residual memory space reporting mode and computes a memory space currently available for recording (capacity D).

It should be noted that the capacity D=Capacity A−Capacity B+Capacity D.

(4) In a case where the reporting condition setting mode is selected, a limiter flag is set, and the conditions for reporting a residual memory space for recording in voice are set. Herein as a condition for reporting, a limit memory space is set.

As the limit memory space, it is possible to set a percentage (x %) against the total recording capacity of the memory card 103, or to set a remaining byte (xMB: mega byte), a number of remaining sheets (x sheets), a remaining period of time (x hours), and remaining times (x times).

(5) When the power is turned OFF and the end mode is selected, system end is set. In this step, in a case where the capacity A is read from the memory card 103, the memory space available for recording at the current point of time (capacity D) is recorded in a specified area of the memory card 103.

Then, determination is made as to whether system operation is to be terminated or not (S4505), and if it is determined that the system operation is to be terminated, the processing is terminated. If not, determination is made as to whether the residual memory space reporting mode has been set or not (S4506), and if it is determined that the residual memory space reporting mode has not been set, system control returns to step 4504, and if it is determined that the residual memory space reporting means has been set, system controls goes to step S4507.

In step S4507, a number of remaining sheets of pictures which can be photographed further and a remaining period of time operable further in each recording mode are computed from a residual memory space available at the current point of time (capacity D) according to the recording mode selected and set in the reporting select mode. Then determination is made as to whether the limiter flag has been set or not (S4508), and if it is determined that the limiter flag has not been set, system control goes to step S4510, and the number of remaining sheets and the remaining period of time (namely capacity D) are communicated in voice through the speaker 120, and then system control returns to step S4504.

On the other hand, if it is determined in step S4508 that the limiter flag has been set, determination is made as to whether a residual memory space for recording at the current point of time (capacity D) has reached the limited memory space or not (S4509), and if it is determined that the residual space memory D is lower than the limit memory space, a number of remaining sheets and a remaining period of time (namely the residual memory space D) are communicated in voice, and system control returns to step S4504. Also if it is determined that the residual memory space is not less then the limit memory D, system control returns to step S4505 immediately.

As described above, in Embodiment 15, as it is possible to set a timing for reporting a residual memory space by setting the conditions for reporting, a residual memory space can be communicated in voice at a timing desired by a user.

Further FIG 13 is a block diagram showing the digital still video camera according to Embodiment 16. Details of FIG. 13 were described above, so description thereof is omitted herein.

Configuration in Embodiment 16 is the same as that shown in FIG. 13, and the memory card 103 plays a role as a memory means according to the present invention, and the liquid crystal monitor 102 plays a role as an image displaying means according to the present invention. Also the mask retaining means is realized with the MEM 114, and a plurality types of mask are registered therein. Further the selecting means for selecting a mask and a residual memory space recognizing means for recognizing a residual memory space in the memory card 103 is realized by the CPU 113, the control means is realized with a control programs (Refer to the flow charts shown in each figure) stored in ROMs in the CPU 113 as well as in the MEM 114, and the input means is realized by the operation display section 116.

Although not shown herein, the operation display section 116 comprises various types of button and switch and a display panel, and the various types of button and switch include a main switch of a basic body of the camera, a self mode button for setting a mode (self mode) for photographing with a self timer, a zoom lever for changing a size of an object to be photographed within a finder, a photographing mode setting button, and a release button which is a two-stage button starting operation of the auto-focus mechanism when pressed down by half and also starting recording into the memory card 103 when fully pressed down.

Namely when the release button (shutter) is pressed down by half, an object to be photographed caught by the lens unit 104 is displayed on the LCD 119, and when the release button is fully pressed down, the displayed image is recorded into the memory card 103. It should be noted that a size of an image recorded into the memory card 103 in the normal mode is fixed at H (pixels) in the vertical direction×W (pixels) in the horizontal direction regardless of whether image compression is to be executed.

With the configuration as described above, next description is made for operations in each section of the digital still video camera according to Embodiment 16 with reference to the related flow charts and explanatory views.

Figure 46:
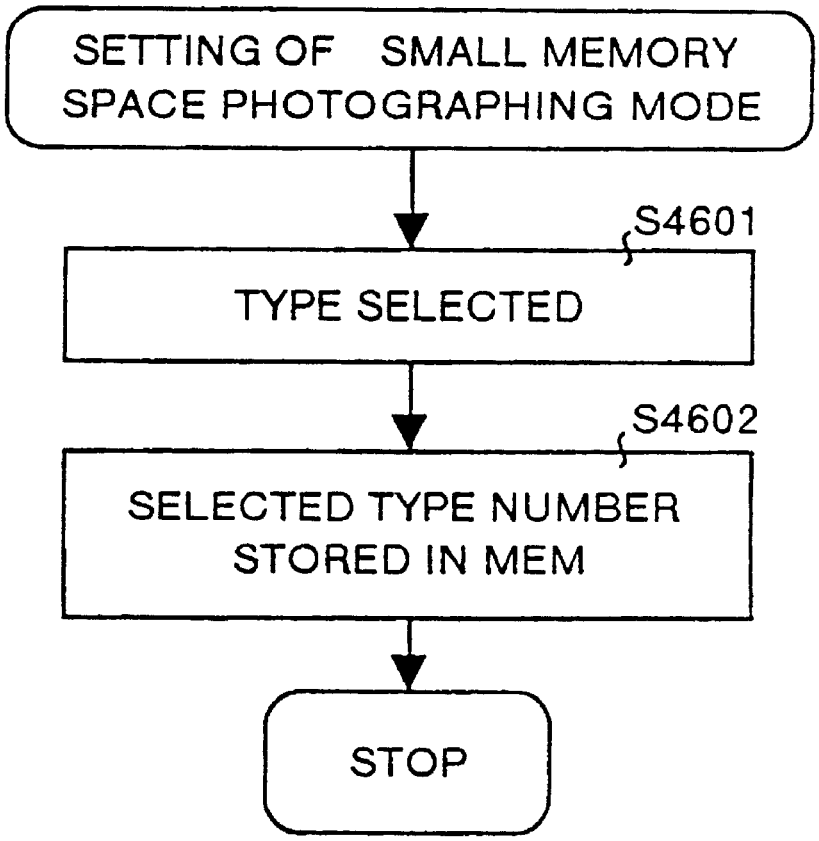
FIG. 46 is a flow chart for explaining an operational sequence in processing for setting the mode for photographing with a small quantity of low memory space in a digital still video camera according to Embodiment 16 of the present invention.
Figures 47A, 47B, 47C:
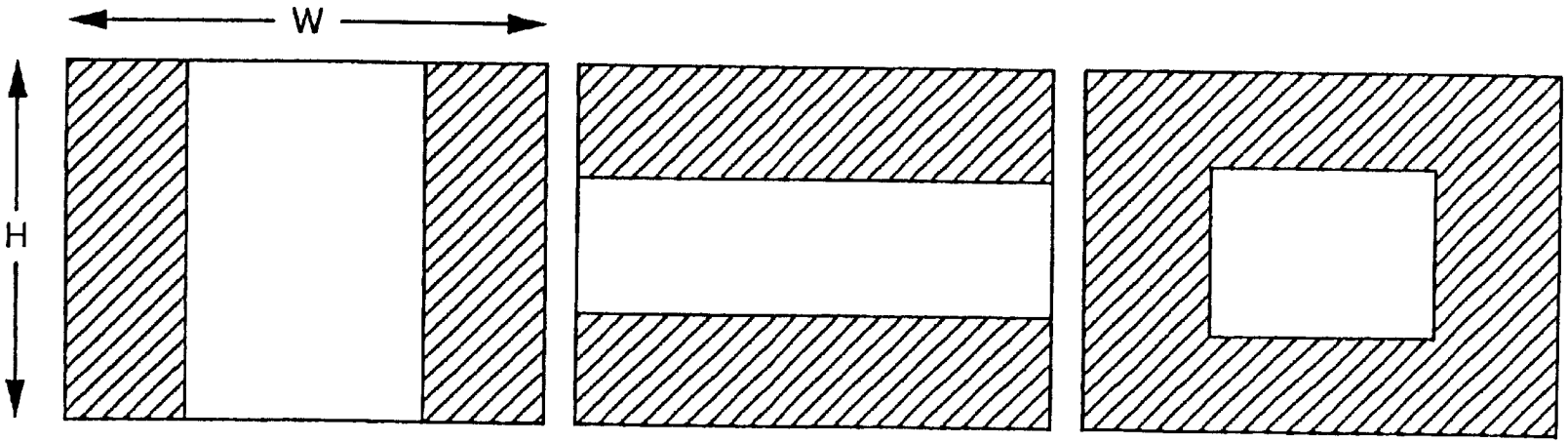
FIGS. 47A to 47C are explanatory views showing various types of masks previously prepared in the digital still video camera according to Embodiment 16.

At first, description is made for operations for setting a small memory space photographing mode with reference to the flow chart in FIG. 46. Setting is executed, when the digital still vide camera has been enabled, by pressing the photographing mode setting button in the operation display section 116. In step S4601, a mask type is selected from various types of mask previously prepared as shown in FIG. 47A, FIG. 47B, and FIG. 47C. Herein the shadowed section indicates an area where any image is not recorded, and when any type of mask is selected, the small memory space photographing mode is effected in which a memory space smaller than that of H [pixels] in the vertical direction×W

[pixels] in the horizontal mode required for an image size in the ordinary photographing mode. In step S4602, a type number of the selected mask is stored in a RAM of the MEM 114.

Figure 48:
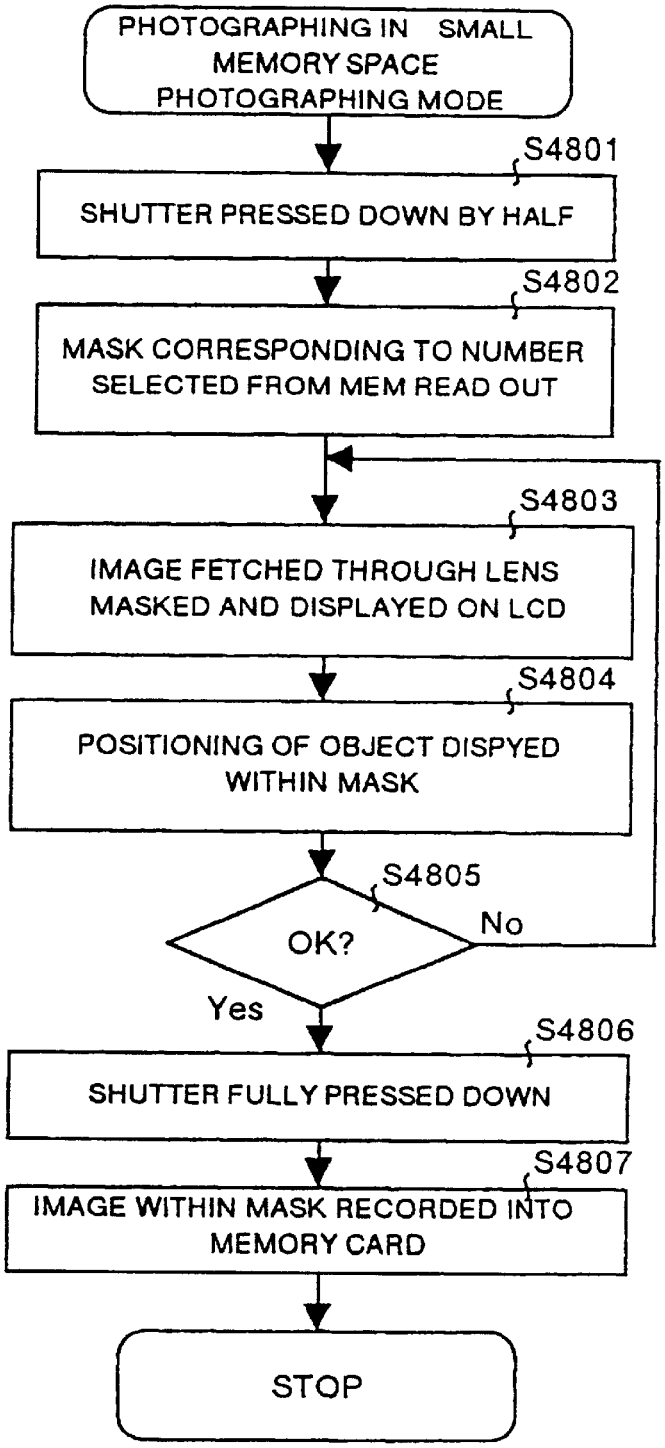
FIG. 48 is a flow chart for explaining an operational sequence in the mode for photographing mode with a small quantity of memory space.
Figure 49A:
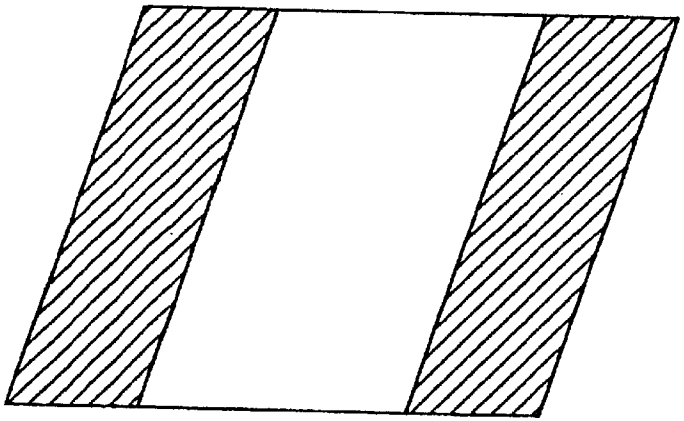
FIGS. 49A to 49D are explanatory views for explaining operations in processing the photographing mode with a small quantity.
Figure 49B:
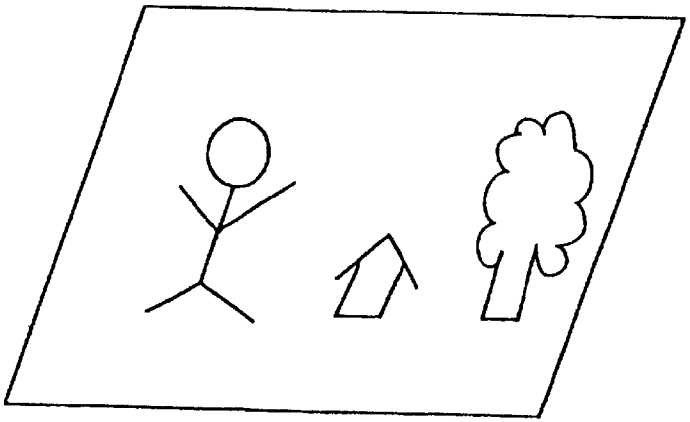

Then description is made for photographing in the small memory space photographing mode with reference to the flow chart shown in FIG. 48. Herein description is made on the assumption that the mask shown in FIG. 49A has been selected, and the object as shown in FIG. 49B is to be photographed.

Figure 49C:
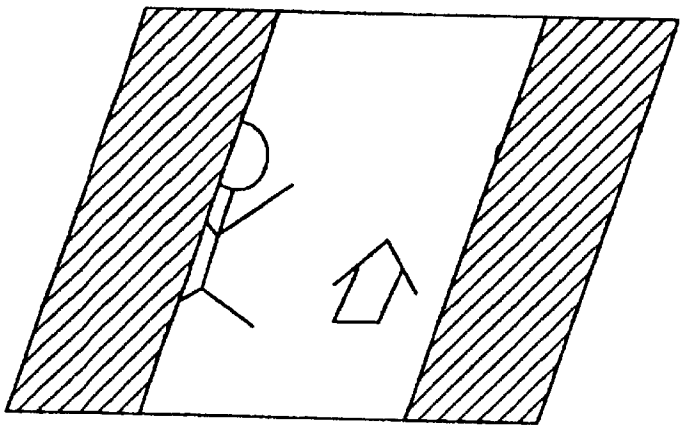

At first, in step S4801, when the release button (shutter) is pressed down by half, the mask corresponding to a number selected from the MEM 114 (Refer to FIG. 49A) is read out (step S4802), the image fetched through the lens unit 104 (Refer to FIG. 49B) is masked, and the image is displayed on the LCD 119 as shown in FIG. 49C (step S4803).

Figure 49D:
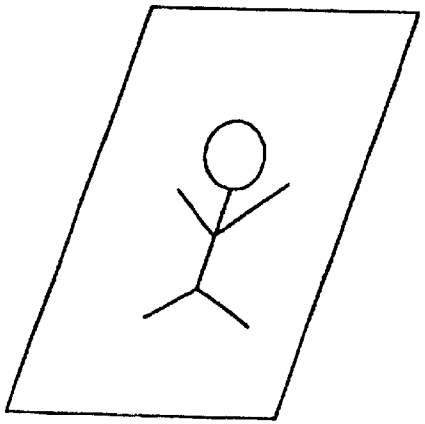

Herein a photographer executes positioning for the object to be photographed displayed within the mask (S4804), and when the desired object is positioned within an area where recording can be executed ("Yes" in determination in step S4805), the release button (shutter) is fully pressed down (S4806), the image within the mask (Refer to FIG. 49D) is recorded in the memory card 103 (step S4807). In this step, a type number for the mask is added as a header for the image data, and the type number is used when the image data is regenerated and displayed.

Figure 50:
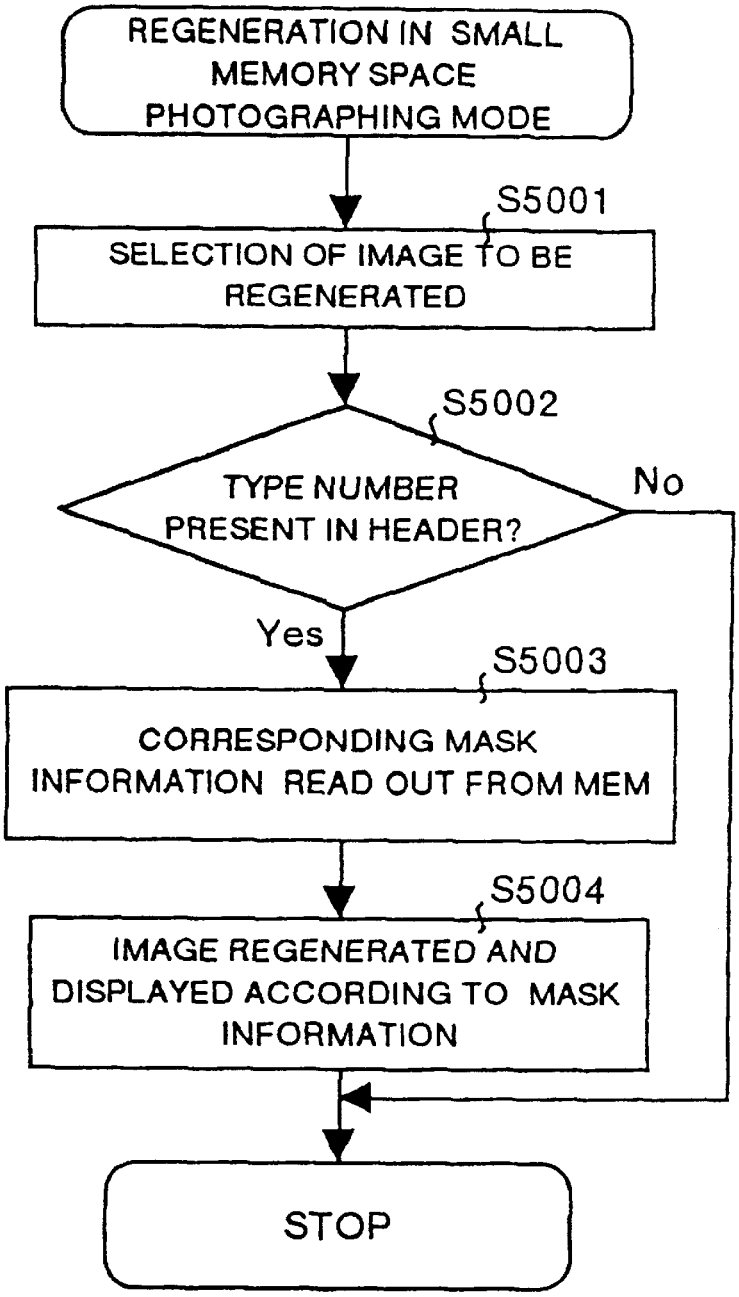
FIG. 50 is a flow chart for explaining an operational sequence in processing for regenerating and displaying images photographed in the photographing mode with a small quantity of memory space.

Next description is made for operations for regenerating an image photographed in the small memory space photographing mode with the flow chart shown in FIG. 50. At first, when an operating mode for regenerating and displaying an image is selected in step S5001, in step S5002, determination is made as to whether a type number for a mask has been added to the image data to be regenerated and displayed or not. Herein, if it is determined that a type number has not been added to the header, it is determined that the image data is for an image photographed in the ordinary photographing mode, and ordinary operations for regeneration and display are executed.

In step S5002, if it is determined that a type number for a mask has been added to the header of the image data to be regenerated and displayed, mask information corresponding to the type number is read out from the MEM 114 (step S5003), and the image is regenerated and displayed according to said mask information (step S5004).

Figure 51:
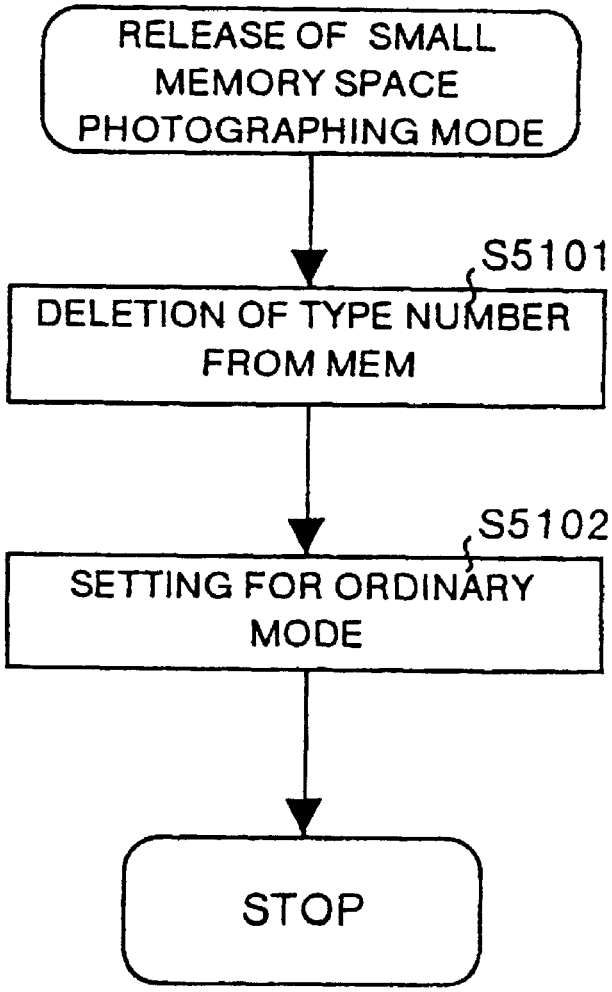
FIG. 51 is a flow chart for explaining an operational sequence in processing for releasing the mode for photographing with for a small quantity of memory space.

Next description is made for operations for releasing the small memory space photographing mode with reference to the flow chart shown in FIG. 51. At first, the type number for the mask registered in the MEM 114 is deleted (step S5101), and the ordinary mode is set (step S5102), thus the small memory space photographing mode being released.

Figure 52:
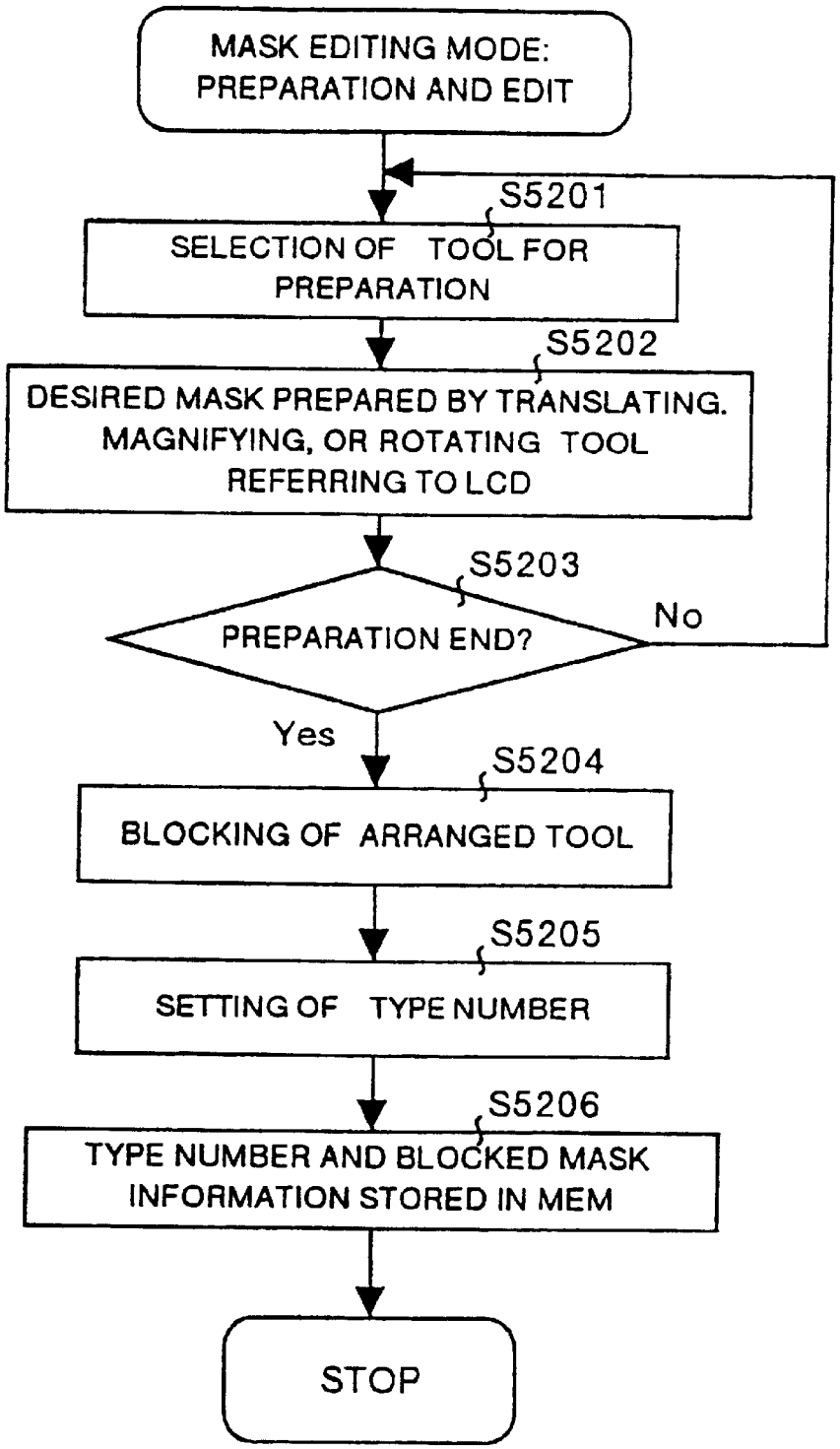
FIG. 52 is a flow chart for explaining operations in editing masks.

Then description is made for the function for editing a mask with reference to the flow chart shown in FIG. 52. Herein the mask edit function is defined as one for simply editing a mask previously prepared to prepare a mask specified to the user and maintain the mask in the MEM 114. Herein it is assumed for description that the masks as shown in FIG. 53A, FIG. 53B, and FIG. 53C have been prepared, and that the heart-shaped mask as shown in FIG. 53D is prepared from the masks.

Figure 53A:
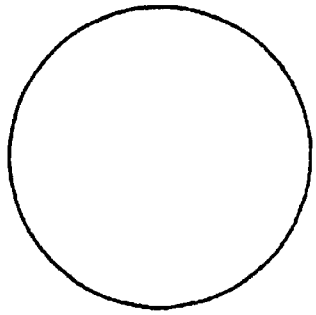
FIGS. 53A to 53D are explanatory views for explaining a previously prepared mask.
Figure 53B:
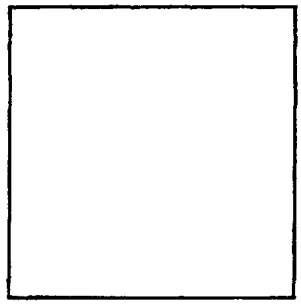
Figure 53C:
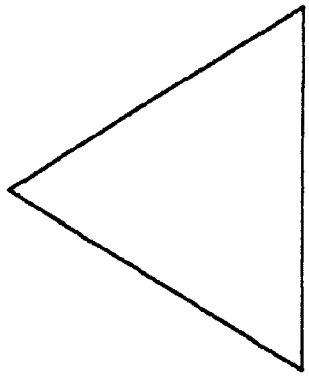
Figure 53D:
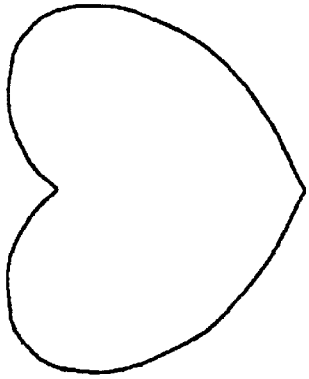

At first in step S5201, the mask shown in FIG. 53A which seems capable of being easily changed into the hart-shaped mask is selected from the masks previously prepared as a object tool for editing. The selected mask is displayed on the LCD 119, and such processing or deformation such as translation, magnifying (compression or extension) and rotation is executed referring to the display to prepare the hart-shaped mask(S5202). It should be noted that deformation can be made also by selecting a plurality of masks.

Figure 54A:
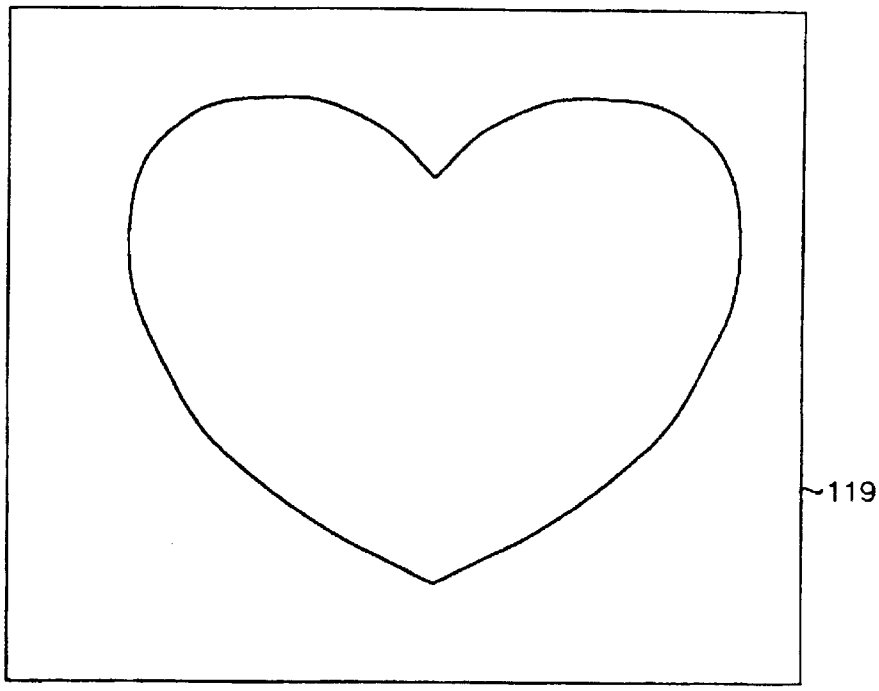
FIGS. 54A and 54B are explanatory views for explaining operations in editing masks.
Figure 54B:
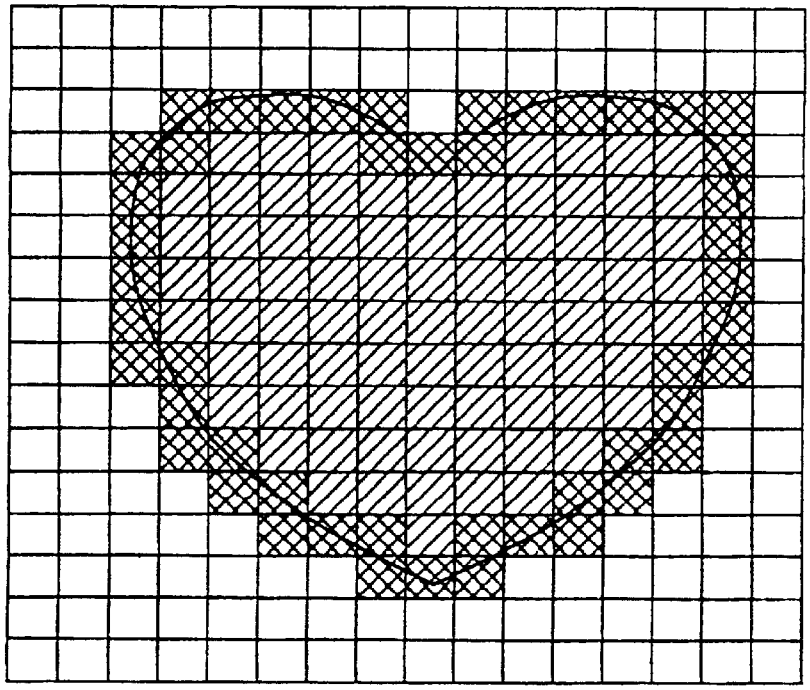

When the processing for deforming the mask displayed on the LCD 119 (refer to FIG. 54A) is complete ("Yes" in determination in step S5203), as shown in FIG. 54B, the image area is divided into M×N blocks and block mask information "1" for blocks in a particular image area (in the shadowed section in the figure) or "0" for other blocks is prepared (S5204), a type number is set for the prepared mask (S5205), and the type number and the block mask information are recorded in the MEM 114 (S5206).

When dividing an image area into M×N blocks, M may be equal to N (M=N), but generally a block size larger than that used for image compression is preferable. In the example shown in FIG. 54B, an image area is divided to 16×16 blocks, and the bit information consisting of "0" and "1" comprises 32 bytes in all.

When the mask shown in FIG. 53D is selected, only the image in the shadowed section shown in FIG. 54B is recorded, and the entire minimum rectangular area surrounding the shadowed section is not recorded. When regenerating the image, information for arrangement of blocks is required. This is the block mask information. By adding this simple layout information as a header for image data when the image is recorded, the image in the shadowed section can easily be regenerated and displayed (Refer to the processing for regeneration and display shown in FIG. 50).

Figure 55:
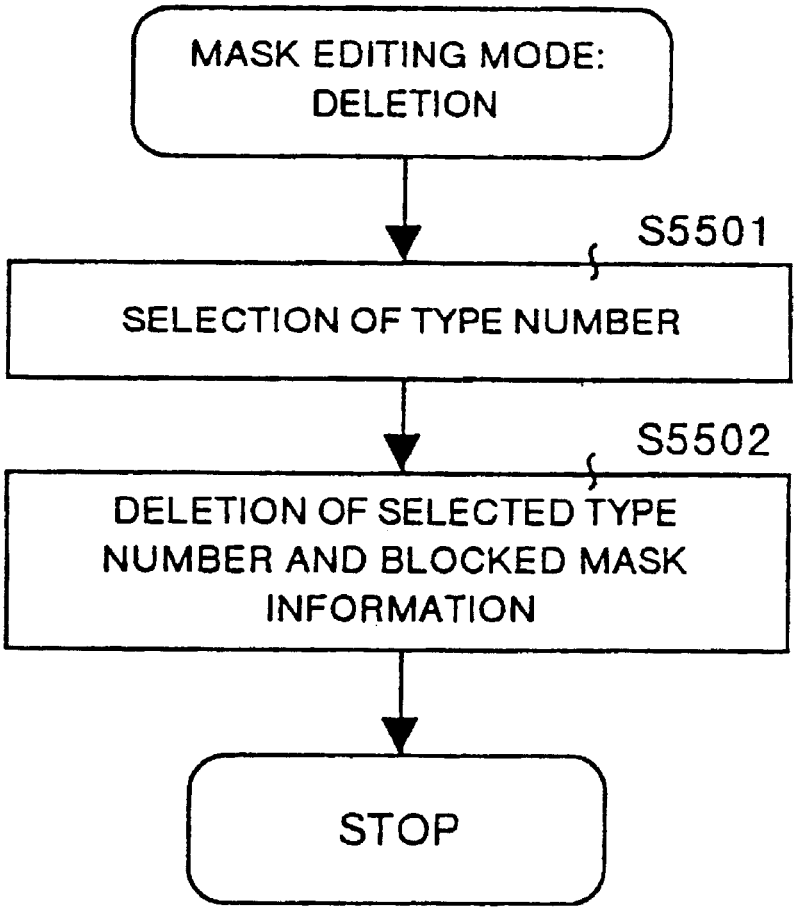
FIG. 55 is a flow chart for explaining an operational sequence in processing of deleting a registered mask in a mask editing mode.

Next description is made for the processing for deleting a registered mask in the mask editing mode with reference to the flow chart shown in FIG. 55. At first from the masks registered in the MEM 114, a type number to be deleted is selected (S5501), and then a type number and block mask information are deleted from the MEM 114 (S5502), thus the mask being deleted.

As described above, in the digital still video camera according to this embodiment, a mask identifying a photographed image area is selected in response to an image to be recorded, and a memory space required for image data can be reduced by freely changing a form of the photographed image to be stored, so that it is possible to effectively utilize the memory card 103 without degrading a quality of recorded images and with the same resolution as that in the ordinary photographing mode, and also without fetching an image in an unnecessary area and by maximizing a number of images which can be stored in a recording medium. When a mask identifying a photographed image area is selected, it is possible to have an object displayed on the LCD 119 through a mask in the real time mode, so that it is possible to realize a digital still video camera in which accurate mask selection can be executed and is excellent in the operability.

In the digital still video camera according to this embodiment, the residual memory space recognizing means for recognizing a residual memory in the memory card 103 is realized with the CPU 113, and in a case where it is recognized that a residual memory space in the memory card 103 is less than a specified value, a mask with a smaller image area is compulsively selected so that the mask can be photographed. With this feature, in a case where, for instance, it is desired to continue photographing when a residual memory space in the memory card 103 is small, it is possible to effectively use the memory card 103 without degrading a quality of recorded images and with maximizing a number of sheets of pictures which can be stored in the memory card 103 by stopping an operation for fetching the entire image and fetching only a mask necessary for the mask.

Figure 56:
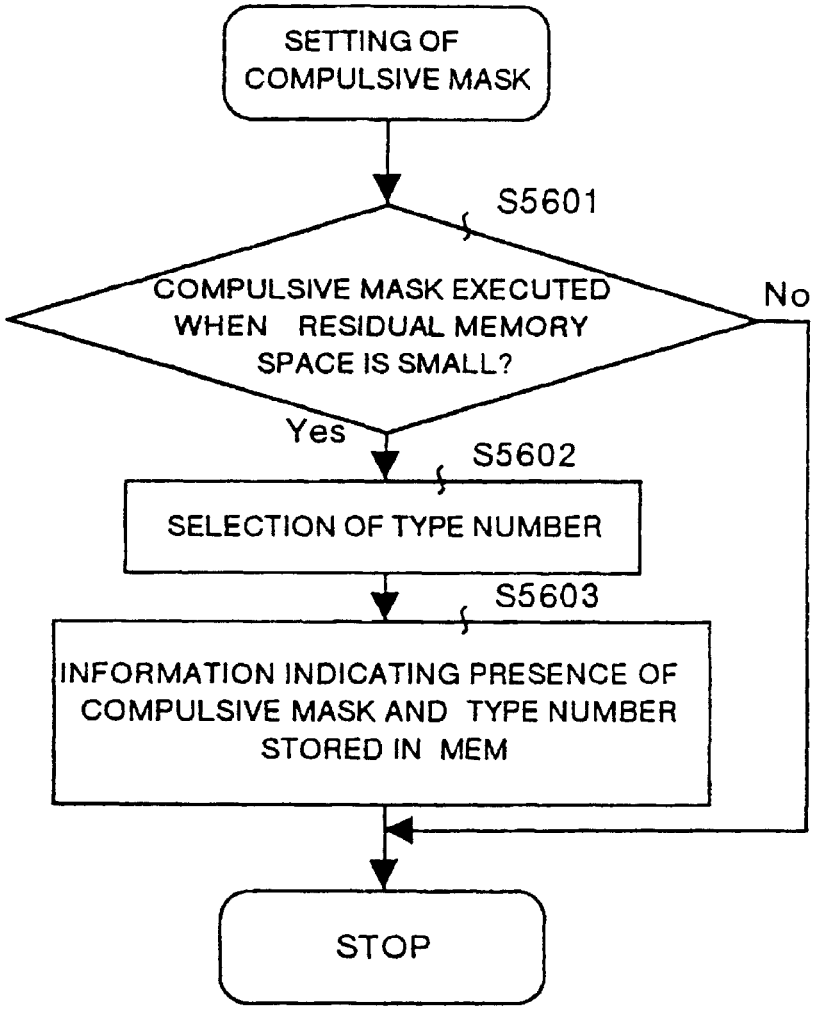
FIG. 56 is a flow chart for explaining an operational sequence in processing for presetting a mask to be compulsively selected when a memory space to be recorded in the recording medium becomes a low level.

FIG. 56 is a flow chart illustrating the processing for previously setting a mask to compulsively be selected when a residual memory space becomes smaller. In a case where compulsive mask selection is executed when a residual memory space in the memory card 103 becomes lower than a specified value ("Yes" in determination in S5601), system control goes to step S5602, and in step S5603, the information that a compulsive mask has been set and a type number for the mask are stored in the MEM 114.

Figure 57:
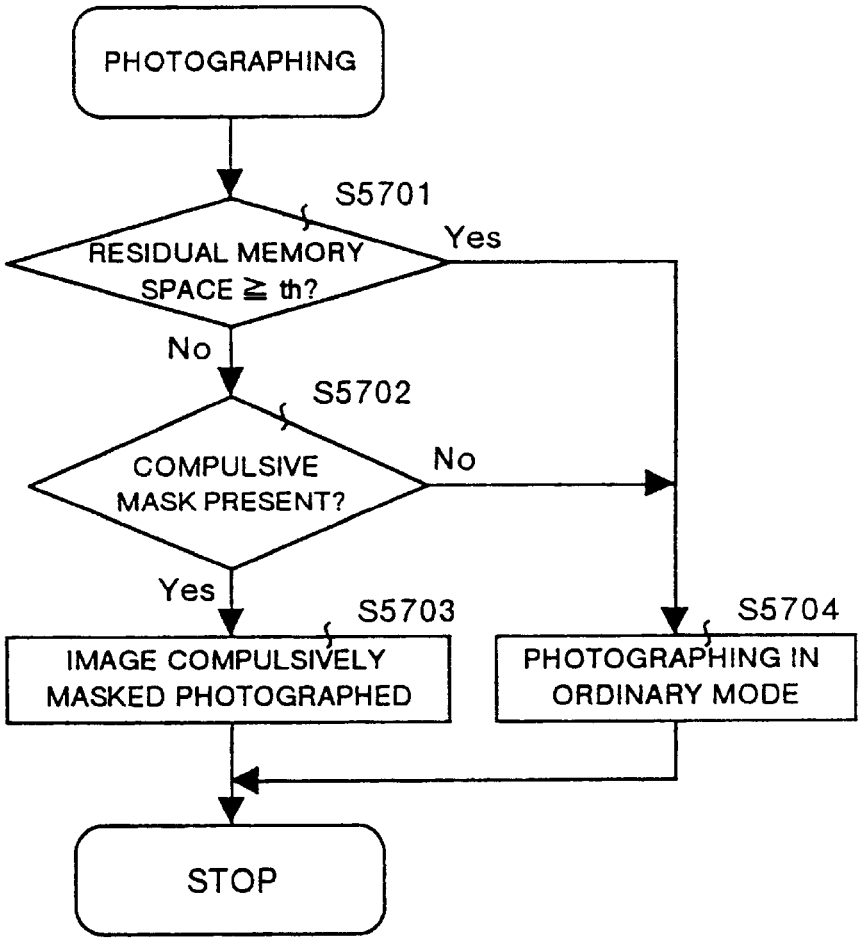
FIG. 57 is a flow chart for explaining an operational sequence in processing for changing a mask to one to be compulsively selected during photographing.

Change to a compulsive mask during photographing is executed according to a sequence as shown by the flow chart shown in FIG. 57. Namely if it is determined that a residual memory space in the memory card 103 is less than "th" in step S5701, after determination is made as to whether a mask to compulsively be selected is present or not in step S5702, in step S5703 a compulsive mask previously set is selected, and an image is photographed. It should be noted that "th" is a threshold value for making determination as to whether change to a compulsive mask is to be executed or not.

Further in this embodiment, in a case where a mask is switched to another one because, for instance, a compulsive mask is selected or a user switches the mask to a new one, a number of sheets of picture which can be photographed is displayed on the LCD 119. With this feature, information useful for selection of a mask or the information as to how many sheets of picture can be photographed after the compulsive mask can be given to a user, which makes it possible to realize a digital still video camera with excellent operability.

Figure 58:
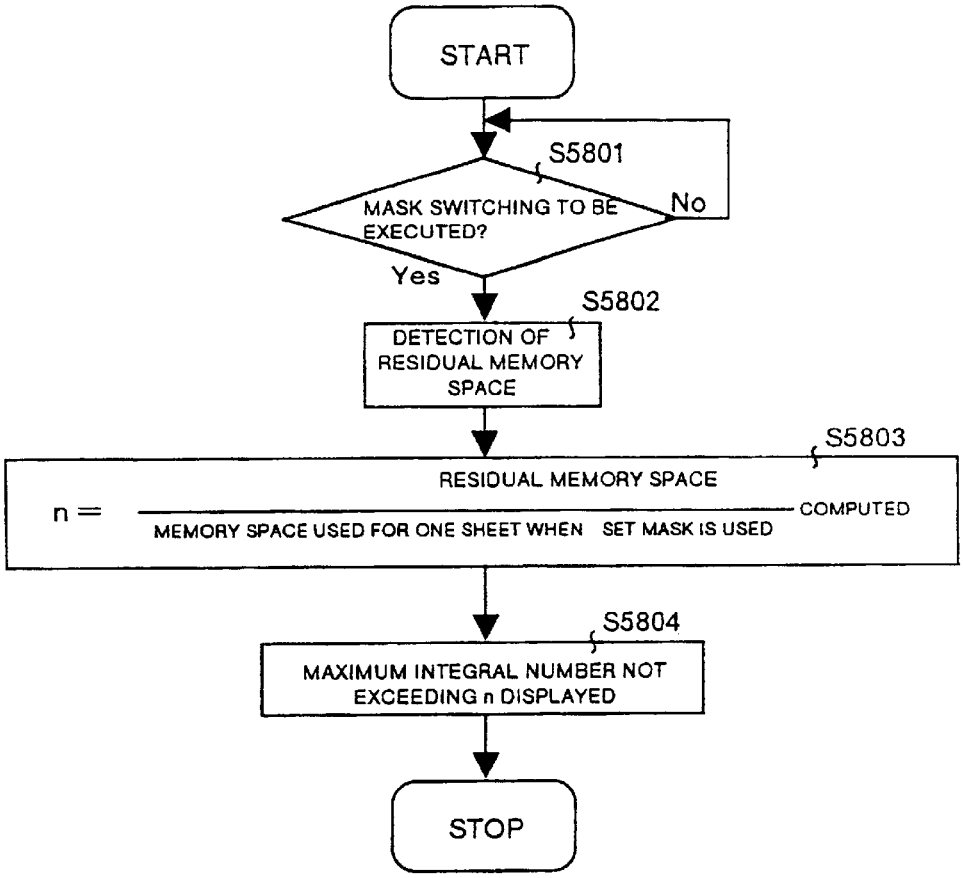
FIG. 58 is a flow chart for explaining a procedure of displaying a number of pieces of image which can be photographed therein.
Figure 59A:
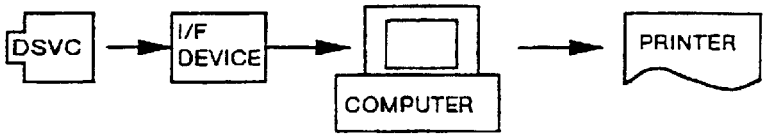
FIG.59A PRIOR ART
FIGS. 59A to 59D are explanatory views showing an example of configuration of the image data output system for a digital still vide camera based on the conventional technology.
Figure 59B:
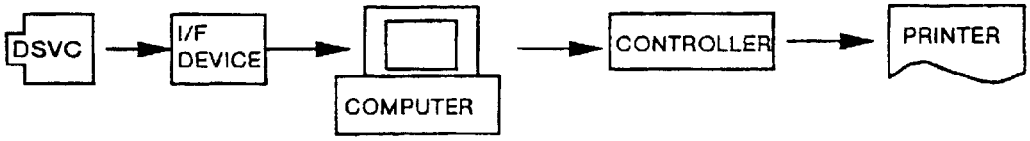
FIG.59B PRIOR ART
Figure 59C:
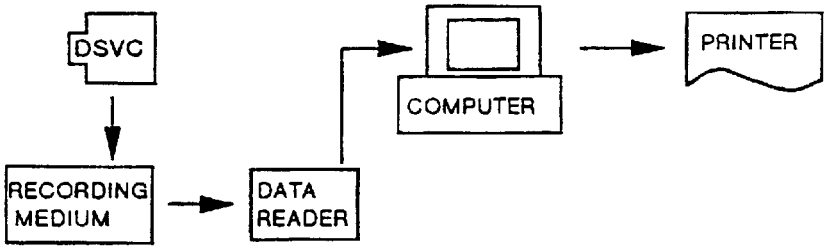
FIG.59C PRIOR ART
Figure 59D:
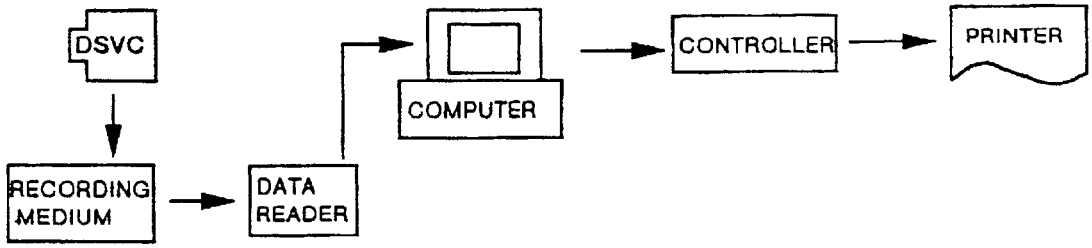
FIG.59D PRIOR ART
Figure 60A:
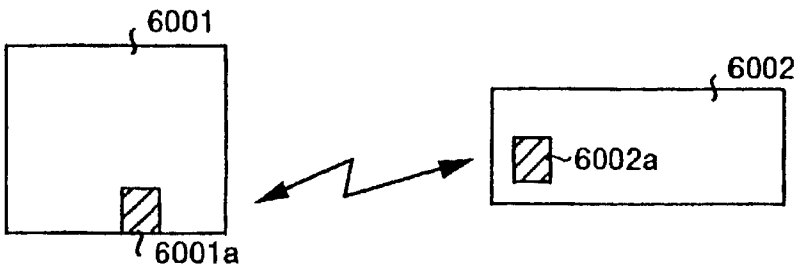
FIG.60A PRIOR ART
FIGS. 60A and 60B are explanatory views showing a radio communication system making use of infrared rays based on the conventional technology.
Figure 60B:
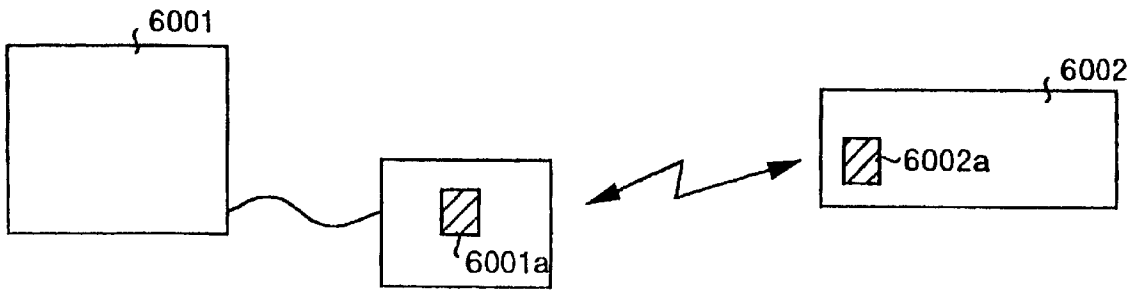
FIG.60B PRIOR ART

FIG. 58 is a flow chart illustrating an operation sequence in the processing for displaying a number of sheets of picture which can further be photographed. In step S5801, if it is determined that an operation for switching a mask is to be executed, system control goes to step S5802, a residual memory space in the memory card 103 is detected, and in step S5803, n is obtained by dividing the residual memory space by a memory space used for one sheet when the selected mask is used, and further in step S5804, a maximum integral number not exceeding n is obtained in step S5804, and the integral number is displayed as a number of sheets of picture which can further be photographed on the LCD 119.

As a variant of this embodiment, in addition to the processing shown in FIG. 56, FIG. 57, and FIG. 58, in a case where a residual memory space in the memory card 103 is less than a specified value, a number of sheets of picture in a case where a mask is selected is computed for each mask and is displayed on the LCD 119, and the compulsive mask may be selected according to an instruction by a user. With this feature, operability of the digital still video camera can further be improved.

As described above, the digital still video camera having a function for transaction of image data as well as control data with external devices comprises a picture information input means from receiving image information from an image forming apparatus, one of said external device; a picture information memory means for storing therein picture information inputted from said picture information input means; and a converting/sending means for converting image data to be sent to said image forming apparatus to image data adapted to said image forming apparatus according to the picture information stored in said picture information memory means and sending the image data using a synchronizing signal adapted to said image forming apparatus, so that image data in the digital still video camera can be outputted to recording paper with cheap configuration by directly transferring the image data to an image forming apparatus such as a printer without requiring interference by a computer.

The digital still video camera having a communicating function for transaction of image data as well as control data with external devices comprises a memory means for previously storing a plurality of picture information for the image forming apparatus as one of said external devices in correspondence to types of said image forming apparatus; a selecting means for selecting desired picture information for an image forming apparatus from the picture information stored in said memory means; and a converting/sending means for converting image data to be sent to said image forming apparatus to image data adapted to said image forming apparatus according to said selected picture information for the image forming apparatus and sending the image data using a synchronizing signal adapted to said image forming apparatus, so that image data in the digital still video camera can be outputted to recording paper with cheap configuration by directly transferring the image data to an image forming device such as a printer without requiring interference by a computer.

Also as specific information is included in picture information, sometimes ordinary users may get embarrassed, but it is possible to previously put the picture information for each image forming apparatus under unified control by using a computer and also to fetch a plurality of pictures through a memory card or the like into a digital still video camera, so that even a user not having any specific knowledge can execute printing by using the digital still video camera. Also work load for receiving picture information can substantially be reduced.

In the image data output system for outputting an image to a digital still video camera for outputting image data for a digital still video camera having the function for transaction of data to recording paper through the image forming apparatus, said image forming apparatus comprises a first memory means for storing the picture information for the apparatus; and a sending means for the picture information stored in said first memory means in response to a request from said digital still video camera to the side of the digital still video camera, and said digital still video camera comprises a picture information reading means for requesting picture information to be sent to said sending means in a case where image data is to be outputted through said image forming apparatus and reading in said picture information; a second memory means for storing the picture information read in from said picture information reading means; and a converting/sending means for converting image data to be sent to said image forming apparatus to image data adapted to said image forming apparatus according to the picture information stored in said second memory means and sending the image data using a synchronizing signal adapted to said image forming apparatus, so that image data in the digital still video camera can be outputted to recording paper with cheap configuration by directly transferring the image data to an image forming device such as a printer without requiring interference by a computer.

Also by having picture information stored in the side of the image forming apparatus, picture information can be set further easily and quickly.

Also the digital still video camera according to the present invention recognizes voice data, generates character code corresponding to the voice data, and records the character code and the image data in correspondence to each other in a recording medium, so that the character code can be read out from the recording medium to convert and regenerate as voices (voice data), and also it is possible to display the character code for checking, which improved convenience for a user in use thereof. In other words, as it is possible to use the inputted voice data as an information source for other types of processing, the operability, workability, and convenience in use of a digital still video camera can be improved.

The digital still video camera according to the present invention recognizes voice data, generates character code corresponding to the voice data, and records the character code and image data in correspondence to each other in a recording medium, so that the character code can be read out from the recording medium to convert and regenerate as voices (voice data), and also it can be displayed for checking, which makes it possible to improve convenience for users in use thereof.

Also the digital still video camera according to the present invention can outputs character code as voices and displays the character code by controlling the image displaying means, so that, even in a case where a voice is hardly heard or where voice output is impossible, the information can be known from the characters displayed on the screen. In other words, the operability, workability, and convenience in use of a digital still video camera can be improved by making use of the inputted voice data as an information source for other types of information.

Also the digital still video camera according to the present invention photographs an image and generates image data after it receives voice data and generates character code, and then records the character code and image data as an identical file in a recording medium, so that the character code can easily be related to the image data.

Also the digital still video camera according to the present invention receives voice data and generates character code after it photographs an image and generates the image data, and then records the image data and character code as an identical file in a recording medium, so that the character code can easily be related to the image data.

The digital still video camera can enhance security for a digital still video camera by previously generating voiceprint information from voice data and regenerating the voiceprint information and using the voiceprint information for each individual as a password for a personal computer or the like. In addition to improvement of security, various types of conditions for photographing set in a digital still video camera can not be changed without getting a permission from the owner, so that the convenience in use of a digital still video camera can be improved. Namely by utilizing inputted voice data as an information source for other types of processing, operability, workability, and convenience in use of a digital still video camera can be improved.

Also in the digital still video camera according to the present invention, by previously generating voiceprint from the voice data and registering the voiceprint information in a recording medium, it is possible to improve security of each individual recording medium by using a voiceprint information for each individual as a password for a personal computer or the like. Especially use of a digital still vide camera can be permitted to a number of uncertified people while preserving security for the recording medium. Namely by utilizing inputted voice data as an information source for other types of processing, operability, workability, and convenience in use of a digital still video camera can be improved.

The frame for relay for the digital still vide camera according to the present invention comprises a retaining means for stably supporting a digital still vide camera, a radio communicating means for transacting data with the digital still video camera supported by the retaining means by means of radio communications, and a data input/output means for outputting data received from an external device to said radio communicating means, so that data in the digital still vide camera having a radio communication function making use of infrared rays can easily and accurately be transferred to an external device.

In the data transfer system for a digital still video camera according to the present invention, the computer comprises an application means for providing operation control over said digital still video camera, and the digital still video camera comprises a determining means for making determination as to whether the computer to which data is to be transferred has said application means or not and a key entry inhibiting means for inhibiting the key entry from the camera in a case where said determining means has determined that the computer has the application means, and further if the computer has an application means, operation control for the digital still video camera is executed by inhibiting the operation key entry from the digital still video camera and by using the application means of the computer, so that operability and convenience in data transfer from the digital still video camera to the external device can be improved.

In the data transfer system for a digital still video camera according to the present invention, the external device comprises an application means for providing operation controls over said digital still video camera, and the digital still video camera comprises a selecting means for selecting with which of the digital still video camera or the external device operation control over the device is to be executed and an operation control validating means for validating operation control of either one of the device or the external device according to a result of selection by said selecting means, and in the case where the external device has been selected by said selecting means, the operation control over said external device is validated and operation control over the digital still video camera is executed by the application means provided in the external device, so that operability and convenience in data transfer from the digital still video camera to the external device can be improved.

In the data transfer system for a digital still video camera according to the present invention, the external device comprises an application means for providing operation controls over said digital still video camera, and the digital still video camera comprises an operation section function selecting means for comparing functions for the operation section in the device to functions for the operation section in said external device and selecting either of the operation sections which has more excellent functions, and an operation control validating means for validating control by either one of the device of the external device according to a result of selection by said operation section function selecting means, and further in the case where said operation section function selecting means has selected the external device, the operation control over said external device is validated, and operation controls over the digital still video camera is executed by the application means provided in said external device, so that operability and convenience in data transfer from the digital still video camera to the external device can be improved.

The digital still video camera according to the present invention comprises an image compressing means capable of executing processing for compressing the image with at least two different types of compression rate, and a memory means for storing mask information comprising a plurality of areas in which one of said at least two types of different compression rate is set, and the image compressing means divides an image for one screen into a plurality of areas using the plurality of areas of the mask information stored in said memory means and subjects the image to compression processing with the compression rate of said mask information corresponding to said divided areas, so that an image for an intended area (main portion) can be recorded with a large quantity of information according to an intention of a user.

The digital still video camera according to the present invention comprises an image compressing/extending means capable of executing processing for compression or extension of an image with at least two different types of compression rate, and a memory means for storing mask information comprising a plurality of areas in which one of said at least two types of different compression rate is set; and the said image compressing/extending means divides an image for one screen into a plurality of areas using the plurality of areas of the mask information stored in said memory means and executes the processing for compression or extension of the image with the compression rate of said mask information corresponding to each of said divided area, so that an image for an intended area (main portion) can be recorded with a large quantity of information according to an intention of a user. Also the recorded image can be regenerated according to a layout intended by the user.

The digital still video camera according to the present invention comprises an image compressing means capable of executing the processing for compression of the image with at least two different types of compression rate, a memory means for storing mask information comprising a plurality of areas in which one of said at least two types of different compression rate is set, a specifying means for specifying whether compression processing with said mask information is to be executed or not, and an adding means for adding mask identifying information for identifying said used mask information to the image after having been subjected to compression processing in a case where the compression processing with said mask information has been specified by said specifying means and recording the added image in said recording medium; and the image compressing means divides an image for one screen into a plurality of areas using the plurality of areas of the mask information stored in said memory means and executes the processing for compression of the image with the compression rate of said mask information corresponding to said divided areas in a case where the compression processing using said mask information has been specified by said specifying means when the image is to be recorded, so that an image for an intended area (main portion) can be recorded with a large quantity of information according to an intention of a user. Also the processing for compression using mask information can freely be selected by the user, so that convenience in use thereof is improved.

The digital still video camera according to the present invention comprises an image compressing/extending means for compression or extension of the image with at least two different types of compression rate, a memory means for storing mask information comprising a plurality of areas in which one of said at least two types of different compression rate is set, a specifying means for specifying whether compression processing with said mask information is to be executed or not, and an adding means for adding mask identifying information for identifying said used mask information to the image after having been subjected to compression processing in a case where the compression processing with said mask information has been specified by said specifying means and recording the added image in said recording medium, and the image compressing/extending means divides one of image into a plurality of areas using the plurality of areas of the mask information stored in said memory means and executes the processing for compression of the image with the compression rate of said mask information corresponding to said divided areas in a case where the compression processing using said mask information has been specified by said specifying means when the image is to be recorded, and divides an image for one screen into a plurality of areas using the plurality of areas of the mask information stored in said memory means and executes the processing for extension of the image with the compression rate of said mask information corresponding to said divided areas in a case where said mask identifying information is added to the image recorded in said recording medium when the image is to be extended, so that an image for an intended area (main portion) can be recorded with a large quantity of information according to an intention of a user. Also the recorded image can be regenerated according to the user's intention. Further the processing for compression using mask information can freely be selected by the user, so that the convenience in use thereof is improved.

The digital still video camera according to the present invention comprises a selecting means for selecting desired mask information from a plurality of mask information, and the memory means stores a plurality of different mask information, and said image compressing means executes said compression processing using the mask information selected by said selecting means, so that an image can be recorded with a layout further adapted to the user's intention.

The digital still video camera according the present invention comprises a selecting means for selecting desired mask information from a plurality of mask information, and the memory means stores a plurality of different mask information, and the image compressing/extending means executes the compression processing or extension processing using the mask information selected by said selecting means, so that an image can be recorded with a layout further adapted to the user's intention.

The digital still video camera according the present invention comprises a mask information generating/registering means for generating said mask information and registering the information in said memory means so that a user can freely generate or change said mask information thereby, so that, for instance, in a case where a number of images having a particular distance and a particular layout respectively are to be photographed, a required portion of each image can be recorded according to user's desire without reducing a quantity of information. Also a compression rate according to a layout can be set, so that the convenience for users becomes higher.

The image regenerating apparatus according to the present invention which receives an image from a recording medium with compressed images recorded therein and regenerates the image by extending the image comprises an image extending means capable of executing the processing for extension of an image with at least two types of different compression rate, and a memory means for storing mask information comprising a plurality of areas in which one of said at least two types of compression rate is set, and the image extending means divides an image for one screen into a plurality of areas using the plurality of areas of the mask information stored in said memory means and executes the processing for extension of the image with the compression rate of said mask information corresponding to said divided areas, so that the recorded image can be regenerated according to the user's intention.

The image regenerating apparatus according to the present invention for receiving an image from the recording medium in which the image subjected to compression processing is recorded and generating the image by being subjected to extension processing comprises an image extending means capable of executing the extension processing of an image with at least two types of different compression rate, and a memory means for storing mask information comprising a plurality of areas in which one of said at least two types of compression rate is set, and the image extending means divides an image for one screen into a plurality of areas using the plurality of areas of the mask information stored in said memory means and executes the processing for extension of the image with the compression rate of said mask information corresponding to said divided areas in a case where such specified information that said mask information is used is added to the image recorded in said recording medium, so that the recorded image can be regenerated according to the user's intention.

The image regenerating apparatus according to the present invention comprises a selecting means for selecting desired mask information among a plurality of mask information, and the memory means stores a plurality of different mask information, and the image extending means executes said the extension processing using the mask information selected by said selecting means, so that the recorded image can be regenerated according to the user's intention.

The image regenerating apparatus according to the present invention comprises a mask information generating/registering means for generating said mask information and registering the information in said memory means so that a user can freely generate or change said mask information thereby, and for this reason the recorded image can be regenerated according to the user's intention.

The digital still video camera according to the present invention for recording at least the photographed image in a recording medium comprises a residual memory space computing means for computing a residual memory of said recording medium, a setting means for setting therein a residual memory space reporting mode to report the residual memory space of said recording medium, a voice output means for outputting voices, and a residual memory space reporting means for outputting the residual memory space computed by said residual memory space computing means through said voice output means in a case where the residual memory space reporting mode has been set by said setting means, so that the user is alerted by means of voice communication to let the user accurately know a residual memory space in the recording medium. Also it is not necessary for the user to visually check the operation display section or other portions of the basic body of the digital still video camera, and the user's attention can be concentrated to an object to be photographed when photographing an image. Also it is not necessary for a user to remember a number of display codes even in a case where the operation display section is small, and the user can know the residual memory space, which improves the convenience in use thereof.

The digital still video camera according to the present invention for recording at least the photographed image in a recording medium comprises a residual memory space computing means for computing a residual memory space of said recording medium, a setting means for setting therein a residual memory space reporting mode to report the residual memory space of said recording medium, a plurality of voice output means for outputting voices, a specifying means for specifying which of said plurality of voice output means is to be used, and a residual memory space reporting means for outputting the residual capacity computed by said residual memory space computing means through the voice output means corresponding thereto according to the specification of said specifying means in a case where the residual memory space reporting mode has been set by said setting means, so that the user is alerted by means of voice communication to let the user accurately know a residual memory space in the recording medium. Also it is not necessary for the user to visually check the operation display section or other portions of the basic body of the digital still video camera, and the user's attention can be concentrated to an object to be photographed when photographing an image. Also it is not necessary for a user to remember a number of display codes even in a case where the operation display section is small, and the user can know the residual memory space, which improves the convenience in use thereof. Furthermore as it is possible to specify a particular voice output means such as an earphone for voice communication of a residual memory space, the residual memory space can be checked with voice without interfering proceeding of the conference or the like. Also the voice for telling a residual memory space and voices to be recorded can be prevented from being recorded in mixture.

The digital still video camera according to the present invention having a plurality of recording modes such as an image recording mode, a voice recording mode, and an image/voice mixture recording mode and for recording the photographed image and the received voices in a recording medium comprises a residual memory space computing means for computing a residual memory space of said recording medium, a setting means for setting therein a residual memory space reporting mode to report the residual memory space of said recording medium, a voice output means for outputting voices, a recording mode specifying means for specifying any of said plurality of recording modes in which the residual memory space of said recording medium is to be reported, and a residual memory space reporting means for outputting the residual memory space computed by said residual memory space computing means through the voice output means in a case where a residual memory space reporting mode has been set by said setting means and the set recording mode is the recording mode specified by said recording mode specifying means, so that the user is alerted by means of voice communication to let the user accurately know a residual memory space in the recording medium. Also it is not necessary for the user to visually check the operation display section or other portions of the basic body of the digital still video camera, and the user's attention can be concentrated to an object to be photographed when photographing an image. Also it is not necessary for a user to remember a number of display codes even in a case where the operation display section is small, and the user can know the residual memory space, which improves the convenience in sue thereof. Further a residual memory space is reported only in a particular recording mode, so that a time required for reporting a residual memory space can be saved by setting a recording mode or modes frequency used to evade the necessity to reporting the residual memory space each time.

The digital still video camera according to the present invention for recording at least the photographed image in a recording medium comprises a residual memory space computing means for computing a residual memory space of said recording medium, a reporting condition specifying means for specifying a reporting condition to report the residual memory space of said recording medium, a voice output means for outputting voices; and a residual memory space reporting means for outputting the residual memory space computed by said residual memory space computing means through the voice output means in a case where a reporting condition has been set by said reporting condition specifying means and the residual memory space computed by said residual memory space computing means satisfies said reporting condition, so that the user is alerted by means of voice communication to let the user accurately know a residual memory space in the recording medium. Also it is not necessary for the user to visually check the operation display section or other portions of the basic body of the digital still video camera, and the user's attention can be concentrated to an object to be photographed when photographing an image. Also it is not necessary for a user to remember a number of display codes even in a case where the operation display section is small, and the user can know the residual memory space, which improves the convenience in sue thereof. Further a user can set a timing for reporting a residual memory space according to the condition for reporting, so that the residual memory space can automatically and accurately be reported according to a timing required by the user with voice.

In the digital still video camera according to the present invention, a plurality of masks each identifying an area for a photographed image are stored in a mask retaining means, and when a mask has been selected by a selecting means, the control means displays the image on said image displaying means so that the object of a photograph can be seen through the photographed image area identified by said mask, and also stores the information relating to said mask with reference to the image data for the photographed image area identified by said mask each according to a specified operation in said memory means, and identifies an image area according to said mask information and regenerates/displays the image in a case where mask information related to said image data is added to the image data when the image data stored in said memory means is to be regenerated and displayed on said image displaying means, so that it is possible to freely change a form of a photographed image to be stored in a storage medium by selecting a mask identifying an area for a photographed image according to the image to be recorded, and for this reason it is possible to provide a digital still video camera which allows a maximum number of images to be stored in a storage medium without fetching an unnecessary images with the same resolution as that in the ordinary photographing mode and without degrading a quality of the recorded images and which, as a result, can make effective use of a storage medium. Also an object to be photographed through a mask can be displayed in the real time mode on the image display screen when selecting a mask identifying an area for the photographed image, so that it is possible to provide a digital still video camera which enables accurate mask selection and has excellent operability.

In the digital still video camera according to the present invention, a mask editing means edits a mask to be retained in said mask retaining means, so that a freedom of a form of a photographed image can be raised, which eliminates the need for an editorial work with a computer external to the digital still video camera, and as a result it is possible to provide a digital still video camera with excellent operability.

In the digital still video camera according the present invention, a user can specify any mask with the an input means, and the selecting means selects any mask according to specification of the mask by the input means, so that the user's desire is satisfied to the maximum degree, and also it is possible to provide a digital still video camera which can make effective use of a storage medium.

In the digital still video camera according to the present invention, in a case where a residual memory space recognizing means recognizes that a residual memory space of the memory means is less than a specified value, a mask previously specified by the input means or a an arbitrary mask can automatically be selected by the selecting means, so that it is possible to provide a digital still video camera which, in a case where it is desired to continue photographing even though the residual memory space in the memory means is small, allows a maximum number of images to be photographed by stopping fetching all the images and fetching only images required for the mask without degrading a quality of the recorded images and can make effective use of the storage medium.

In the digital still video camera according to the present invention, the control means computes a number of additional sheets which can be recorded in said memory means according to the residual memory space of said memory means recognized by said residual memory space recognizing means, and displays said number of additional sheets on said displaying means for reference to the user when selecting a photographing mode, so that it is possible to provide a digital still video camera with excellent operability which allows a maximum number of images to be photographed without reducing a quality of recorded images and can make effective se of a storage medium.

This application is based on Japanese patent applications No. HEI 7-287640, No. HEI 7-290182, No. HEI 7-295429, No. HEI 7-301822, No. HEI 7-301823 and No. HEI 7-338186 filed in the Japanese Patent Office on Nov. 6, 1995, Nov. 8, 1995, Nov. 14, 1995, Nov. 20, 1995, Nov. 20, 1995 and Dec. 2, 1995, respectively, the entire contents of which are hereby incorporated by reference.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. A digital still video camera having a function for transaction of image data as well as control data with *an* external [devices] *device,* comprising:

a picture information input means for [receiving image] *input of picture* information [from] *for* an image forming apparatus, [one] *which is an example* of said external [devices] *device*;

a picture information memory means for storing therein *the input* picture information [inputted from said picture information input means]; and a converting/sending means for converting image data to be sent to said image forming apparatus to image data adapted to said image forming apparatus according to the picture information stored in said picture information memory means and sending the image data using a synchronizing signal adapted to said image forming apparatus.

2. A digital still video camera having a function for transaction of image data as well as control data with external devices comprising:

a memory means for previously storing a plurality of picture information for the image forming apparatus as one of said external devices in correspondence to types of said image forming apparatus;

a selecting means for selecting desired picture information for an image forming apparatus from the picture information stored in said memory means; and a converting/sending means for converting image data to be sent to said image forming apparatus to image data adapted to said image forming apparatus according to said selected picture information for the image forming apparatus and sending the image data using a synchronizing signal adapted to said image forming apparatus.

3. An image data output system for outputting image date from a digital still video camera having the function for transaction of data to recording paper through an image forming apparatus, wherein said image forming apparatus comprises:

a first memory means for storing picture information for the apparatus; and a sending means for the picture information stored in said first memory means in response to a request from said digital still video camera to the side of the digital still video camera, and said digital still video camera comprises:

a picture information reading means for requesting picture information to be sent to said sending means in a case where image data is to be outputted through said image forming apparatus and reading in said picture information;

a second memory means for storing the picture information read in from said picture information reading means; and a converting/sending means for converting image data to be sent to said image forming apparatus to image data adapted to said image forming apparatus according to the picture information stored in said second memory means and sending the image data using a synchronizing signal adapted to said image forming apparatus.

* * * * *